United States Patent
Knowles et al.

(10) Patent No.: US 11,704,270 B2
(45) Date of Patent: Jul. 18, 2023

(54) NETWORKED COMPUTER WITH MULTIPLE EMBEDDED RINGS

(71) Applicant: Graphcore Limited, Bristol (GB)

(72) Inventors: Simon Knowles, Bristol (GB); Hachem Yassine, Bristol (GB)

(73) Assignee: GRAPHCORE LIMITED, Bristol (GB)

(*) Notice: Subject to any disclaimer, the term of this patent is extended or adjusted under 35 U.S.C. 154(b) by 35 days.

(21) Appl. No.: 17/305,680

(22) Filed: Jul. 13, 2021

(65) Prior Publication Data

US 2021/0342284 A1    Nov. 4, 2021

Related U.S. Application Data

(63) Continuation-in-part of application No. 16/831,580, filed on Mar. 26, 2020.

(30) Foreign Application Priority Data

Mar. 27, 2019 (GB) ..................... 1904267

(51) Int. Cl.
*G06F 13/40* (2006.01)
*H04L 49/109* (2022.01)

(52) U.S. Cl.
CPC ...... *G06F 13/4022* (2013.01); *G06F 13/4013* (2013.01); *G06F 13/4063* (2013.01); *H04L 49/109* (2013.01); *G06F 2213/0038* (2013.01)

(58) Field of Classification Search
CPC ............ G06F 13/4013; G06F 13/4063; G06F 2213/0038; H04L 49/109

USPC .......................................................... 712/29
See application file for complete search history.

(56) References Cited

U.S. PATENT DOCUMENTS

| 5,420,754 A | 5/1995 | Segelken et al. |
| 2010/0235847 A1 | 9/2010 | Brehmer et al. |
| 2014/0317379 A1 | 10/2014 | Miyazaki |
| 2018/0240039 A1 | 8/2018 | McLaren |

(Continued)

OTHER PUBLICATIONS

Search Report and Written Opinion dated Jun. 23, 2020 for Patent Application No. PCT/EP2020/058621, 17 pages.

(Continued)

*Primary Examiner* — Brian T Misiura
(74) *Attorney, Agent, or Firm* — Haynes and Boone, LLP

(57) ABSTRACT

A network comprising interconnected first and second processors, each processor comprising one or more of: multiple processing units arranged on a chip configured to execute program code; an on-chip interconnect comprising groups of exchange paths connected to receive data from corresponding groups of the processing units; external interfaces configured to communicate data off-chip as packets, each having a destination address, external interfaces of the first and second processors being connected by an external link; multiple exchange blocks, each connected to groups of the exchange paths; a routing bus configured to route packets between the exchange blocks and the external interfaces. Processing units of the first processor generate off-chip packets such that the group of processing units serviced by the first exchange block on the first processor address off-chip packets to the group of processing units on the second processor serviced by the corresponding first exchange block of the second processor.

23 Claims, 31 Drawing Sheets

(56) References Cited

U.S. PATENT DOCUMENTS

| | | | |
|---|---|---|---|
| 2019/0045003 A1 | 2/2019 | Archer | |
| 2019/0121387 A1 | 4/2019 | Knowles | |
| 2019/0121388 A1 | 4/2019 | Knowles | |
| 2019/0121777 A1 | 4/2019 | Knowles | |
| 2019/0155768 A1* | 5/2019 | Wilkinson | G06F 13/4282 |
| 2020/0201704 A1* | 6/2020 | Felix | G06F 11/2043 |
| 2022/0019550 A1* | 1/2022 | Yassine | G06F 13/4221 |
| 2022/0019552 A1* | 1/2022 | Wilkinson | G06F 15/82 |

OTHER PUBLICATIONS

Chen Juan et al: "Reducing Static Energy in Supercomputer Interconnection Networks Using Topology-Aware Partitioning", IEEE Transactions on Computers, IEEE, USA, vol. 65, No. 8, Aug. 1, 2016, pp. 2588-2602.
Office Action dated Nov. 17, 2022 for Japanese Patent Application No. 2021-557202. 4 pages.

* cited by examiner

| | col_id 0 | col_id 1 | | col_id 0 | col_id 1 |
|---|---|---|---|---|---|
| card_id 7 | ph_id: 14, lo_id: 1 | ph_id: 15, lo_id: 0 | card_id 15 | ph_id: 30, lo_id: 1 | ph_id: 31, lo_id: 0 |
| card_id 6 | ph_id: 12, lo_id: 3 | ph_id: 13, lo_id: 2 | card_id 14 | ph_id: 28, lo_id: 3 | ph_id: 29, lo_id: 2 |
| card_id 5 | ph_id: 10, lo_id: 0 | ph_id: 11, lo_id: 1 | card_id 13 | ph_id: 26, lo_id: 0 | ph_id: 27, lo_id: 1 |
| card_id 4 | ph_id: 8, lo_id: 2 | ph_id: 9, lo_id: 3 | card_id 12 | ph_id: 24, lo_id: 2 | ph_id: 25, lo_id: 3 |
| card_id 3 | ph_id: 6, lo_id: 1 | ph_id: 7, lo_id: 0 | card_id 11 | ph_id: 22, lo_id: 1 | ph_id: 23, lo_id: 0 |
| card_id 2 | ph_id: 4, lo_id: 3 | ph_id: 5, lo_id: 2 | card_id 10 | ph_id: 20, lo_id: 3 | ph_id: 21, lo_id: 2 |
| card_id 1 | ph_id: 2, lo_id: 0 | ph_id: 3, lo_id: 1 | card_id 9 | ph_id: 18, lo_id: 0 | ph_id: 19, lo_id: 1 |
| card_id 0 | ph_id: 0, lo_id: 2 | ph_id: 1, lo_id: 3 | card_id 8 | ph_id: 16, lo_id: 2 | ph_id: 17, lo_id: 3 |

FIG. 2C

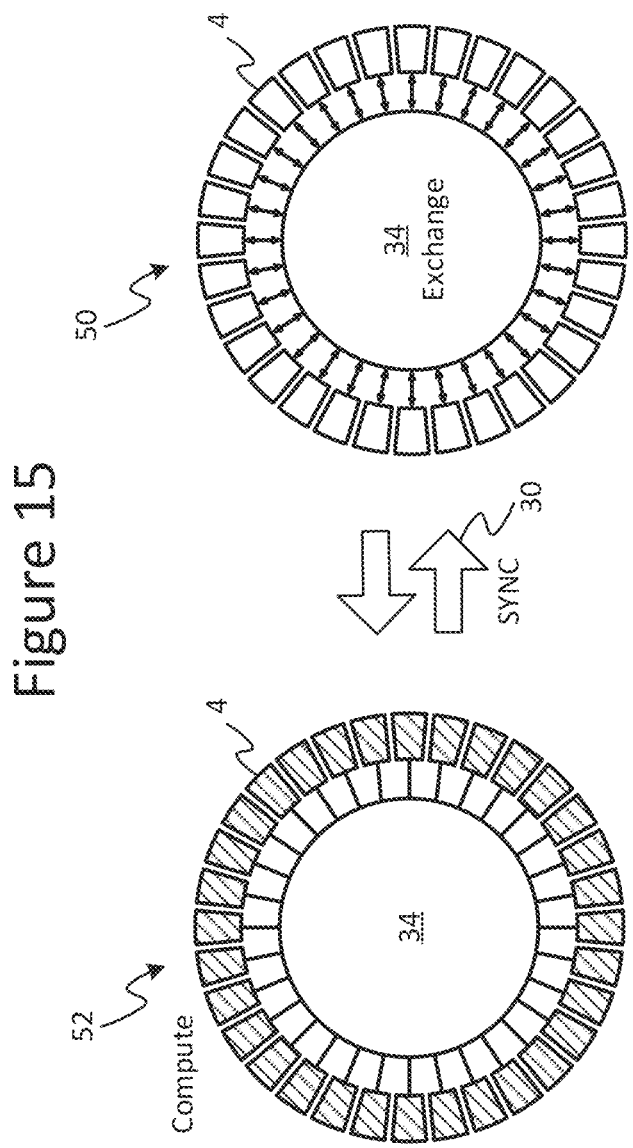

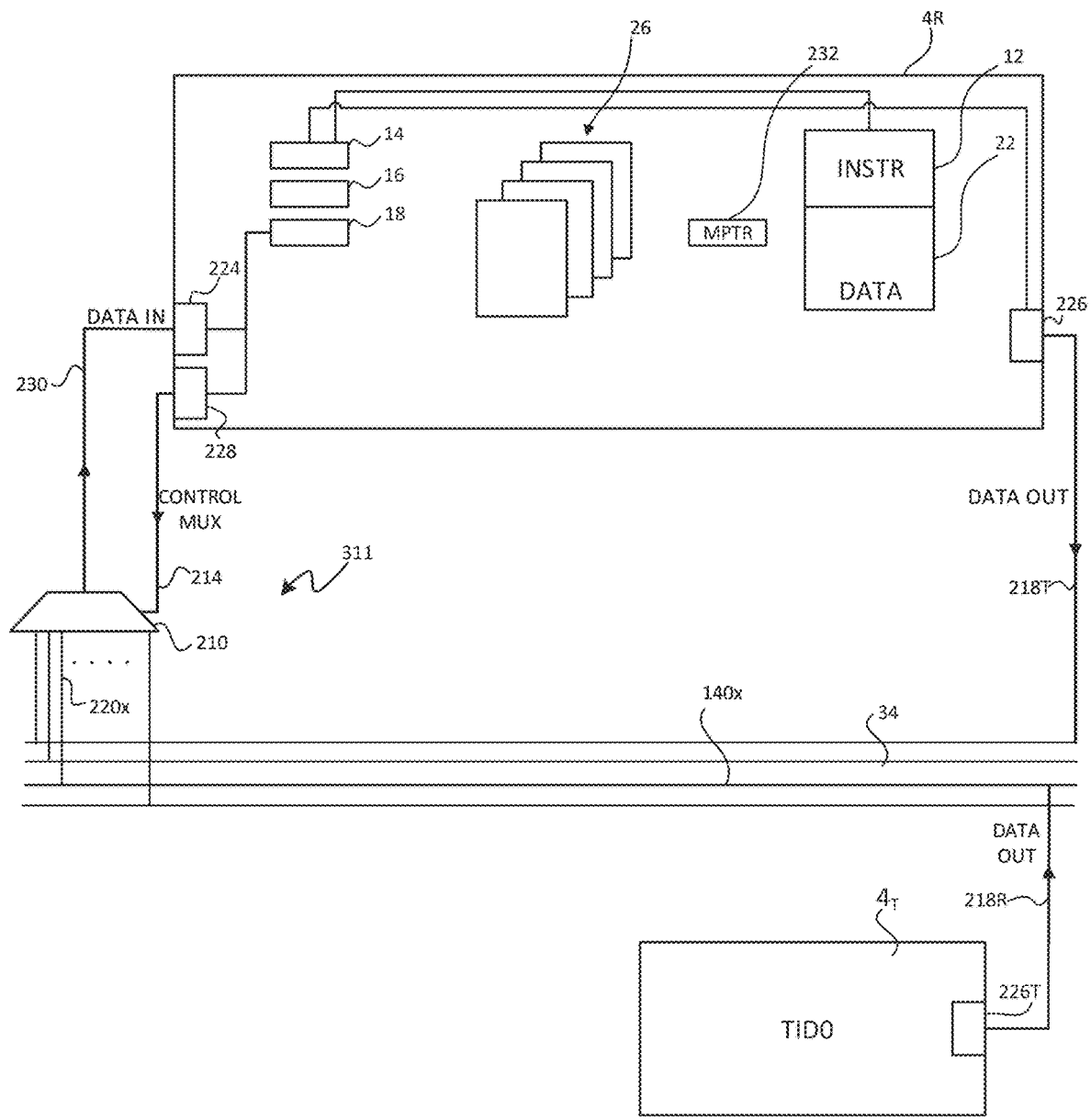

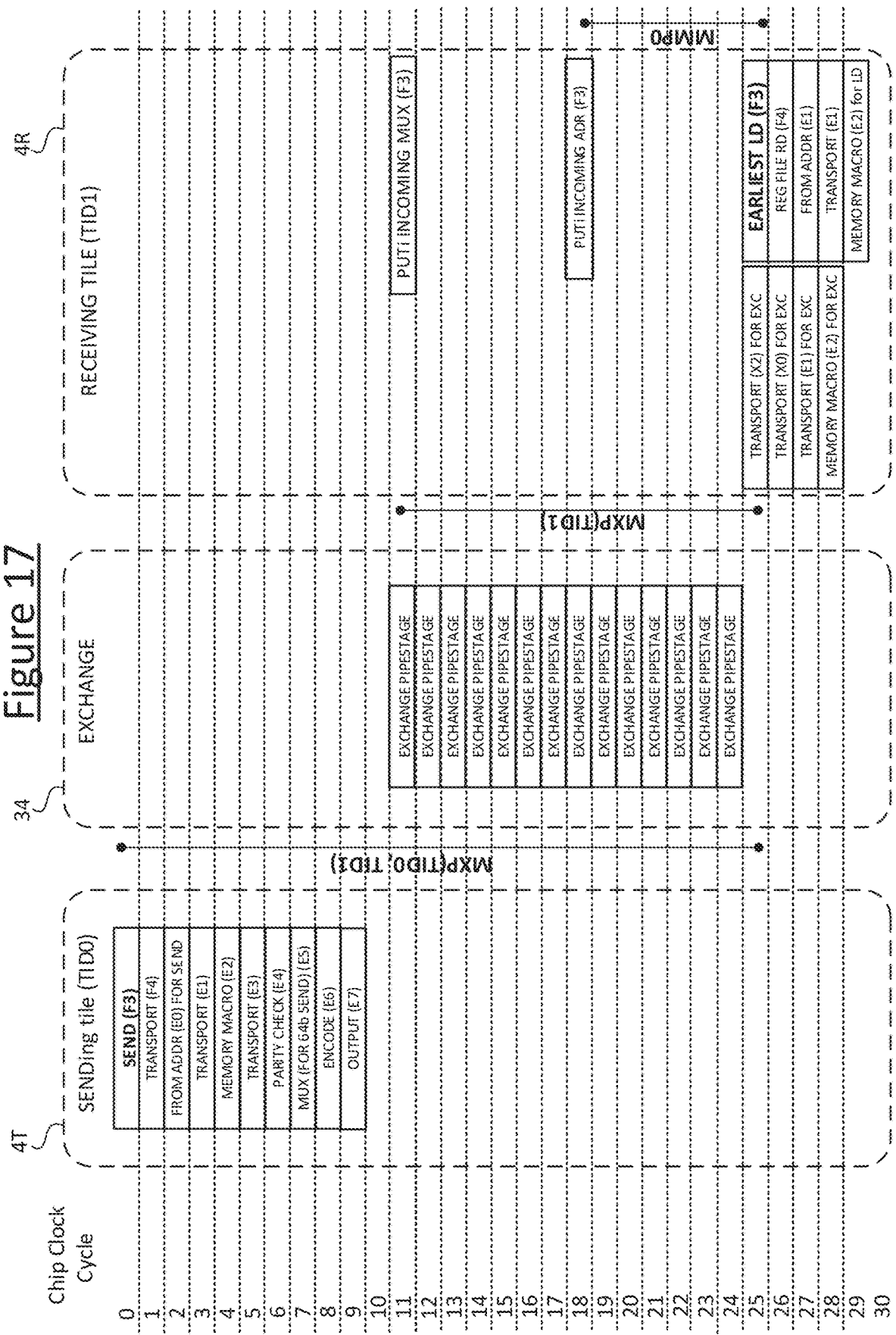

NETWORKED COMPUTER WITH MULTIPLE EMBEDDED RINGS

CROSS-REFERENCE TO RELATED APPLICATIONS

The present application is a continuation-in-part of U.S. patent application Ser. No. 16/831,580, filed Mar. 26, 2020, which claims priority to United Kingdom Patent Application No. 1904267.0, filed Mar. 27, 2019 and United Kingdom Patent Application No. 2010784.3, filed Jul. 14, 2020, the disclosures of which are incorporated herein by reference in their entireties.

FIELD

The present disclosure relates to the exchange of data between processing nodes connected in a computer particularly but not exclusively for optimising data exchange in machine learning/artificial intelligence applications.

BACKGROUND

Collectives are routines which are commonly used when processing data in a computer. They are routines which enable data to be shared and processed across multiple different processes, which may be running on the same processing node or different processing nodes. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. Two such collective are termed "Reduce" and "Allreduce". A Reduce operation enables a result of a compute function acting on multiple data values from different source processes to be provided at a single receiving process. Note that a receiving process may be one of the source processes, and that there may be multiple receiving processes. The Allreduce collective reduces the data values from multiple source processes and distributes the results to all the source processes, (which are acting as receiving processes for the reduced result).

According to the MPI Standard, the Allreduce collective may be implemented by reducing the data values from all source processes in a reduce collective (e.g. at one of the processes) and then broadcasting the result to each source process.

FIG. 7A is a schematic block diagram of a distributed architecture for training a neural network. A source of training data 100 is provided. This may be a database or any other kind of data store capable of holding training data applicable to the neural network model being trained. Processing according to the neural network model is itself distributed across multiple processing units 110a, 110b, 110c etc. Only three units are shown in FIG. 7A, but it will readily be appreciated that any number of processing units could be utilised. Each processing unit 110a, b, c receives batches of training data from the training data source 100. Each processing unit 110a, b, c holds a set of parameters 112a, 112b, 112c which define the model. An incoming batch of training data is processed with a current set of parameters in a calculation function 114 and the results of the calculation function are used to generate so-called deltas which represent the difference between the original parameter and the new parameter as a result of applying the calculating function on the batch of training data and the current set of parameters. In many neural networks, these parameters are termed "weights" and so the delta values are termed "delta weights". The weights are labelled 112a, b, c and the delta weights are labelled 116a, b, c in FIG. 7A. It will be appreciated that in practice the weights and delta weights are stored in suitable stores accessible by the processing unit. If the weights and delta weights can be held in local memory, this renders the training process much more efficient.

The aim with the architecture of FIG. 7A is not to train three separate models but to train a single model in a distributed manner. Therefore, the purpose is to have the model parameters (or weights) converged to a single common set in each processing unit. It is evident that starting from any particular set of weights, and assuming that the batch of training data received at each processing unit is not identical, then there will be a variation in the delta weights which are produced by each calculation function in each processing unit. What is needed therefore is a way to combine and distribute the delta weights across the processing units after each iteration of batched training data. This is shown diagrammatically in FIG. 7A where a combinatorial function 118 receives the delta weights from each processing unit and performs a mathematical function which reduces the delta weights, such as an averaging function. The output of the combinatorial function 118 is then fed back to combining circuitry 120a, 120b and 120c within each processing unit respectively. A new set of weights is thus produced as a combination of the original weights and the combined output from the combinatorial function 118, and the new weights 118a, 118b, 118c are stored back into local memory. Then, the next batch of training data is supplied to each processing unit and the process repeats multiple times. It is evident that if the starting weights of the processing units are the same, then after each iteration they will be reset again to the same, new values. It can readily be seen that the above is an example of where the Allreduce function is particularly useful. The delta weights are supplied to the combinatorial function 118a where they are reduced, and they are then supplied back to each of the processing units in their reduced form, where they can be combined with the original weights.

FIG. 7B is a schematic diagram to illustrate how an Allreduce collective might be implemented in a line connected topology of six processing nodes $N_0 \ldots N_5$. These processing nodes may correspond to the processing units of FIG. 7A in which the combinational function is distributed between the nodes so that there is no longer a combining node as in FIG. 7A. The processing nodes are shown connected in a line configuration where each processing node is connected to its neighbour by a "forwards" links $L_F$ and a "backwards" link $L_B$. As shown in the diagram, and as the directional phrases imply, the forward links connect processing nodes from the left to right in FIG. 7B, and the backwards links connect processing nodes from the right to left in FIG. 7B. Each processing node has a processing capability designated 200, and a storage capability designated 202. The processing capability and storage capability can be implemented in any of a very large number of ways. In one particular manifestation, the processing node may comprise multiple tiles, each individual tile having its own processing capability and associated memory capability. Each processing node also has one or more link interface 100 which enables it to be connected to its neighbouring node via the links $L_F/L_B$.

To understand the implementation of the Allreduce collective, assume that the first node N0 has generated a "partial" vector labelled $\Delta 0$. The "partial" may be a data structure comprising an array, such as a vector or tensor, of delta weights. A partial vector is an array of partials each corresponding to a computation on the processing nodes. Each "partial" may be a set of delta weights. This is stored in the storage capability 202 ready to be exchanged in an Allreduce collective. In a simple "streaming" line Allreduce algorithm, the forward links are used for "reduce" and the backward links are used for "broadcast". The algorithm starts with the processing node at one end (the left hand node in FIG. 7B) sending its partial $\Delta 0$ to its adjacent node N1. At this node, the incoming partial ($\Delta 0$ in this case) is reduced with the corresponding partial which was generated by the computing capability 200 at the processing node $N_1$, $\Delta 1$. The result of this reduction (shown as an ADD function in FIG. 7B) is then sent from processing node N1 to the next connected node N2. As mentioned further herein, the ADD function could be replaced by any combinatorial function which could be used to reduce the partials. The process occurs at each processing node, until at the final processing node, denoted $N_5$ in FIG. 7B, the reduction of the partials is complete. At this point, the reduction (summation $\Delta$) is sent back to each processing node via the backward links $L_B$. It is received at each node, stored at that node in the memory capability and then also transmitted to the next node. In this way, each processing node ends up with the reduced result.

FIG. 7C shows a timing diagram of the reduce and broadcast phases. Note that a processing node cannot send a reduced result to the next node until it has received the incoming data from the previous node. Thus, there is an inherent latency marked $\Delta$ for each outgoing transmission on the forward links.

Furthermore, the backward links are not utilised for broadcast until the fully reduced result has been obtained at the end node. However, if the partial vectors are large, due to the pipelined effect the lead data item of the result, being the reduction of the first partials from the partial vectors at each node, will return to the starting node well before that node has finished sending the data items of its partial, so there may be a substantial overlap of activity on all forward and backward links.

In a modification to this algorithm, processing nodes at each end of the line can start to transmit their partials towards a central node, with the reduction being completed at the central nodes. In that case, the result is broadcast back to the end nodes. Note that in this scenario, there would be a reversal in the direction of movement, for example between nodes $N_2$ and $N_3$, and $N_3$ and $N_4$ on both the forward and backward links. If a line is closed into a ring (by connecting the final node $N_5$ to the first node $N_0$ on both the backward and forward links), a pipeline algorithm can serialise reduction and broadcast in the same direction, so that the two logical rings formed by the bi-directional links can each operate independently on half of the data. That is, each partial vector is split into two and a first half $\Delta A$ is reduced on the forward links (as in FIG. 7B), and broadcast on the connecting leg between $N_5$ and $N_0$. The other half of the vector A B is reduced on the backward links, and then broadcast on the connecting ring of the backward links such that each node receives a copy of the Allreduce result.

FIG. 7E illustrates the corresponding timing diagram for the forward and backward links.

A. The principles of the one-dimensional ring shown in FIGS. 7B and 7D can be extended to rings in two dimensions such as in a torus or toroid connected computer.

Using rings in two dimensions, an alternative approach is to implement Allreduce using a reduce scatter collective followed by an Allgather collective. A paper authored by Jain and Sabharwal entitled "Optimal Bucket Algorithms for large MPI collectives on torus interconnects" (ICS' 10, June 2-4, Tsukuba) presents bucket based algorithms for Allgather, reduce-scatter and Allreduce collectives assuming bi-directional links between processing nodes in a torus interconnected processor. This approach operates on the basis that there are multiple data values (fragments) to be handled in each step. In the reduce-scatter collective, each process starts with an initial partial vector. It is assumed that a reference here to a process is to a process carried out on a processing node. A partial vector can be divided into multiple elements or fragments. The corresponding elements of all processes are reduced, and these reduced elements are then distributed across the processes. In the Allgather collective, every process receives all elements from all other processes. The reduce-scatter collective reduces all partials and stores each reduction on a respective node—see FIG. 8. The Allreduce collective operation can be implemented by performing a reduce-scatter collective followed by an Allgather collective operation.

Computer networks can be formed by interconnecting processors (sometimes referred to herein as processing nodes) in certain configurations. One particular goal is to obtain maximum link utilisation, that is to supply traffic to the maximum bandwidth available of links which are used to connect the processors. It is often the case that certain software applications may exchange data between processing nodes in a manner which does not necessarily attain this goal. In that case, links may remain unutilised for periods of time. For certain kinds of links (which remain powered up whether or not they are utilised), this is disadvantageous.

Computer networks may be designed to operate as a work accelerator for receiving a workload from a host running an application. One type of workload may be a machine learning graph comprising a set of vertices and edges. When compiling a graph for implementation on a computer network, it is desirable to minimise the constraints which are placed by the programmer or compiler when compiling such vertices onto the processors.

As discussed in Jain's paper, torus interconnects are attractive interconnection architectures for distributed memory supercomputers. In the above discussion, collectives have been explained in the context of communication between processes. In a distributed super computer, processing nodes are interconnected, and each processing node may be responsible for one or more process in the context of collectives. A torus interconnect is a type of mesh interconnect with processing nodes arranged in an array of N dimensions, with each node connected to its nearest neighbours, and corresponding nodes on opposite edges of the array also connected. Bi-directional communication links exist between interconnected processing nodes.

The algorithms for implementing collectives which are discussed in the above-referenced paper authored by Jain and Sabharwal are applied on torus connected architectures. This allows the collectives to process different fragments of the vectors in rings in different dimensions at the same time, making the process bandwidth efficient.

An objective of the present disclosure is to present an improved topology and method for implementing an Allreduce function for a set of interconnected processors, particularly but not exclusively for use in processing functions in machine learning, While the topologies and configurations described herein are particularly effective for the efficient implementation of Allreduce, they may also be advantageously used for other machine learning collectives and other types of parallel programs.

SUMMARY

According to an aspect of the present disclosure there is provided a network comprising interconnected first and second processors, each processor comprising one or more of the following aspects alone or in combination:
- a plurality of processing units arranged on a chip, each configured to execute program code;
- an on-chip interconnect arranged to enable the program code run on the processing units to exchange data between the processing units, wherein the on-chip interconnect comprises multiple groups of exchange paths, each group connected to receive data from a corresponding group of the processing units;
- a plurality of external interfaces configured to communicate data off chip in the form of packets, each packet having a destination address identifying a destination of the packet, a first external interface of the first processor being connected by an external link to a corresponding first external interface of the second processor;
- a plurality of exchange blocks, each exchange block connected to one or more groups of the exchange paths for exchanging data between the exchange block and those exchange paths;
- a routing bus configured to route packets between the exchange blocks and the external interfaces;
- wherein processing units of the first processor are configured to generate off chip packets addressed to processing units of the second processor such that the group of processing units serviced by the first exchange block on the first processor are configured to address off chip packets to the group of processing units on the second processor serviced by the corresponding first exchange block of the second processor.

In some embodiments, each processor comprises eight exchange blocks in a first portion of the chip and eight exchange blocks in a second portion of the chip, wherein the on-chip interconnect extends between exchange blocks in the first portion and exchange blocks in the second portion. It will readily be appreciated that the number eight is given by way of example, and other numbers of exchange blocks are possible.

The processing units are configured to generate packets addressed to processing units of the second processor such that processing units serviced by each exchange block of the first processor transmit off-chip packets addressed only to processing units serviced by the corresponding exchange blocks of the second processor.

The routing bus may be configured to route packets from certain exchange blocks only to certain external interfaces. It may be configured to trap as an error packets which are incorrectly addressed, for example by comparing an address of a packet with routing requirements in a routing register. The routing bus may have multiple lanes, each lane being unidirectional. For example, in a chip with North, South, East and West portions each lane may be southgoing or northgoing. The routing bus may have ingress and egress ports at each exchange block, or only some exchange blocks, for incoming and outgoing packets. The routing bus may have ingress and egress ports at each, or only some, external interface.

The first processing node may have additional external interfaces connected to corresponding additional processors. For example, the first processor may have a second interface for connecting to a third processor. The first and second interfaces may lie in the second portion of the chip. The chip may lie in an orientation relative to other chips such that the second interface is connected to a third processor in a southern orientation relative to the first processor.

The first processor may have a third external interface which is connected to a fourth processor in a southern orientation with respect to the first processor.

In this context, North and South refer to opposite portions of the chip, and not necessarily to an orientation in a compass North and South direction. 'North' and 'South' may be referred to herein as 'top' and 'bottom' respectively. Therefore, in a chip with top, bottom, left and right portions corresponding with respective edges of the chip a lane may be southgoing, i.e. going from the top edge to the bottom edge or northgoing, i.e. going from a bottom portion to a top portion. The routing bus may have ingress and egress ports at each exchange block, or only some exchange blocks, for incoming and outgoing packets.

The first and second portions of the chip containing the first and second sets of exchange blocks may be referred to herein as the Western and Eastern portions, oriented relative to the Northern and Southern portions of the chip. 'East' and 'West' may also be referred to herein as 'right' and 'left' respectively.

In some embodiments, packets sourced by exchange blocks in the Northern portion of the chip may only be addressed to processors connected to the East or South of that chip. Packets sourced by exchange blocks on the South portion of the chip may only be addressed to processors connected to the East or North of that chip.

In other words, in some embodiments, the packets sourced by exchange blocks in the top portion of a chip are only addressed to processors connected to right or bottom of that chip and packets sourced by exchange blocks on the bottom portion of the chip are only addressed to processors connected to the right or top of that chip.

Packets sourced by the first processor may only be addressed to a processor in the network connected to it (for example the second, third or fourth processors where all these processors are connected to the first processor). Even if the case where the network comprises other processors—for example, fifth and sixth processors may be connected to either one of the second, third or fourth processors, packets sourced by the first processor may only be addressed to one of the second, third and fourth processors that are physically connected to it.

This may be achieved by allocating logical identifiers to be allocated to each of the second, third and fourth processors which are connected to the first processor, wherein the first processor may only address packets to these logical identifiers.

In a network which has additional interconnected processors, each processor may operate a routing domain having logical identifiers which identify only the processor physically connected to that particular processor. In some configurations, each processor may have three processors connected directly to it and use logical identifiers 0 to 3 to identify itself and each of those three processors.

In a large network, with multiple interconnected processors, each logical identifier may be mapped to the physical identifier of a processor.

In some embodiments, a card may carry two chips, each chip comprising a processor. A first chip may be oriented in a first orientation in which northern and southern portions of the chip have respective interfaces on the western portion for connection externally of the card and respective interfaces on the eastern portion for connections internally of the card. The second processor may be oriented in a reverse orientation such that its northern portion aligns with the southern portion of the first processor and its southern portion aligns with the northern portion of the first processor. In this way, the eastern portion of the second processor is adjacent the eastern portion of the first processor allowing for ready interconnection across the eastern portions. The interfaces on the western portion of each of the first and second processors may be reserved for connections externally of the card. In one embodiment, at least one of the interfaces on each western portion may be available for connection to a host. The processors may be configured identically in relation to their internal routing protocols and arrangements of routing bus/link controllers and exchange blocks. In a computer network, multiple cards may be provided. In some embodiments, processors oriented in a first orientation are assigned even numbers and processors oriented in the reverse orientation are assigned odd numbers. Cards may be connected using external interfaces of the processors on the respective western edges.

The above aspects and embodiments may be utilised in the computer networks according to aspects discussed herein.

According to another aspect of the disclosure there is provided a computer comprising a plurality of interconnected processing nodes arranged in a configuration with multiple stacked layers, each layer comprising three processing nodes connected by respective links between the processing nodes, wherein:
  in end layers of the stack the three processing nodes are interconnected by two links adapted to operate simultaneously;
  in central layers of the stack the three processing nodes are interconnected by single link; and
  processing nodes in each layer are connected to respective corresponding nodes in each adjacent layer by two links adapted to operate simultaneously.

A processing node in the configuration may be programmed to transmit data along three embedded one-dimensional logical rings, each logical ring using a set of processing nodes of this configuration in such a manner that three embedded one-dimensional logical rings operate simultaneously.

The configuration can be utilised to implement the Allreduce collective in a manner as herein described.

According to another aspect of the disclosure, there is provided a computer comprising a plurality of interconnected processing nodes arranged in a configuration with multiple stacked layers, each layer comprising four processing nodes connected by respective links between the processing notes, wherein:
  in end layers of the stack, the four processing nodes are interconnected in a ring formation by two links between the nodes, the two links adapted to operate simultaneously;

processing nodes in the multiple stacked layers provide four faces, each face comprising multiple layers, each layer comprising a pair of processing nodes;
  wherein the processing nodes are programmed to operate a configuration to transmit data along embedded one-dimensional rings, each ring formed by processing nodes in two opposing faces.

Broadly, aspects of the inventions provide configurations of interconnected processing nodes in which faces of a configuration are formed by stacked layers of pairs of nodes and enable one-dimensional rings to be embedded in the faces. In the ladder configuration there is a single face, in the triangular configurations there are three faces, and in the box tube structure there are four faces.

Each processing node may comprise memory configured to store an array of data items ready to be exchanged in the reduce scatter phase, wherein each data item is respectively positioned in the array with corresponding data items being respectively positioned at corresponding locations in the arrays of other processing nodes. The array may be a "partial" (a vector of partial results) or a "result" (a vector of fully reduced partials).

The processing nodes may each be programmed to transmit data items in a forwards direction to its adjacent processing node in each ring the reduce-scatter phase. The data items which may be transmitted in each step are termed a "fragment". A fragment is piece of the vector—as described herein, vectors are divided into fragments to make use of logical rings formed in the embedded rings.

Each array may represent at least part of a vector of partial deltas, each partial delta representing an adjustment to a value stored at each processing node. Each processing node may be programmed to generate the vector of partial deltas in a compute step. Each processing node may programmed to divide its vector into two sub arrays for respective utilisation of the two embedded rings.

Another aspect of the disclosure provides a computer comprising a plurality of interconnected processing nodes arranged in a configuration of multiple stacked layers of processing nodes forming a multi-face prism;
  wherein each face of the prism comprises multiple stacked pairs of processing nodes, wherein the processing nodes of each pair are connected by at least two intralayer links, and the processing node of each pair is connected to a corresponding processing node in an adjacent pair by at least one interlayer link wherein the corresponding processing nodes are connected by respective interlayer links to form respective edges of the configuration: and
  wherein each pair of processing nodes forms part of one of the layers of the configuration, each layer comprising multiple processing nodes, each processing node connected to their neighbouring processing nodes in the layer by at least one of the intralayer links to form a ring;
  wherein the multiple stacked layers comprise first and second endmost layers, and at least one intermediate layer,
  wherein the processing nodes are programmed to operate the configuration to transmit data along each of a plurality of one dimensional paths formed by respective sets of processing nodes and links, each one dimensional path having a first portion between the first and second endmost layers using all processing nodes in one of the faces of the configuration only once, and a second portion provided between the second and first endmost layers and comprising one of the edges of the configuration.

In one embodiment the multi-face prism has three processing nodes in each layer, providing three respective faces for the first portion of respective one-dimensional paths.

In some embodiments in the at least one intermediate layer each processing node is connected to its neighbouring processing node by two interlayer links.

In the first and second endmost layers each processing node may be connected to its neighbouring processing node by three interlayer links to enable the simultaneous transmission of data on three one dimensional paths in the configuration.

The computer may be configured from a multi-face prism comprising a set of stacked layers, the processing nodes of each stacked layer having an interlayer link to a corresponding processing node in an adjacent stacked layer and an interlayer link between neighbouring processing nodes in the layer, by disconnecting each interlayer link in a designated stacked layer and connecting it to a neighbouring processing node in the designated stacked layer to provide an intralayer link whereby the designated stacked layer forms one of the first and second endmost layers.

Each of the processing nodes may be programmed to identify one of their interlayer and intralayer links to transmit data in order to determine the one-dimensional path for that data. This may use a link identifier comprising a logical or physical identifier of another processing node. This can be achieved by a local node level program containing an appropriate instruction to define a data transmission stage.

Each of the processing nodes may be programmed to deactivate any of its interlayer and intralayer links which are unused in a data transmission step.

Each processing node may be programmed to divide a respective partial vector of that node into fragments and to transmit the data in the form of successive fragments around each one-dimensional path.

The computer may be programmed to operate each path as a set of logical rings, wherein the successive fragments are transmitted along each logical ring in simultaneous transmission steps.

Each processing node may be configured to output a respective fragment on each of two links simultaneously.

Each processing node may be configured to reduce multiple e.g. two incoming fragments with multiple, e.g. two respective corresponding locally stored fragments.

Each processing node may be configured to transmit fully reduced fragments on each of two links simultaneously in an Allgather phase of an Allreduce collective.

In some embodiments, some or all links are bi-directional, that is they can transmit data in both directions over the link, optionally at the same time.

Another aspect of the disclosure provides a method of generating a set of programs to be executed in parallel on a computer comprising a plurality of processing nodes connected in a configuration comprising a multi-face prism;

wherein each face of the prism comprises multiple stacked pairs of processing nodes, wherein the processing nodes of each pair are connected to each other by at least two interlayer links, and the processing node of each pair is connected to a corresponding processing node in an adjacent pair by at least one interlayer link wherein the corresponding processing nodes are connected by respective interlayer links to form respective edges of the configuration; and wherein each pair of processing nodes forms part of one of the layers of the configuration, each layer comprising multiple processing nodes, each processing node connected to their neighbouring processing nodes in the layer by at least one of the intralayer links to form a ring;

wherein the multiple stacked layers comprise first and second endmost layers, and at least one intermediate layer, the method comprising:

generating at least one data transmission instruction for each program to define a data transmission stage in which data is transmitted from the processing node executing that program, wherein the data transmission instruction comprises a link identifier which defines an outgoing link on which data is to be transmitted in that data transmission stage; and determining the link identifiers in order to transmit data along each of a plurality of one dimensional paths formed by respective sets of processing nodes and links, each one dimensional path having a first portion between the first and second endmost layers using all processing nodes in one of the faces of the configuration only once, and a second portion provided between the second and first endmost layers and comprising one of the edges of the configuration.

The link identifier may be a physical or logical identifier of another processing node in the network.

In some embodiments each program comprises one or more instruction to deactivate any of its interlayer and intralayer links which are unused in a data transmission step.

In some embodiments each program comprises one or more instruction to divide a respective partial vector of the processing node on which that program is executed into fragments and to transmit the data in the form of successive fragments over the respectively defined link.

In some embodiments each program comprises one or more instruction to output a respective fragment on each of two links simultaneously.

In some embodiments each program comprises one or more instruction to reduce multiple, e.g two incoming fragments with multiple, e.g two respective corresponding locally stored fragments.

In some embodiments each program comprises one or more instruction to transmit fully reduced fragments on each of two links simultaneously in an Allgather phase of an Allreduce collective.

Another aspect of the disclosure provides a method of executing a set of programs in parallel on a computer comprising a plurality of processing nodes connected in a configuration comprising a multi-face prism;

wherein each face of the prism comprises multiple stacked pairs of processing nodes, wherein the processing nodes of each pair are connected to each other by at least two intralayer links, and the processing node of each pair is connected to a corresponding processing node in an adjacent pair by at least one interlayer link wherein the corresponding processing nodes are connected by respective interlayer links to form respective edges of the configuration; and wherein each pair of processing nodes forms part of one of the layers of the configuration, each layer comprising multiple processing nodes, each processing node connected to their neighbouring processing nodes in the layer by at least one of the intralayer links to form a ring;

wherein the multiple stacked layers comprise first and second endmost layers, and at least one intermediate layer, the method comprising:

executing at least one data transmission instruction in each program to define a data transmission stage in which data is transmitted from the processing node executing that program, wherein the data transmission instruction comprises a link identifier which defines an outgoing link on which data is to be transmitted in that data transmission stage;

the link identifiers having been determined in order to transmit data along each of a plurality of one dimensional paths formed by respective sets of processing nodes and links, each one dimensional path having a first portion between the first and second endmost layers using all processing nodes in one of the faces of the configuration only once, and a second portion provided between the second and first endmost layers and comprising one of the edges of the configuration.

In some embodiments executing the programs operates each path as a set of logical rings, wherein successive fragments of a partial vector provided at each processing node are transmitted around each logical ring in simultaneous transmission steps.

BRIEF DESCRIPTION OF THE DRAWINGS

For a better understanding of the present invention to show how the same may be carried into effect, reference will now be made by way of example to the accompanying drawings.

FIG. 2C is a schematic diagram of the physical and logical ID mapping for a cluster of IPUs in two chassis following a barley twist configuration.

FIG. 15 is a schematic illustration of a bulk synchronous parallel (BSP) computing model.

FIG. 16 is a schematic diagram of an arrangement for exchanging data between tiles.

FIG. 17 is a diagram showing the relative timing of issuing instructions on transmitting and receiving tiles.

DETAILED DESCRIPTION

Aspects of the present invention have been developed in the context of a multi-tile processor which is designed to act as an accelerator for machine learning workloads. The accelerator comprises a plurality of interconnected processing nodes. A processing node may also be referred to herein as a processor. Each processing node may be a single multi-tile chip, a package of multiple chips, or a rack of multiple packages. The aim herein is to devise a machine which is highly efficient at deterministic (repeatable) computation. Processing nodes are interconnected in a manner which enable collectives, especially broadcast and Allreduce, to be efficiently implemented.

One particular application is to update models when training a neural network using distributed processing. In this context, distributed processing utilises multiple processing nodes which are in different physical entities, such as chips or packages or racks. That is, the transmission of data between the processing nodes requires messages to be exchanged over physical links.

The challenges in developing a topology dedicated to machine learning differ from those in the general field of high performance computing (HPC) networks. HPC networks usually emphasise on demand asynchronous all-to-all personalised communication, so dynamic routing and bandwidth over-provisioning are normal. Excess bandwidth may be provisioned in a HPC network with the aim of reducing latency rather than to provide bandwidth. Over-provisioning of active communication links waste power which could contribute to compute performance. The most common type of link used in computing today draws power when it is active, whether or not it is being used to transmit data.

The present inventor has developed a machine topology which is particularly adapted to machine intelligence (MI) workloads, and addresses the following attributes of MI workloads.

In MI workloads, inter chip communication is currently dominated by broadcast and Allreduce collectives. The broadcast collective can be implemented by a scatter collective followed by an Allgather collective, and the Allreduce collective can be implemented by a reduce-scatter collective followed by an Allgather collective. In this context, the term inter-chip denotes any communication between processing nodes which are connected via external communication links. As mentioned, these processing nodes may be chips, packages or racks.

Note that the communication links could be between chips on a printed circuit board, or between chips on different printed circuit boards.

It is possible to compile the workloads such that within an individual intelligence processing unit (IPU) machine, all-to-all communication is primarily inter-chip.

Figure 1:
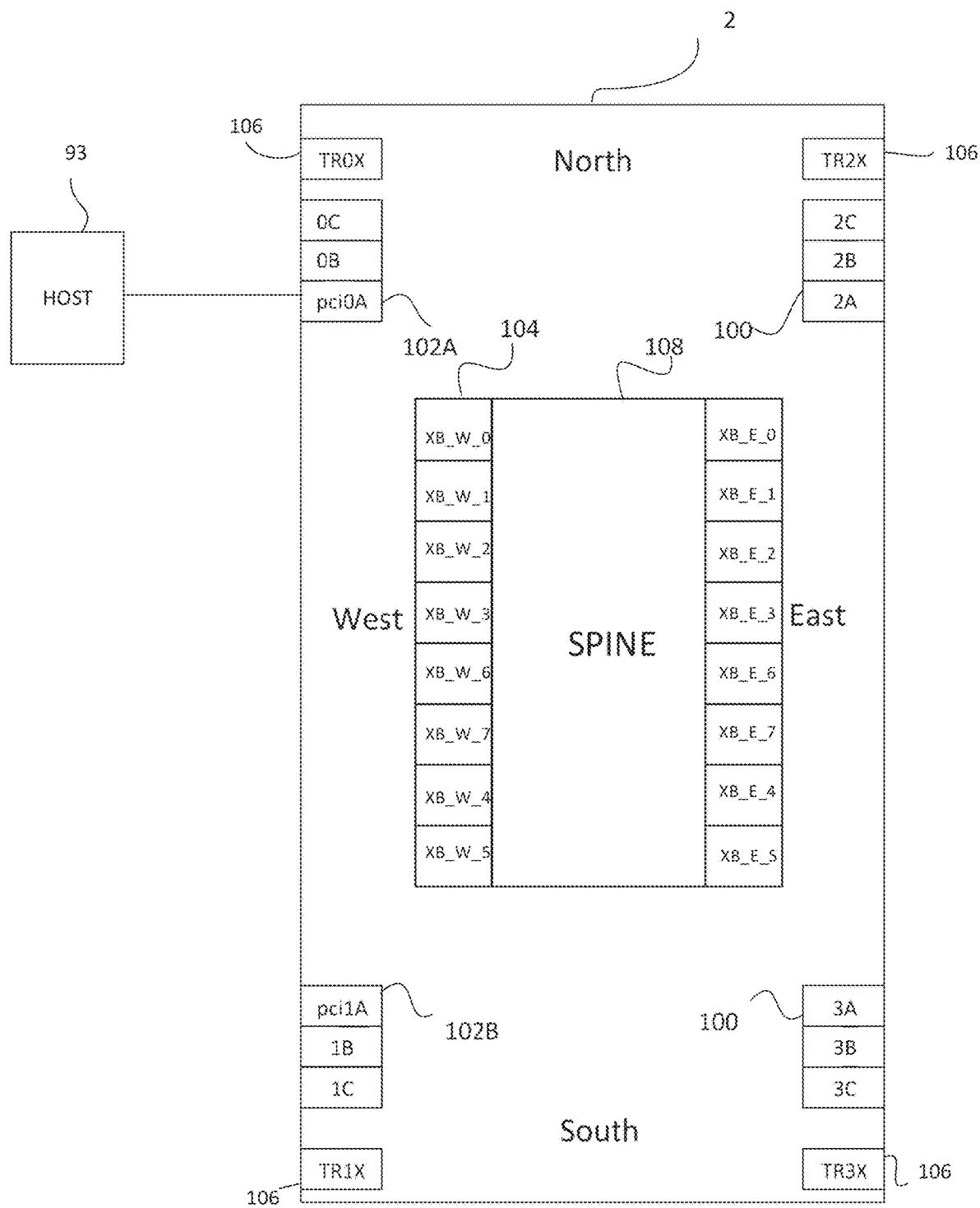
FIG. 1 is a schematic diagram of an IPU showing link interfaces and exchange blocks.

The following description relates to a processor that can be readily and effectively interconnected in a number of different network configurations. The processing unit may be of the type described in Graphcore patent applications Publication Nos. 20190121387 A1 [PWF ref: 408525US], US20190121388A1 [PWF ref: 408526US], and US20190121777A1 [PWF ref: 408527US], the contents of which are herein incorporated by reference. Such a processor may be referred to herein as IPU (Intelligence Processing Unit). FIG. 1 is a schematic diagram of a single IPU 2 connected to a host 93, which may be connected together with other IPUs in different network configurations. The IPU comprises multiple processing units, sometimes referred to as tiles.

Each IPU may be formed on a single integrated circuit (sometimes referred to herein as a chip or die) with different portions of the integrated circuit having different components of connection circuitry provided thereon. For example, the integrated circuit may have designated first and second portions. In some physical layouts, it may be possible to designate the first portion as a west portion, and the second portion as an east portion. In this case, these would correspond to compass axes in a particular integrated circuit layout, although it will readily be understood that there is no need for a particular physical orientation when the integrated circuit is used. What is important, however, is that the designations of the connection components in these portions may have certain particular functions. The integrated circuit may also have north and south portions designated to accommodate certain processing units of the integrated circuit and connection components. Thus, the terms north, south, east and west are used to denote portions of the integrated circuit that forms the IPU and may be used to designate certain connection functionality with other IPUs which have similar designated portions.

Inter-chip communication is carried out via link controllers which connect to the IPU at link interfaces 100. Communication with the host is carried out via interfaces which connect to the chip at a PCI complex. The IPU in FIG. 1 is oriented with north at the top and south at the bottom, but irrespective of its physical orientation, link interfaces of the IPU have certain connection designations. Link interfaces referenced 0C or 0B are said to be north interfaces. That is, an IPU connected to 0C or 0B of another IPU is said to be connected to its north. Similarly, an IPU connected to link interfaces corresponding to 1C or 1B are said to be connected to the south. The west and east portions of the IPU are defined relative to these definitions of north and south. The east portion comprises link interfaces 100, labelled 2A-C and 3A-C, which are described later, and the west portion contains the link interfaces 100, labelled 0B, 0C, 1B, 1C (for North and South connections) and primary and secondary PCI complexes 102A and 102B, which are used for host communication as described below. The IPU 2 also contains a spine 108 comprising an interconnect 34 described further herein with reference to FIGS. 6 and 16 and a bank of eight exchange blocks 104 along the west edge of the spine 108, labelled [XB_W_0:XB_W_7], and a bank of eight exchange blocks 104 along the east edge of the spine 108, labelled [XB_E_0:XB_E_7]. Each exchange block manages groups of exchange paths of the interconnect which interconnects the tiles, and mediates exchange traffic. The exchange traffic may comprise read and write requests to a PCI (host) domain and unicast and broadcast write requests to tiles on other IPUs.

Figure 2A:
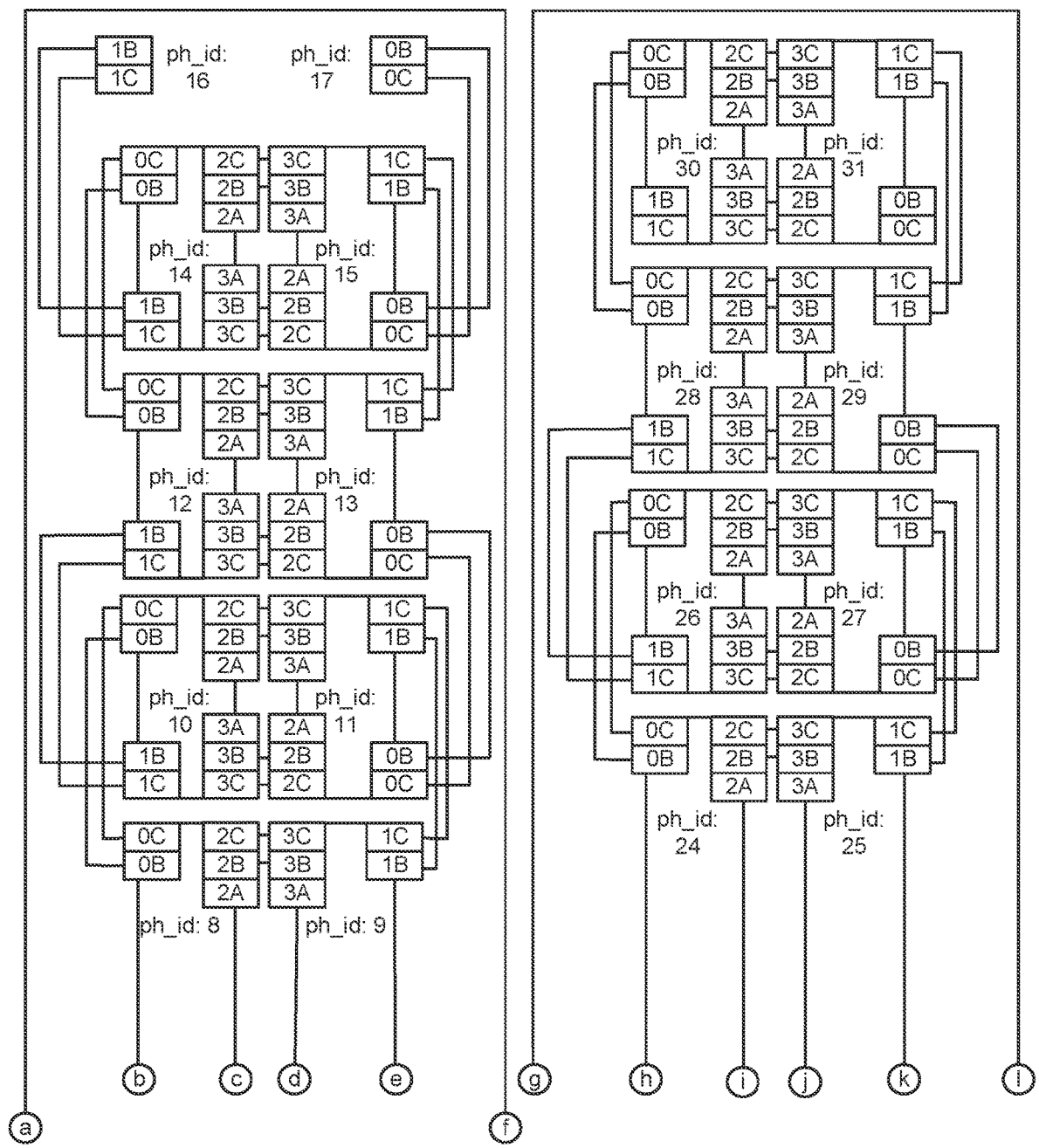
FIGS. 2A-2B are a schematic diagram showing the wiring of a cluster of IPUs contained in two chassis.
Figure 2B:
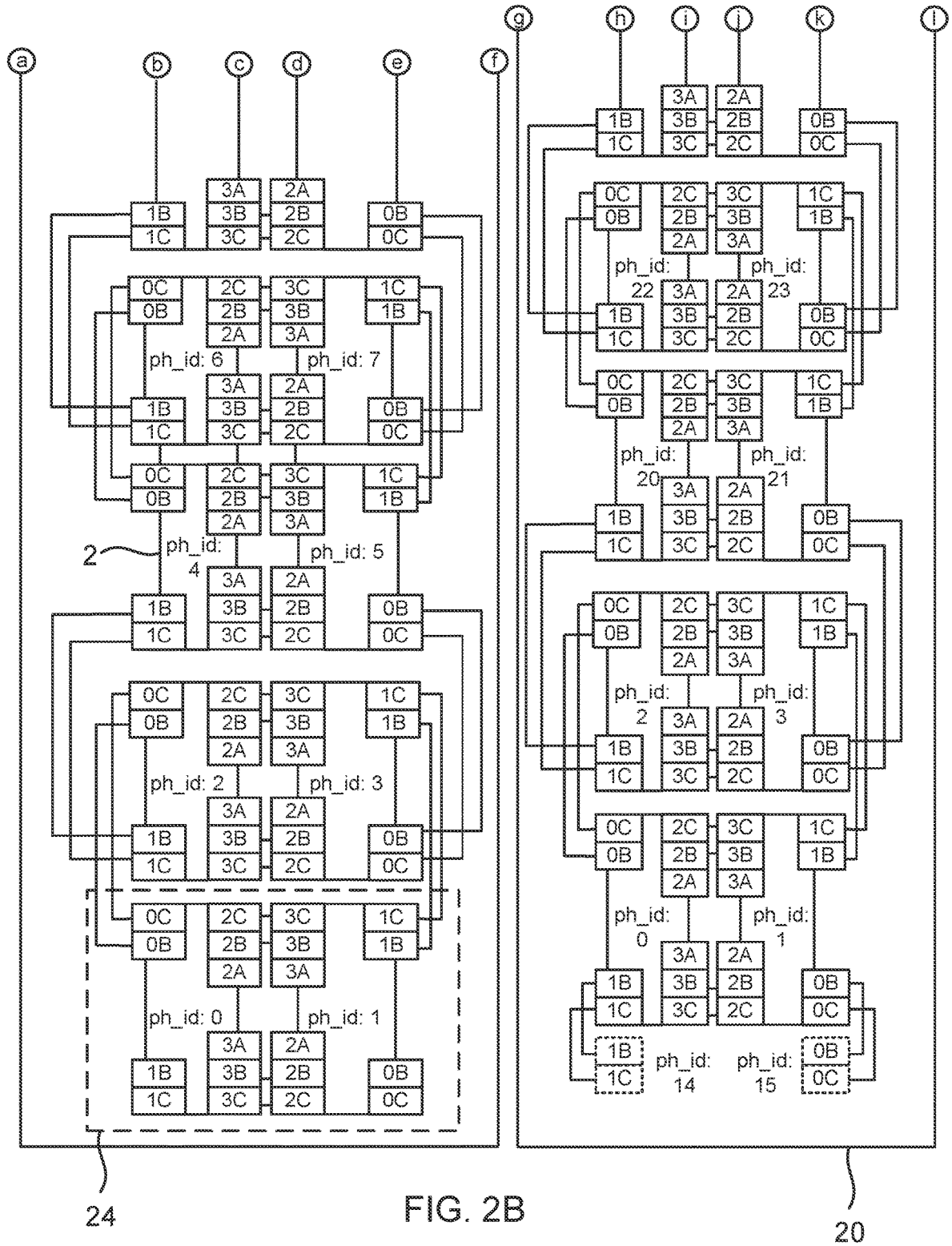

FIGS. 2A-2B show an example arrangement of IPUs 2 in a cluster comprising two chassis 20 stacked on top of each other. A cluster may comprise any suitable number n of chassis, for example up to eight, but embodiments described from this point on will be assumed to comprise two chassis stacked on top of each other. Each chassis comprises a suitable number m of cards 24. For example, m=four or eight. FIGS. 2A-2B show the cards 24 of chassis 0 and 1 on the left and right respectively for clarity. Within each chassis is a set of eight PCI cards 24, assigned card_id 0 to 7 from the bottom up. Each card comprises a number p of IPUs. In this embodiment, each card comprises two IPUs, with the left IPU on each card assigned col_id 0 and the right IPU assigned col_id 1. Each IPU is associated with a muting domain, which is the set of IPUs that the IPU can communicate with (including itself). A default configuration assigns physical IDs to IPUs such that the non-rotated IPU (ph_id 0 in FIGS. 2A-2B) on the south-most card in the chassis gets ph_id=0d, and the second IPU on that same card gets ph_id=1d. The IPUs on the second card get ph_ids 2d and 3d, and so on until the 8th card which gets ph_ids 14d and 15d. Therefore all the IPUs on the West side of the PCI card have even ph_ids and the IPUs on the East side of the PCI card have odd ph_ids. Each IPU's physical ID, ph_id, according to its position within the cluster, is given by the formula: ph_id=8*chassis_id+2*card_id+col_id.

Within the cluster, the link controllers at link interfaces 2B, 2C, 3B and 3C of each of the East edges of each of the two IPUs on the same card are connected. The West edge of each IPU 2 contains four link controllers that can be connected to the West edge of other IPUs. These West edge connections are made according to the following rules:

If ph_id %4 (modulo 4) is 1 or 2 for an IPU, then its north interfaces 0C and 0B are connected to those of the IPU directly below and its south interfaces 1B,1C are connected to those of the IPU directly above it. This can be seen in FIGS. 2A-2B, for IPUs with ph_ids 2, 6, 10, 14. The IPUs of the bottom card of the cluster only connect to IPUs of the card above.

The interconnects between multiple IPUs may be configured according to a 'Barley Twist' or ladder configuration described more fully below. Such a configuration may be used to perform a collective ring all-reduce function over a cluster of chips in the case where the whole model fits on each IPU and where the user occupies the full cluster. The Barley Twist configuration uses eight link interfaces per chip and it is nearest neighbour only, meaning that tiles within each IPU can only communicate with tiles of three other IPUs: the one directly above, below and to the side of it, and itself.

A cluster of two chassis is wired for the Barley Twist configuration according to FIGS. 2A-2B, with the exception that the link interfaces 2A and 3A on the East edge are not wired. On the West edges, the link interfaces 1B and 1C of ph_id 30 are connected to the corresponding link interfaces of ph_id 0 and the link interfaces 0B and 0C of ph_id 31 are connected to the corresponding link interfaces of ph_id 1. The topology of the linked cluster takes the form of a looped ladder.

In addition to physical addresses, each IPU is associated with a logical id according to the routing domain for IPUs within the Barley Twist configuration. Since each IPU can only communicate with its direct neighbours, the physical to logical address map follows the rule that no adjacent IPUs can have the same logical id (lo_id). The lo_ids thus run from 0 to 3 in a repeating 'T' pattern within the physical cluster. This is shown in FIG. 2C.

According to aspects of the present disclosure, the IPU communicates with a host connected to it only via the west side exchange blocks. Host communication uses two interfaces on the West edge of the IPU 2 which are connected via the PCI complexes—the primary PCI complex 102A is in the NW quadrant and the secondary PCI complex 102B is in the SW quadrant. Each PCI complex may comprise: a Control Port that allows the PCI connected host to initiate requests and receive response on a control bus; blacklist and whitelist registers accessed direct from the PCI Controller, a Host Exchange (HEX) subsystem which interfaces the PCI controller to the link interfaces; and a Host Sync Proxy (HSP) that provides for a host interface into the Global card to card sync mechanism. Further details of the host sync proxy are given in US Patent Application Publication No. US2020201412A1 [PWF Ref: 412568US], the contents of which are herein incorporated by reference.

Figure 3A:
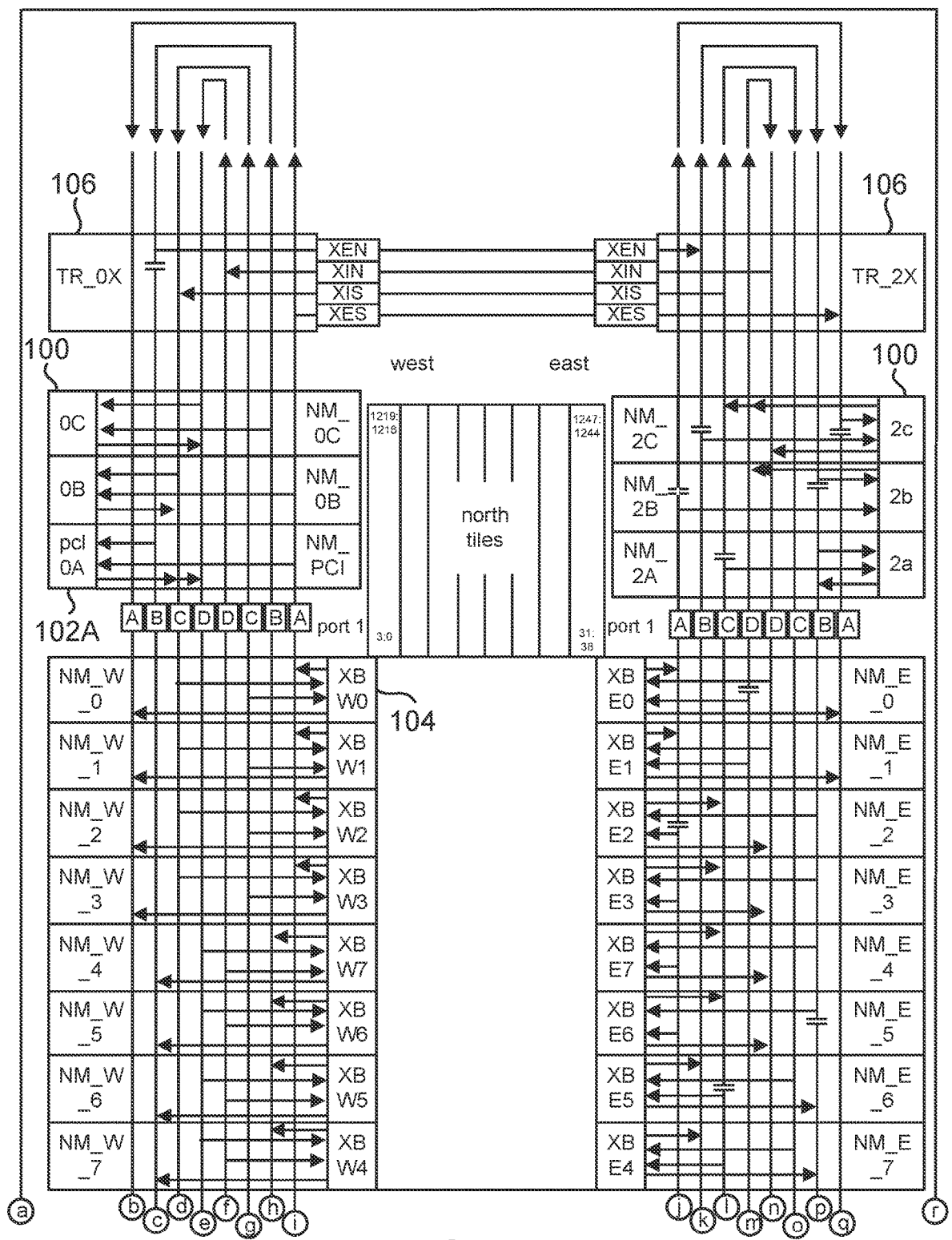
FIGS. 3A-3B are a schematic diagram showing the routing of packets on a single IPU within a default or sliding window configuration.
Figure 3B:
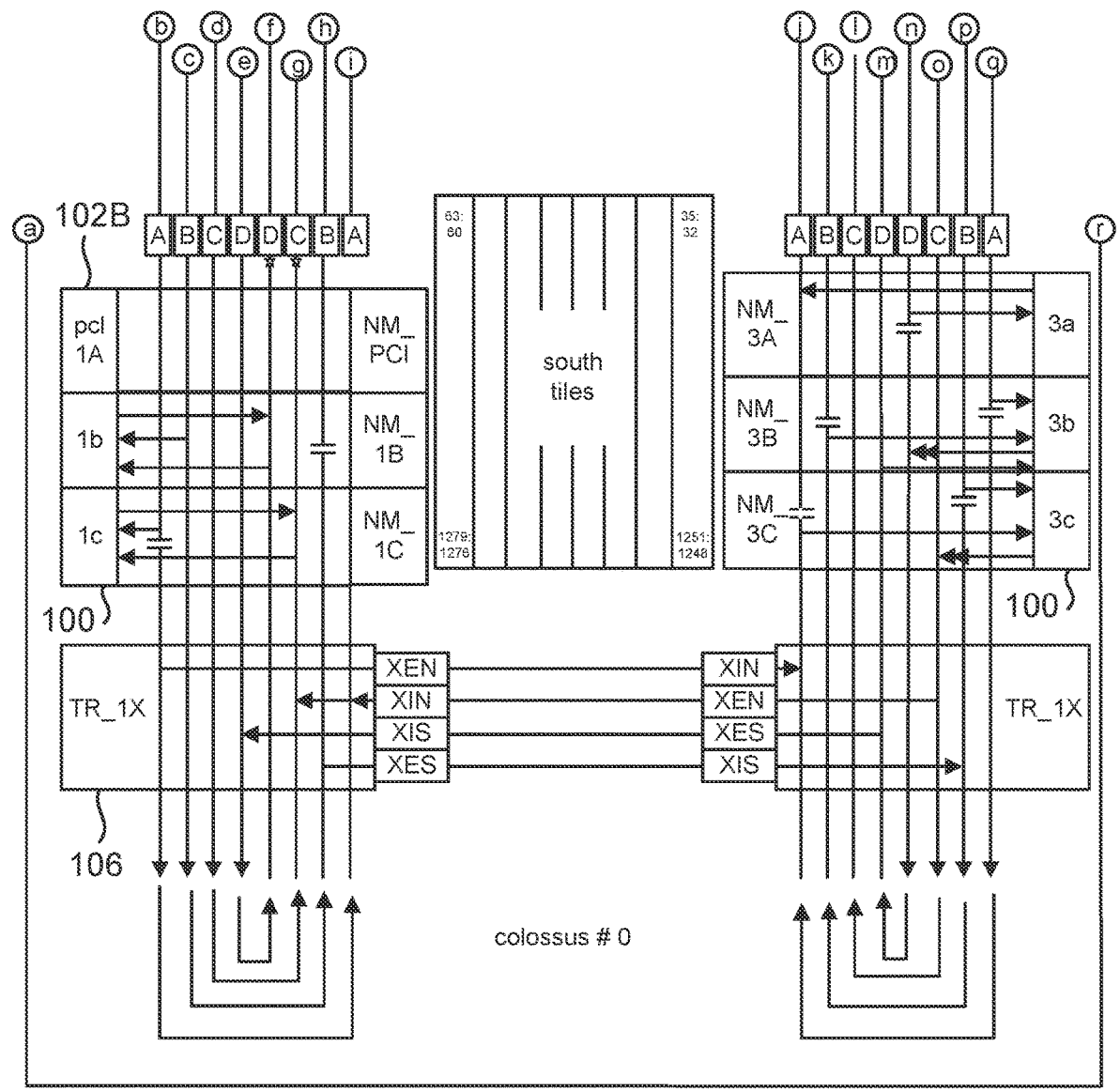

FIGS. 3A-3B show a default configuration of the exchange network enabling chip-to-chip communication between IPUs within a cluster such as the one shown in FIGS. 2A-2B. The constraints on routing between exchange components of the IPU according to this default configuration will not be described in detail. As shown in FIGS. 3A-3B, packets are routed on the East and West edges along four Northbound lanes and four Southbound lanes. Exchange blocks on both the East and West edges send and receive packets along the lanes as shown in FIGS. 3A-3B, with the bottom four exchange blocks on each edge using different lanes to the top four exchange blocks. Details of how data is routed within the exchange network will now be described with reference to the IPU exchange components shown in FIG. 1 and FIGS. 3A-3B.

The exchange network described further herein, which enables chip-to-chip communication, comprises trunk routers (TR) 106 that transport exchange packets and flow control information along the West edge and East edge, and link controllers which are provided at the link interfaces 100. Note that exchange blocks 104, link interfaces 100 and PCI complexes 102A, 102B may be referred to collectively herein as 'exchange components'. The trunk router 106 is a three port switch which carries eight lanes. Each lane has a certain direction relative to the IPU. There are four "Northbound" lanes and four "Southbound" lanes. A Northbound lane carries traffic from the south portion of the chip to the north portion of the chip. A Southbound lane carries traffic from the north portion of the chip to the south portion of the chip. That is, each lane is uni-directional.

A trunk router 106 carries four 128-bit lanes north and another four lanes south. These lanes are ELinks, where ELink is a bus used to carry packets between components of the chip-to-chip exchange network comprising exchange blocks, link controllers and PCI complexes. ELink packets may be one of three packet types: ELink Tile Write (ETWR), ELink PCI Write (EPWR) and ELink PCI Read (EPRD).

The link controller is a PCI controller specialised to carry ELink packets over a PCI link with minimal modification to the ELink packet contents to render them as PCI compliant as possible and without loss of information required to route the packets. Each link controller comprises a PCI subsystem and logic to connect the PCI subsystem to the appropriate trunk router lane or lanes.

Each exchange block, PCI complex and link controller in the exchange network has a dedicated trunk router which delivers traffic to and accepts traffic from that component. An additional trunk router is instanced in each of the four corners of the IPU (labelled TR0X, TR1X, TR2X, TR3X). Traffic moves between an exchange component and the set of trunk routers via exchange ports. Traffic moves between neighbouring trunk routers via trunk ports. The four additional trunk routers are instanced such that the trunk ports, which would otherwise be left dangling at the top and bottom of the west and east edge trunks are looped back such that for example, the north going 128-bit lane 'A' trunk egress port of the last trunk router is looped back to the 128-bit south going lane 'A' trunk ingress port of the same trunk router, and likewise for lanes B, C and D. The exchange ports of these corner trunk routers, which would normally connect to an attached exchange component are instead connected to the corresponding exchange ports of the corner trunk routers of the chip edge directly opposite.

The chip-to-chip exchange network may only route ELink packets, and only ELink Tile Write (ETWR) packets may be transportable across links between IPUs. Packets which traverse links between IPUs use PCI Vendor Defined Messages (VDM). PCI packets are automatically translated to ELink packets and vice versa when they cross between the inter-chip domain and a PCI domain. ETWR packets are transported off-chip via the link controllers and on-chip by the ELinks and trunk routers.

ETWR packets have attributes which enable routing, which may comprise the following:
  A sixteen-bit broadcast bitmap which identifies the destination IPU of the packet so as to support multicast.
  An eleven-bit TILE ID identifying the final destination tile of the packet. This is described in more detail with reference to FIGS. 6A-6B.
  A four-bit source ID identifying the sending IPU and an eleven-bit source tile ID identifying the sending tile. This may be required for debugging purposes.

The trunk router may comprise:
  Four ELink ingress interfaces on its south edge, which connect via buffering to four ELink egress interfaces on its north edge.
  Four ELink Ingress interfaces on its north edge which connect via buffering to four ELink egress interfaces on its south edge.
  Two exchange ingress/egress interfaces which are also ELinks, connected to the exchange component, one for each of north and south.

ETWR packets are routed using bits 5:3 of the tile ID, which route the packet to a specific exchange block, and EPWR and EPRD tiles are routed using the MSB (most significant bit) of the ELink PCI address, which routes the packet to one of the two PCI complexes. Packets are routable between up to sixteen IPUs. Multicast and broadcast is supported using a broadcast bitmap field of an ETWR packet, enabling a given tile to multicast or broadcast a packet to a single specified tile on one, some, or all IPUs in an exchange network.

Traffic may be injected into the trunk via the exchange ingress interfaces and routed onto any of the four lanes in the given direction based on routing tables provided for the trunk router. Traffic may only leave the trunk via the exchange egress interface from one of the four lanes, based on a static configuration of the routing tables.

An egress interface on the south edge of a given trunk router may connect to the corresponding ingress interface on the north edge of the next trunk router via abutment or a vertical upper layer wiring channel to a distant trunk router. Likewise for north edge egress interfaces and south edge ingress interfaces. Traffic may not cross lanes in the trunk router, but stays within a given lane until consumed by an exchange component.

Trunk routers comprise a number of control registers, including registers for routing. These registers and their respective uses are summarised in Table 1.

TABLE 1

| Register Name | Description |
| --- | --- |
| Control and Status Register (CSR) | Control and status settings for the trunk router. |
| Exchange Egress Routing Register (XEGRNR) | North Routing configuration for northbound traffic leaving he trunk router. |
| Exchange Egress Routing South Register (XEGRSR) | Routing configuration for southbound traffic leaving the trunk router. |
| Exchange Ingress Lane Routing Register (XIGLRR) | Routing configuration for ingress traffic entering the trunk router from the attached component. |

The trunk router may also comprise a plurality of error record registers, each of which records a respective set of bytes of the ELink header of bad packets.

The egress routing registers for both north and south may comprise a 'tile match enable' field to enable tile ID matching, an 'IPU match enable' field to enable IPU ID matching, and fields 'TILEBM' and 'IPUBM' which hold a tile ID match bitmap and IPU ID match bitmap for egress respectively.

The ingress routing register include north and south 'tile match enable' fields which enable tile ID matching for traffic entering via ingress exchange port on the north and south edges, respectively. The ingress routing register also includes a 'no match enable' which specifies the use of a 'no tile match' lane if there is no tile match. The ingress routing register also contains a field 'TID{N}LANE' for each tile ID, comprising two bits which define which of the four lanes a packet with that tile ID should be assigned.

All packets entering a trunk port must have had the north/south routing determination made in the connected exchange component, in order that the packet enters the trunk router on the correct ingress interface.

For ingress routing, to determine the lane an EPRD or EPWR packet is placed onto, a 'PCI lane' field of the ingress lane routing register specifies the lane to use, regardless of whether the packet arrived on the north or south ingress port.

For ETWR packets, a routing determination is made at the point of ingress to the trunk router for each of the four lanes simultaneously as follows:

For a packet arriving at the trunk router's north or south exchange ingress port, if the relevant 'tile match enable' field of the ingress lane routing register is set then the lane the packet routes to is specified in the 'TID{N}LANE' where N is equal to bits 5:3 of the packet's tile ID. The value in the TID{N}LANE field specifies lane A if 00b, lane B if 01b, lane C if 10b and lane D if 11b.

If the above condition is not met then if the 'no match enable' field is set, the packet routes to the lane specified in the 'no tile match lane' field.

If neither of the above conditions is met, then this is an error case. An error is raised with the error status 'IGNOMATCH', the error bit of the trunk router's control and status register is set, the error code is set to 'UR' and error status bits of the control and status register are set to 'IGNOMATCH', and the packet header is saved in error record registers of the trunk router.

For egress routing, separate registers may be used for north and south going traffic as follows:

Traffic traveling north (that is, from any ingress port on the south edge of the trunk router towards any egress port on the north edge) uses the contents of XEGRNR. Because traffic traveling north passes the xes (south exchange egress) port first, north going traffic that matches for egress exits via xes.

Traffic traveling south (that is, from any north ingress trunk port of the TR towards any south egress trunk port) uses the contents of the XEGRSR. Because traffic traveling south passes the xen (north exchange egress) port first, south going traffic that matches for egress exits via xen.

EPRD or EPWR packets entering the trunk router from north trunk ports always egress from the Trunk via xen if 'PCIEG' is 1b AND the packet is on the lane which matches 'EGLANE' of XEGRNR. If both these conditions do not hold then the packet shall be muted to the opposite trunk port. This applies to packets entering from south trunk ports with the corresponding fields of XEGRSR.

ETWR packets may exit a trunk router via the appropriate trunk router egress interfaces or may route to the opposing side of the trunk router if there is no egress routing match, or both in the case of a multicast packet. A routing determination must be made to select one of these options at the point of ingress to the trunk router. Please note that references to fields below refer to fields of XEGRNR or XEGRSR as appropriate, depending on the entry of the given packet via north or south trunk ports. If the 'EGLANE' field of XEGRNR/XEGRSR is set to the same lane the packet is on then it may exit the trunk to an exchange egress port via the following mechanism:

If 'TILEMEN' is set, the one-hot expansion of bits 5:3 of the packet's tile ID AND-ed with 'TILEBM' (the tile ID Match Bitmap) then OR-reduced must evaluate to 1b for the packet generate an Egress Tile Match, i.e. bits 5:3 of the packet's tile ID should correspond to the TILEBM field to generate a tile match.

If 'IPUMEN' is set, the packet's BC Bitmap field AND-ed with 'IPUBM' then OR-reduced must evaluate to 1b for the packet to generate an Egress IPU Match.

if 'TILEMEN' and 'IPUMEN' are set then both a tile match and an IPU match must be valid in order for the packet to qualify for egress routing here.

If neither of these conditions is true and/or the packet is on the wrong lane (as per the EGLANE field setting) then the packet shall route to the opposing trunk port.

Packets that egress to endpoints must have their BC Bitmap field adjusted to clear the bits which correspond to those which are set in the 'IPUBM field' as follows:

bcbitmap_egress[15:0]=packet.bcbitmap & IPUBM

Following the operation above, the operation below will confirm whether the packet should also route to the opposite trunk egress port. If any bits of bcbitmap_onward are set the packet must also route to the opposing trunk egress port, with a bcbitmap field equal to that derived in bcbitmap_onward:

bcbitmap_onward[15:0]=packet.bcbitmap & ~bcbitmap_egress.

Link controllers and exchange blocks also comprise control registers, including an exchange egress routing direction register (XERDR) which defines how packets leaving the link controller for the trunk with a given broadcast bitmap are routed north, south, or both. This register comprises a sixteen-bit 'NORTH' field, where each bit corresponds to one IPU ID and if the bit for that ID is set then packets for that ID should be routed north. The exchange egress routing direction register also includes a sixteen-bit field 'SOUTH', where each bit set corresponds to one IPU ID and if the bit for that ID is set then packets for that ID should be routed south.

The exchange network routes packets through the IPU to other interconnected IPUs to form multi-chip networks with all-to-all capability, also providing for any tile to be able to communicate with any tile on another IPU device and for any tile to communicate with the host's PCI domain. All tiles can be accessed by posted writes from the host to boot the IPU.

Only ETWR packets are transportable across link interfaces between different IPUs. PCI packets are automatically translated to ELink packets and vice versa when they cross between the chip domain and a PCI domain. Packets may be generated with addresses to route them to off chip tiles, for example using bits of tile identifier. Note that there is no need in some embodiments to provide addresses for inter tile traffic within a single IPU—a time deterministic exchange may be used as the interconnect within an IPU.

As discussed above, multicast and broadcast is supported using a sixteen bit broadcast bitmap field of an ETWR packet, which identifies the destination IPU of the packet and thus enables a given tile to multicast or broadcast a packet to a single specified tile on one, some or all IPUs in a routing domain (i.e. the set of IPUs a given IPU can communicate with). The exchange of data between tiles is later described in more detail with reference to FIG. 16.

The sixteen bit broadcast bitmap allows identification of any of sixteen IPUs as a destination for a given packet. In an example configuration in which all IPUs within a cluster of thirty-two IPUs held on sixteen cards divided into two chassis, a multicast packet originating from any IPU in a given chassis with broadcast bitmap '0110000000001111b' will visit IPUs 14,13,3,2,1 and 0 of that chassis corresponding to the bits of the bitmap containing 1s. The broadcast bitmap may be subject to constraints imposed by the configuration, as described below.

Figure 4:
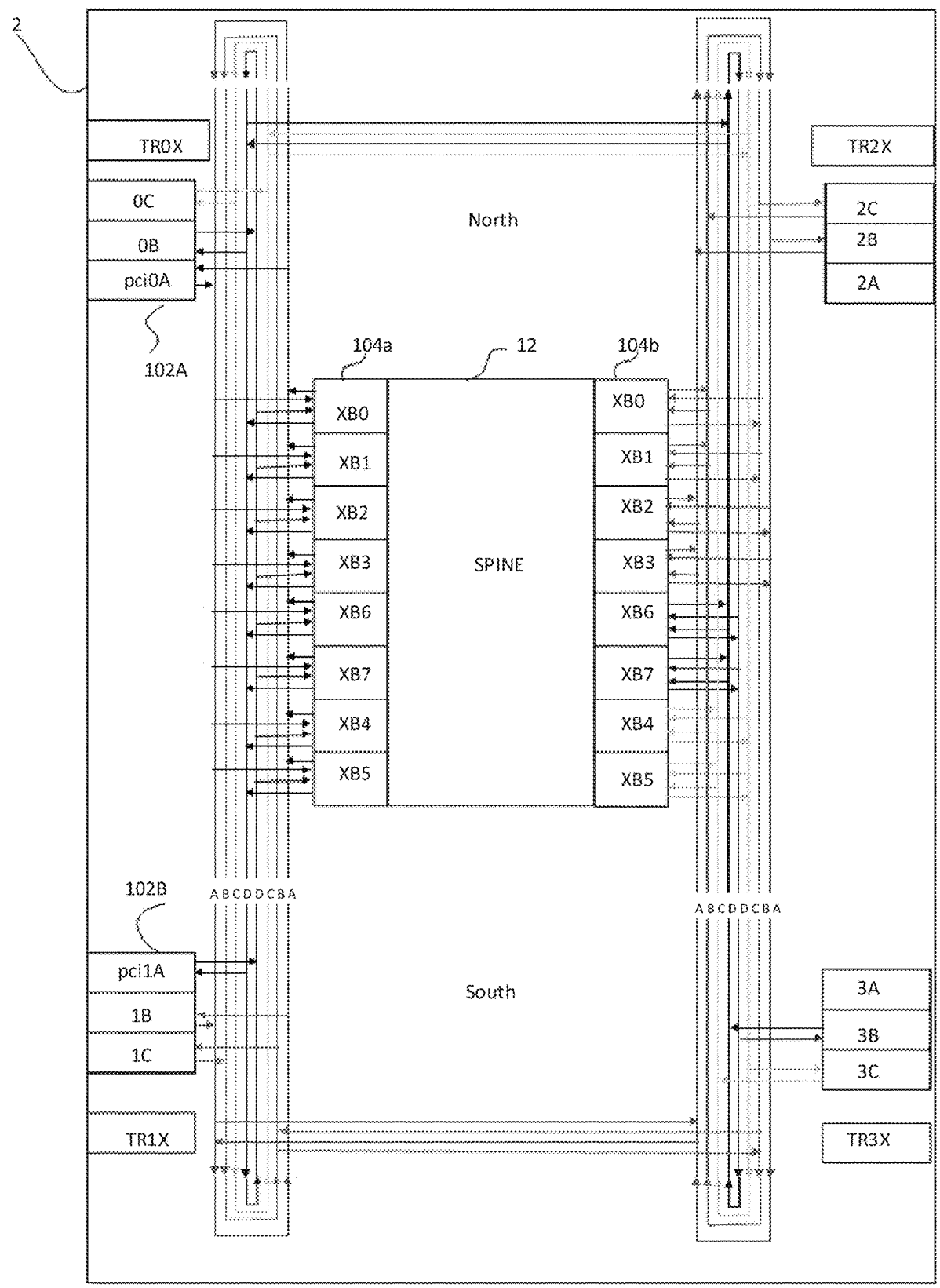
FIG. 4 is a schematic diagram showing routing of packets on a single IPU within a barley twist configuration.

FIG. 4 shows a schematic diagram of the exchange network in a 'Barley twist' configuration for one IPU (IPU 0) on a single PCI card. Routing of packets according to this configuration may be subject to a number of 'hard' and 'soft' constraints, where 'hard' constraints are enforced by the configuration, such that attempts to dispatch packets that violate hard constraints are trapped as an error, while violation of soft constraints do not introduce functional errors or packet loss but may introduce temporary blocking.

The hard constraints for the Barley Twist configuration include the following:

Packets sourced by an IPU must be addressed to a neighbouring IPU, i.e. packets are only addressed to lo_ids 0-3, which are within the routing domain. This means that all packets must have broadcast bitmaps with bcbm[15:4]==0b, i.e. the bits corresponding to logical ids above 3 are 0 and packets cannot be addressed to these lo_ids.

Packets sourced by West edge exchange blocks may only be addressed to the host and packets arriving from either of the PCI complexes may only be routed to West edge exchanges.

Packets sourced by East edge exchange blocks must not be routed to West edge exchange blocks, whether on the same or different IPUs.

Packets sourced by exchange blocks XB 0-3 may only be addressed to the IPUs attached to the east or south of the source IPU.

Packets sourced by exchange blocks XB 4-7 may only be addressed to the IPUs attached to the east or north of the source IPUs.

The soft constraints may include the following, and full link utilisation may be achieved by meeting the following criteria:

Tiles serviced by exchange blocks XB0, XB1 of a given IPU should only send exchange packets to tiles serviced by the corresponding exchange blocks of a neighbouring IPU.

Tiles serviced by exchange blocks XB2, XB3 of a given IPU should only send exchange packets to tiles serviced by the corresponding exchange blocks of a neighbouring IPU.

Tiles serviced by exchange blocks XB4, XB5 of a given IPU should only send exchange packets to tiles serviced by the same exchange blocks of a neighbouring IPU.

Tiles serviced by exchange blocks XB6, XB7 of a given IPU should only send exchange packets to tiles serviced by the same exchange blocks of a neighbouring IPU.

Traffic should be balanced such that a given tile or set of tiles does not repeatedly target the same tile on another IPU so as to avoid overspill of blocked traffic into the target tile's local trunk router where it could block other traffic.

Traffic should be balanced such that sufficient numbers of exchange blocks are sourcing traffic so as to saturate the link bandwidth available Each exchange block should generate balanced northbound and southbound trunk traffic.

As described above, the trunk comprises a set of lanes extending North-South on the east and west side of the chip. FIG. 4 illustrates four north going lanes and four south going lanes on the west side, and four north going lanes and four south going lanes on the east side. These are distinguished by colour and letter. The direction of the lane is denoted by the arrowhead on the lane itself. For example, the left hand most lane shown in FIG. 4 is red lane A, Southbound. The colours are provided to indicate routing protocols operated via the trunk router switches 106, the exchange blocks 104 and the link controllers.

As can be seen in FIG. 4, the West edge exchange blocks 104a receive packets (black) from the Primary PCI complex 102A on the south-going lane A and packets from the secondary PCI complex on the north-going lane D. The primary PCI complex receives packets from exchange blocks on north-going lane A and the secondary PCI complex receives packets from exchange blocks on south-going lane D. Lanes A and D are also used for tile-to-tile traffic, but only traffic addressed to the IPUs connected to the south and north edges, respectively. Link interface 0C receives packets from local tiles (sourced from exchange blocks XB4 and XB5 of the east edge) on the south going lane C, and receives packets addressed to local tiles serviced by the corresponding exchange blocks from neighbouring IPUs and forwards them on the north-going lane C. These are marked in yellow in FIG. 4. Link interface 0B receives packets from local tiles (sourced from exchange blocks XB6 and XB7 of the east edge) on the south-going lane D and forwards packets received from neighbouring IPUs to exchange blocks XB6 and XB7 on the north-going lane D. This is marked in blue in FIG. 4. Link interface 1C receives packets from local tiles (sourced from exchange blocks XB0 and XB1 of the east edge) on the north-going lane B and forwards packets received from neighbouring IPUs to exchange blocks XB0 and XB1 on the south-going lane B. This is marked in green in FIG. 4. Link interface 1B receives packets from local tiles (sourced from exchange blocks XB2 and XB3 of the east Edge) on the north-going lane A and forwards packets received from neighbouring IPUs to exchange blocks XB2 and XB3 on the south-going lane A. This is shown in red in FIG. 4.

Odd numbered IPUs (by physical id) use the following routing for the link interfaces 0B, 0C, 1B and 1C: Link interface 0C receives packets from local tiles (sourced from exchange blocks XB4 and XB5 of the east edge) on the north going lane C, and receives packets addressed to local tiles serviced by the corresponding exchange blocks from neighbouring IPUs and forwards them on the south-going lane C. Link interface 0B receives packets from local tiles (sourced from exchange blocks XB6 and XB7 of the east edge) on the north-going lane D and forwards packets received from neighbouring IPUs to exchange blocks XB6 and XB7 on the south-going lane D. Link interface 1C receives packets from local tiles (sourced from exchange blocks XB0 and XB1 of the east edge) on the south-going lane B and forwards packets received from neighbouring IPUs to exchange blocks XB0 and XB1 on the north-going lane B. Link interface 1B receives packets from local tiles (sourced from exchange blocks XB2 and XB3 of the east edge) on the south-going lane A and forwards packets received from neighbouring IPUs to exchange blocks XB2 and XB3 on the north-going lane A.

For east edge to east edge exchange, the exchange blocks both send and receive from the north-going and south-going lanes as required according to the following mapping, if soft constraints are being respected:

| | |
|---|---|
| Lane A | XB2, XB3 |
| Lane B | XB0, XB1 |
| Lane C | XB4, XB5 |
| Lane D | XB6, XB7 |

If soft constraints are not respected, any of exchange blocks XB0-3 may use either of lanes A or B and any of exchange blocks XB4-7 may use either of lanes C or D.

Receipt and forwarding of packets by LCs on the East edge is now described for IPU 0 (and all even numbered IPUs) with reference to FIG. 4. LC2C receives packets from local tiles (sourced from exchange blocks 0 and 1) on the north-going lane B and forwards packets received from neighbouring IPUs to exchange blocks 0 and 1 on the south-going lane B. This is marked in FIG. 4 by green arrows in LC2C. LC2B receives packets from local tiles (sourced from exchange blocks 2 and 3) on the north-going lane A and forwards packets received from neighbouring IPUs to exchange blocks 2 and 3 on south-going lane A. LC3C receives packets from local tiles (sourced from exchange blocks 4 and 5) on the south-going lane C and forwards packets received from neighbouring tiles to exchange blocks 4 and 5 on the north-going lane C. LC8B receives packets from local tiles (sourced from exchange blocks 6 and 7) on the south-going lane D and forwards packets from neighbouring tiles to exchange blocks 6 and 7 on north-going lane D.

For odd-numbered IPUs, the exchange on the East edge is as follows: LC2C on odd-numbered IPUs receives and forwards packets on the north-going and south-going lane C, respectively, where the packets are sourced from and routed to exchange blocks 4 and 5. LC2B receives from and forwards to exchange blocks 6 and 7 on the north-going and south-going lane D, respectively. LC3C receives from and forwards to exchange blocks 0 and 1 on the north-going and south-going lane B, respectively. LC8B receives from and forwards to exchange blocks 2 and 3 on the north-going and south-going lane A, respectively.

An example of packet routing for three unicast packets will now be described with reference to FIGS. 5A-5B, which shows a scenario with eight cards (in FIGS. 5A-5B, designations NMOB, NMOC etc. relate to 0B, 0C etc. in FIG. 4). The IPU with ph_id 4 (lo_id 3) sends three packets as follows:

1. Packet 1, to be received by ph_id 2 (lo_id 0) on exchange block XB2 of the East edge.
2. Packet 2, to be received by ph_id 5 (lo_id 2) on exchange block XB0 of the East edge.
3. Packet 3, to be received by ph_id 6 (lo_id 1) on exchange block XB5 of the East edge.

(note that for clarity an IPU labelled ph_id x is referred to simply as ph_idx)

Figure 5A:
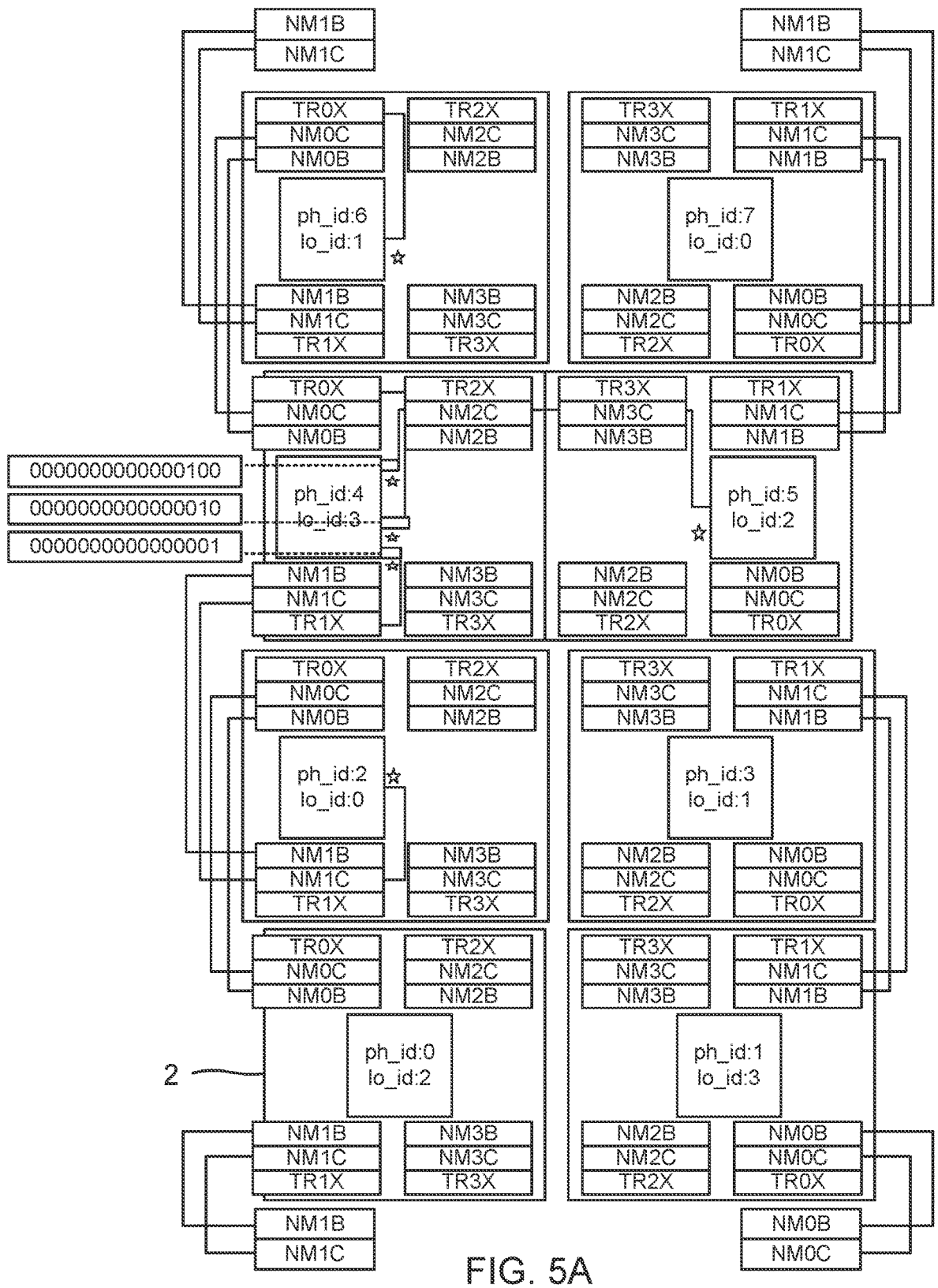
FIGS. 5A-5B are a schematic diagram showing the routing of three unicast packets between IPUs in a cluster according to the barley twist configuration.
Figure 5B:
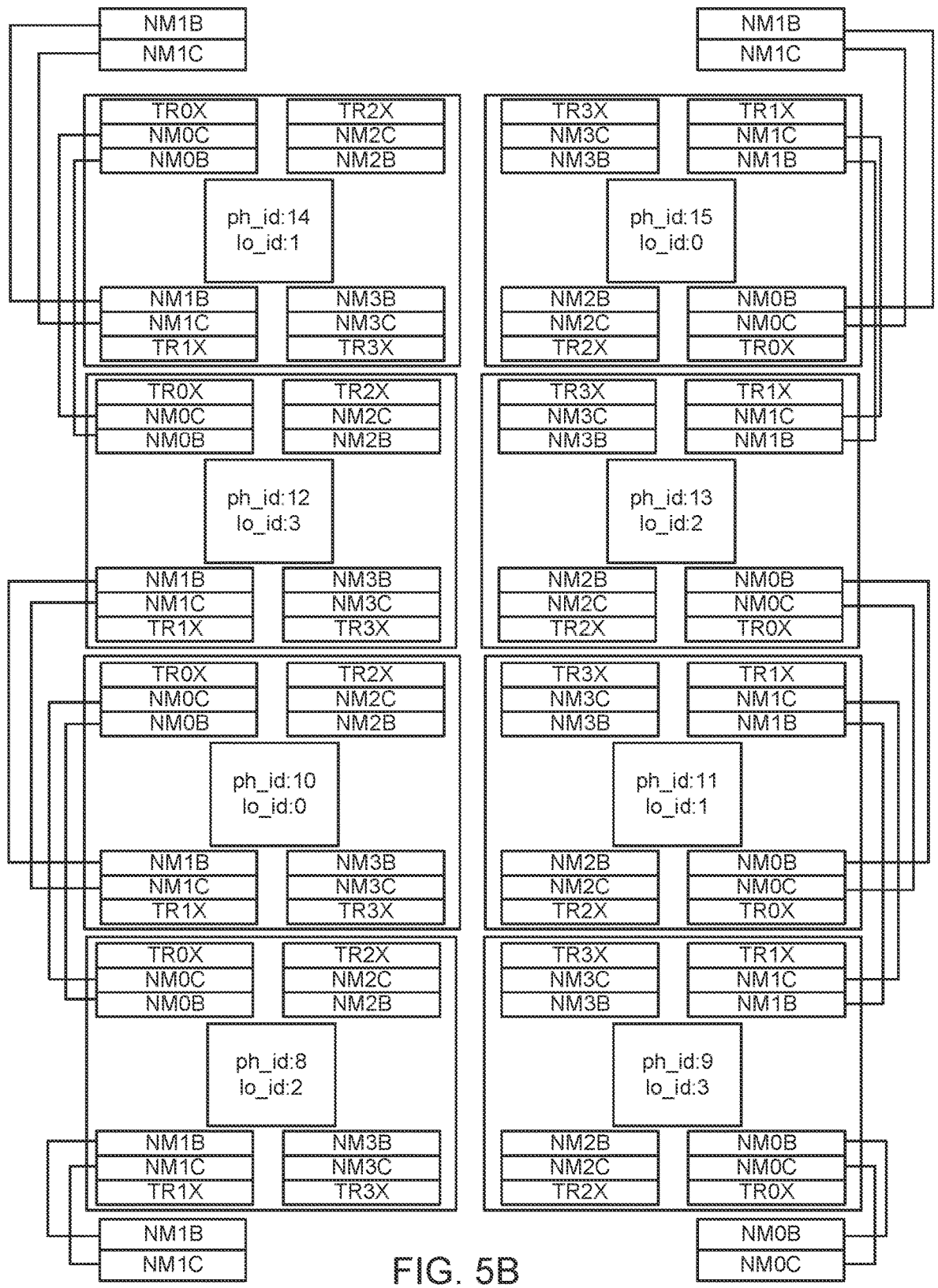

The packet visiting ph_id 2 takes the path marked in FIGS. 5A-5B. The packet first routes south on ph_id 4, sourced from exchange block 2 or 3 and moving along lane A if following soft constraints, reaching the trunk router switch TR3X, where it crosses to the West edge and exits through link interface 1B, moving to the neighbouring IPU ph_id 2 via the corresponding link interfaces on ph_id 2 1B. It travels south to reach the trunk router switch TR1X, crossing over to the East edge, and then travels along the north-going lane A to reach exchange block XB2, where it is translated onto the interconnect 34 between local tiles. This may involve placing the packet onto the interconnect on one of the exchange paths accessible to that exchange block, or firstly removing any header or destination identifier.

The packet addressed to ph_id 5 takes a path in FIGS. 5A-5B. The packet first moves north within ph_id 4 to reach link interface 2C, crossing to the East edge of ph_id 5. The packet then travels north until it reaches East edge exchange block 0 where it terminates. If following soft constraints, the packet will be sourced from one of exchange blocks XB0 or XB1 of ph_id 4 and will follow lane B.

Packet 3, visiting ph_id 6 (lo_id 1) takes a path in FIGS. 5A-5B. The packet first routes north on ph_id 4 to reach trunk router switch TR2X, where it crosses to the West edge and exits through link interface 0C and enters ph_id 6 though the corresponding link interface 0C. It then travels north on ph_id 6 to trunk router switch TR0X and crosses into the East edge before traveling south until it reaches exchange block XB5 where it terminates. If soft constraints are followed, this packet will be sourced from one of exchange blocks XB4 or XB5 and will follow lane C.

Figure 6A:
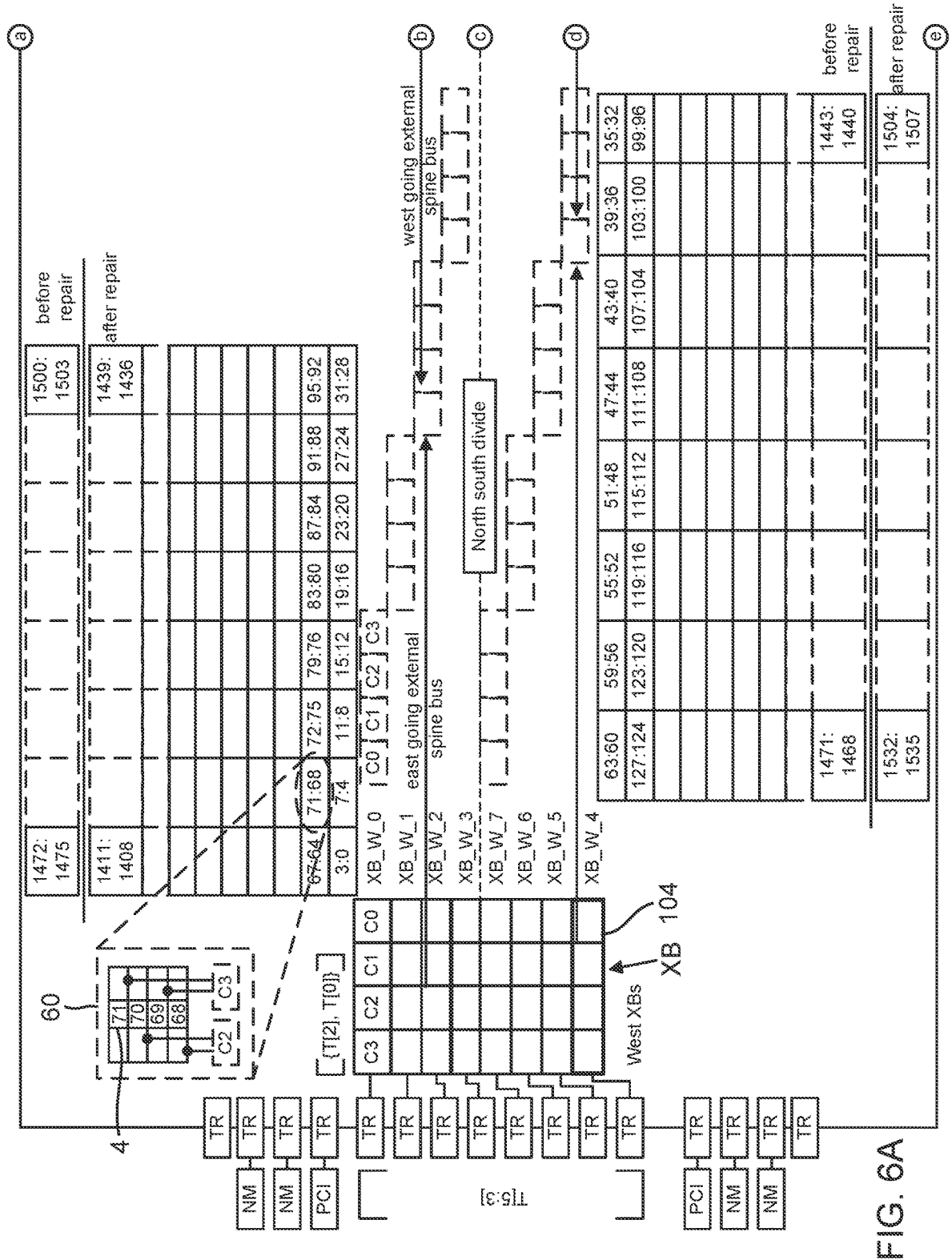
FIGS. 6A-6B are a schematic diagram showing the access of tiles of an IPU by exchange blocks.
Figure 6B:
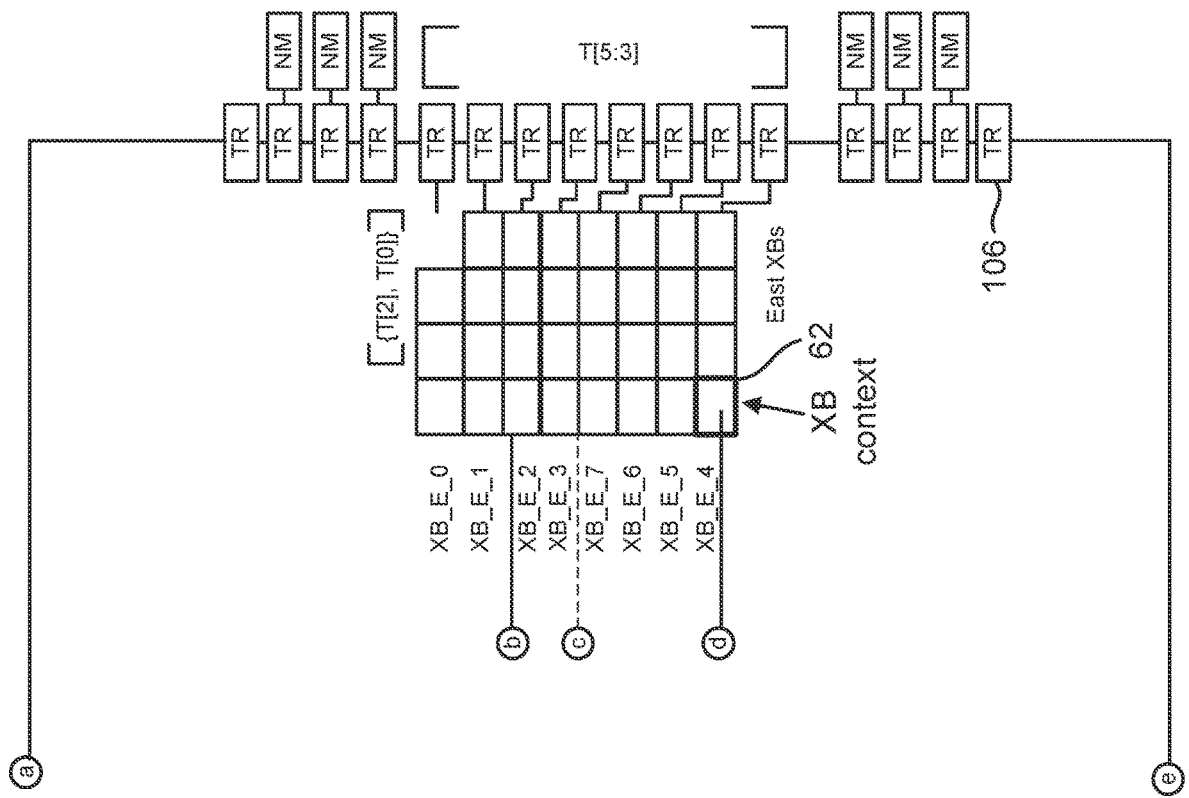
Figure 7A:
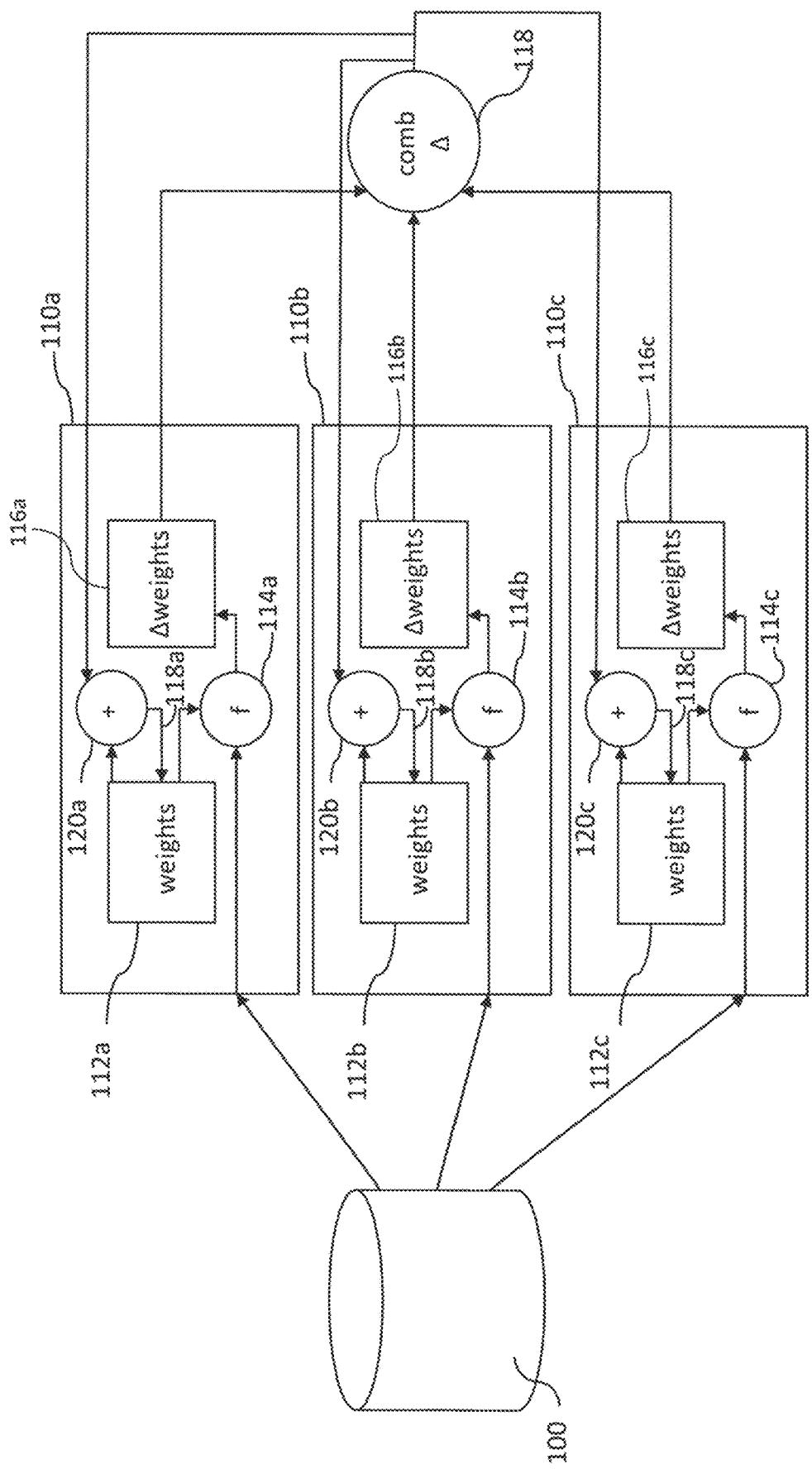
FIG. 7A is a schematic diagram illustrating distributed training in a neural net.
Figure 7B:
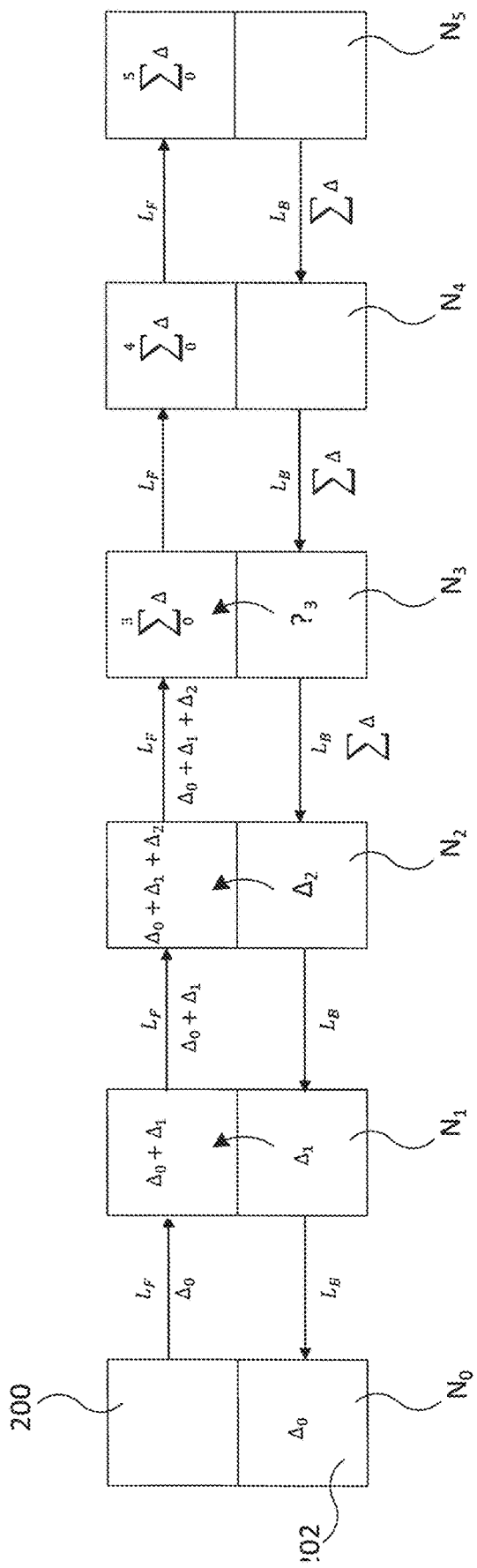
FIG. 7B is a schematic diagram showing a line of processing nodes for implementing a simple "streaming" line Allreduce algorithm.
Figure 7C:
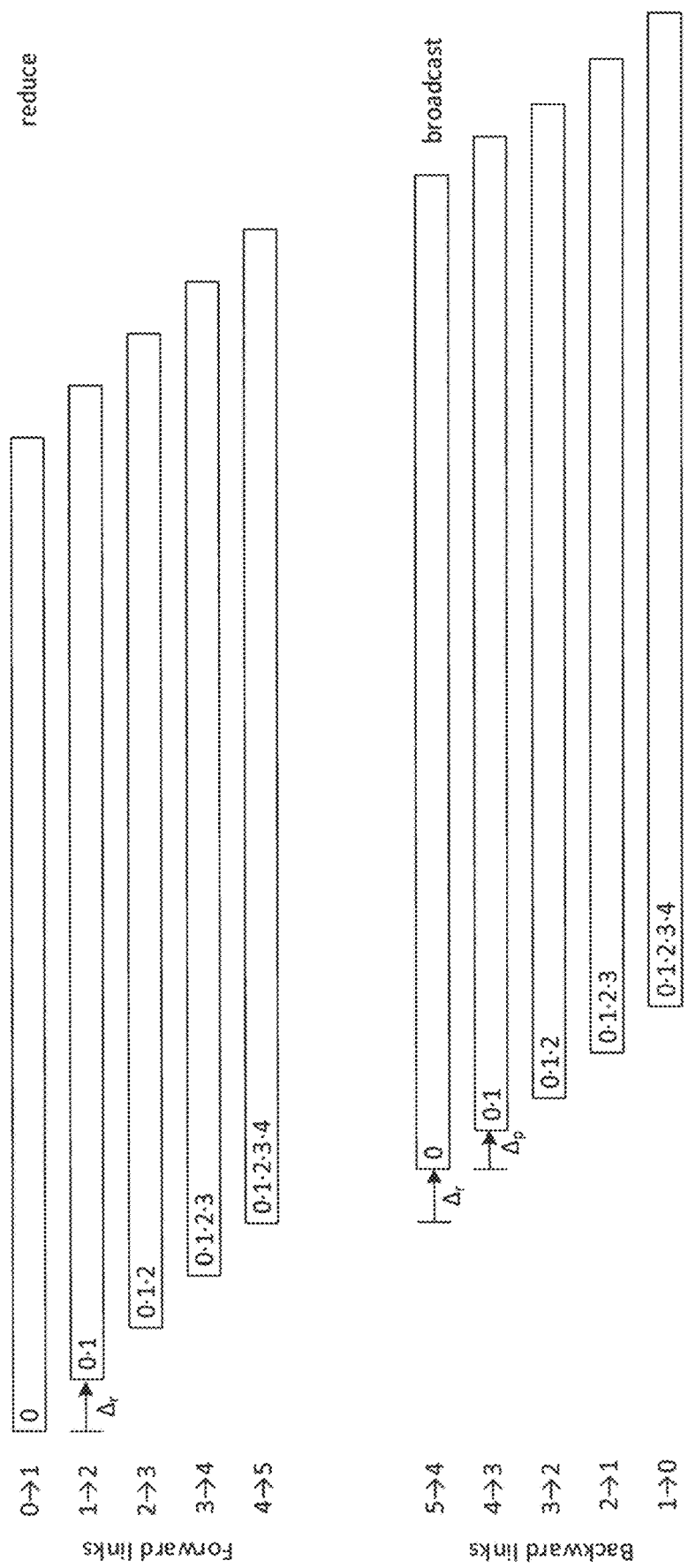
FIG. 7C is a timing diagram of a "streaming" line Allreduce algorithm.
Figure 7D:
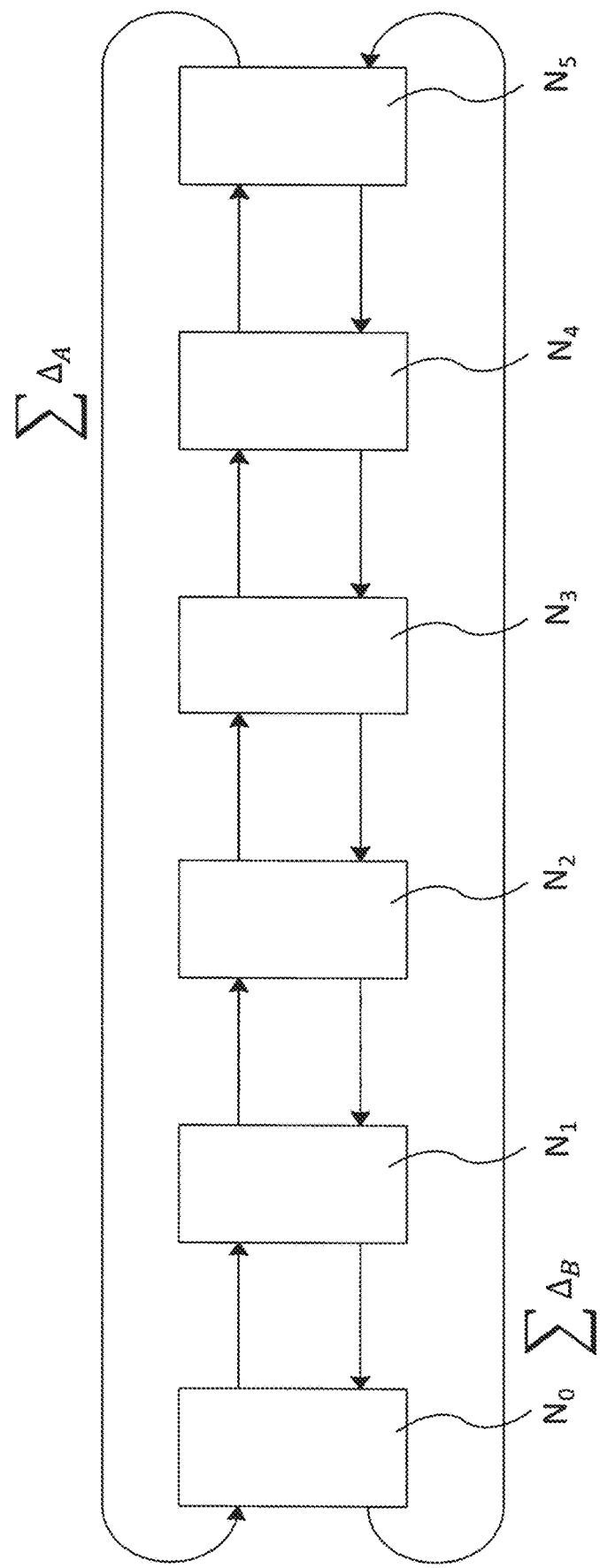
FIG. 7D is a schematic diagram of a line with the end nodes connected into a ring.
Figure 7E:
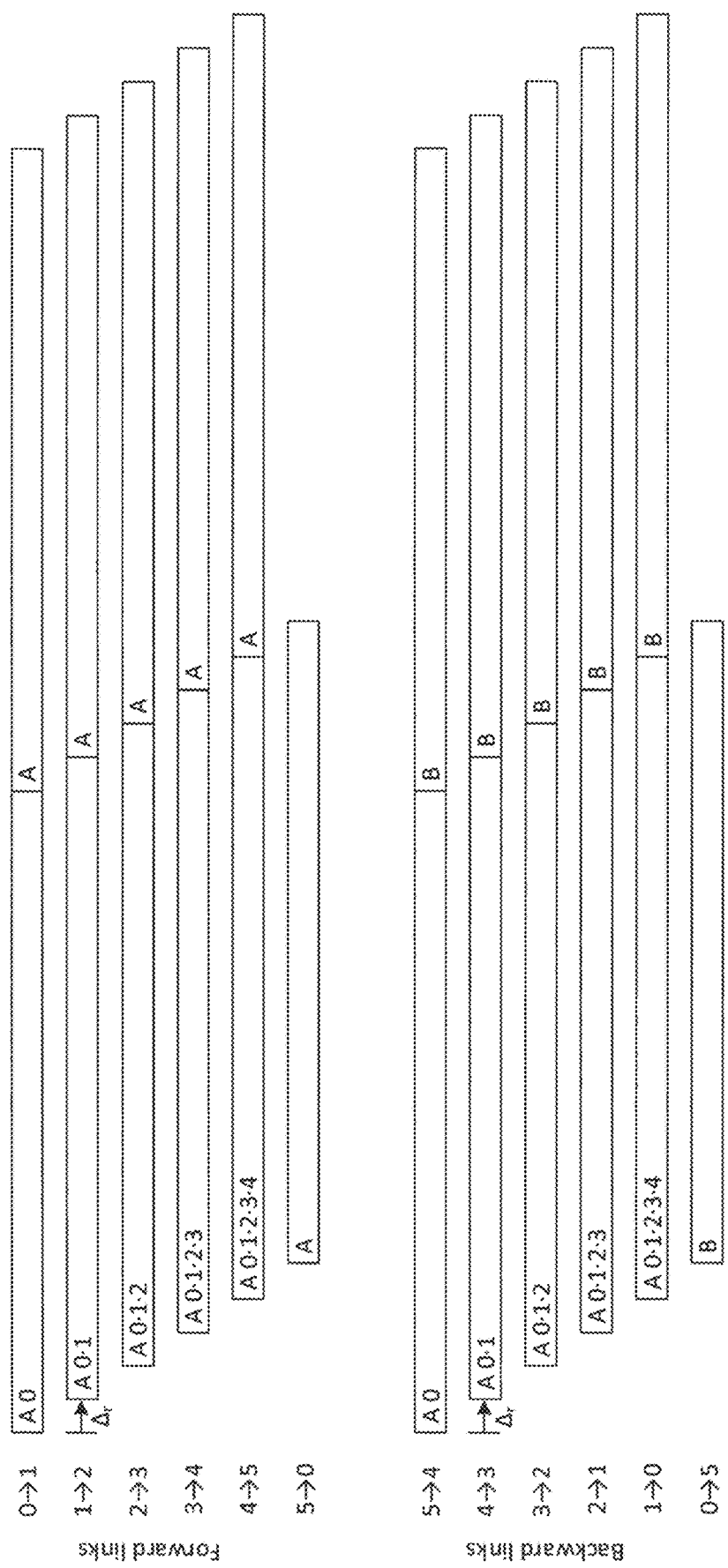
FIG. 7E is a timing diagram of a ring Allreduce algorithm.

FIGS. 6A-6B show the access of tiles by exchange blocks 104. Exchange of packets between tiles and exchange blocks is described in further detail later, with reference to FIG. 16. Each exchange block 104 connects to two columns of tiles in either the north or south of the IPU. The tiles are grouped into supertiles 60, each comprising four tiles. Each supertile 60 is denoted in FIGS. 6A-6B by a block within the sets of tiles located in the north and south of the IPU, labelled with the range of tiles making up that supertile. For example, the supertile 60 comprising tiles 68 to 71 is labelled 71:68.

FIGS. 6A-6B show each exchange block 104 subdivided into four contexts 602 (C0 to C4), each of which manages half the tiles in one of the two columns that the exchange block can read data from over the interconnect. For example, as shown in FIGS. 6A-6B, the supertiles 60 labelled 7:4 and 71:68 are in the same column, and each of contexts C2 and C3 associated with exchange block 104 0 control half of the tiles of this column. In a given column, the first context controls the even numbered tiles in that column and the second context controls the odd numbered tiles, and they alternate in this sequence to the top of the column. This is shown in FIGS. 6A-6B for tiles 71:68, where the context C2 controls tiles 68 and 70 and the context C3 controls tiles 69 and 71.

Tile memory is accessible via the exchange using the broadcast bitmap of sixteen bits with each bit corresponding to one IPU, an 11-bit TILE ID and an 18-bit TILE ADDRESS. The exchange network uses these to route packets to the right place within a set of one or more IPUs. Tile requests for PCI are automatically sent to the PCI complex. If there are two PCI complexes active the MSB (most significant bit) of the ELink PCI Address field is used. The broadcast bitmap field in an ETWR packet identifies one or more IPUs in a multi-IPU system.

Bits 5:0 of the TILE ID are used to direct packets as follows:

Bits 5:3 of the TILE ID select a given exchange block 104.

Bit 2 of the TILE ID selects between the least significant and most significant column assigned to an exchange block 104, thus selecting two of the possible exchange block contexts 602 (those assigned to the selected column).

Bits 1:0 of the TILE ID select one of four tiles within a given group of four tiles (supertile).

Bit 0 defines which of the two possible exchange block contexts the selected tile belongs to.

The TILE ADDRESS is used to specify the memory location to access within the selected tile.

Packets cannot be routed from a west edge exchange block to an east edge exchange block or vice versa. Packets may route from the west edge of one IPU to the end of the line of west edge trunk routers 106 on that IPU, then along the cross-link along north and south edges. These packets must be routed out of an IPU link on the east edge to the east edge of a neighbouring IPU.

The access of tiles of the IPU by exchange blocks which enables exchange of packets according to the above configuration will now be described with reference to FIGS. 6A-6B. Each bank of eight exchange blocks 104, on the west edge and east edge respectively, can connect to any tile in the IPU. Each exchange block 104 is joined to the exchange network via a trunk router labelled TR. The exchange block 104 communicates directly with the tiles via 4 external spine buses (driven by the exchange block 104) and tile spine buses each driven by one tile processor. The spine busses are also referred to herein as exchange paths. The exchange block 104 sends tile link (TLink) packets into the external spine bus. TLink packets are used for exchange between tiles 4 and exchange blocks 104. Each packet may be seen by all tile processors connected to that spine bus and each tile processor decides whether to act on each packet. The tile processors send TLink packets on their own output buses which are connected to the on chip interconnect, not shown in FIG. 6A-6B. These TLlink packets are readable by the exchange block 104 from the on chip interconnect 34, according to a time deterministic protocol discussed later with reference to FIG. 16.

The above-described network configuration is useful in the context of an interconnected network acting as an accelerator for machine learning workloads. Each IPU may be considered as a processing node, and they are interconnected in the manner which enables machine learning collectives to be efficiently implemented. One particular application is to update models when training a neural network using distributed processing. In this context, distributed processing utilises multiple processing nodes and the transmission of data between the processing nodes using messages exchanged over physical links between the processing nodes.

Figure 8:
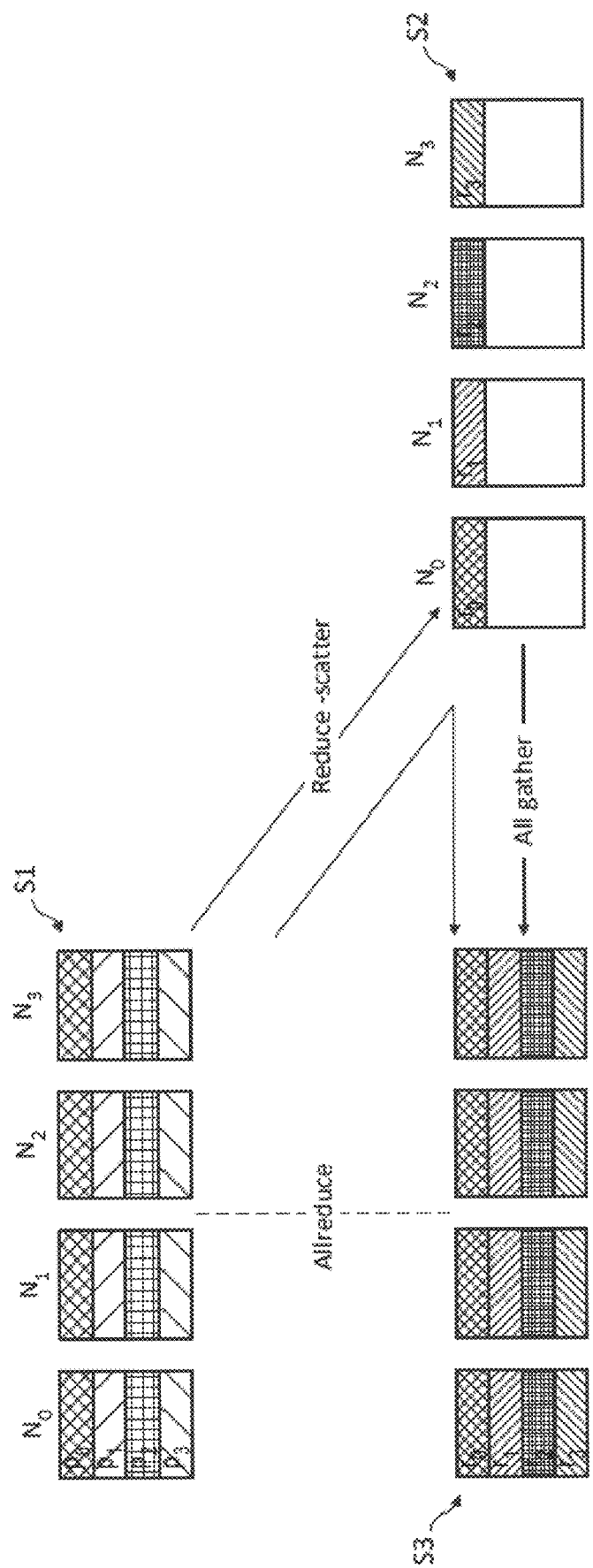
FIG. 8 is a schematic diagram illustrating implementation of an Allreduce function by a reduce-scatter step followed by Allgather step.

The Allreduce collective has been described above and is illustrated in FIG. 8. FIG. 8 shows a set of partial values or "partial" vector $P_0$, $P_1$, $P_2$, $P_3$ on each of four nodes in a starting state S1. In this context a node is a processing node in a network of processing nodes. Note that each node $N_0$, $N_1$, $N_2$, $N_3$ has four "corresponding" partials which are marked accordingly (large diamond grid, wide downward diagonal stripe, large square grid, wide upward diagonal stripe). That is, each partial has a position in its partial vector such that P0($n$) has the same position in its vector on node n as P0 (n+1) in its vector on node n+1. The suffix (n) is used to denote the node in which the partial resides—thus P0(0) is the partial P0 on node N0. In a reduce-scatter pass, corresponding partials are reduced and the reduction provided to one of the nodes. For example, partials P0(0), P0(1), P0(2), P0(3) are reduced (to $r_0$) and placed onto node $N_0$. Similarly, partials P1(0), P1(1), P1(2) and P1(3) are reduced (to $r_1$) and placed onto node N. And so forth so that in an intermediate state S2, each node has one of the reductions $r_0$, $r_1$, $r_2$ and $r_3$. As explained, the reduction may be by any combinatorial function f ($Pi_0^3$)—which could include independent operators (e.g. max) or associative operators=P1(0) *P1(1)*P1 (2)*P1(3). Then, in an Allgather pass, each reduction is provided to all nodes to activate a state S3 wherein each node now holds all four reductions. Note that in S1, the "corresponding" partials, e.g. P0(0), P0(1), P0(2) and P0(3) may all differ whereas, in state S3, each reduction, e.g. $r_0$, is the same at all nodes, where $r_i$=f{($P_i(0)$, $P_i(1)$, $P_i(2)$ and $P_i(3)$)}. In machine learning, the set of partials P0, P1, P2, P3 is a vector. A vector of partials (e.g. updated weights) is produced on each pass of the model during training. The reduction $r_0$, $r_1$, $r_2$, $r_3$ on diamond grid, downward diagonal stripe, square grid, upward diagonal stripe each node in state S3 is the full reduction vector that is the vector of "results" or fully reduced partials. In the context of machine learning, each partial could be an updating delta for a parameter in the model. Alternatively (in an arrangement not described further herein) it could be an updated parameter.

Figure 9A:
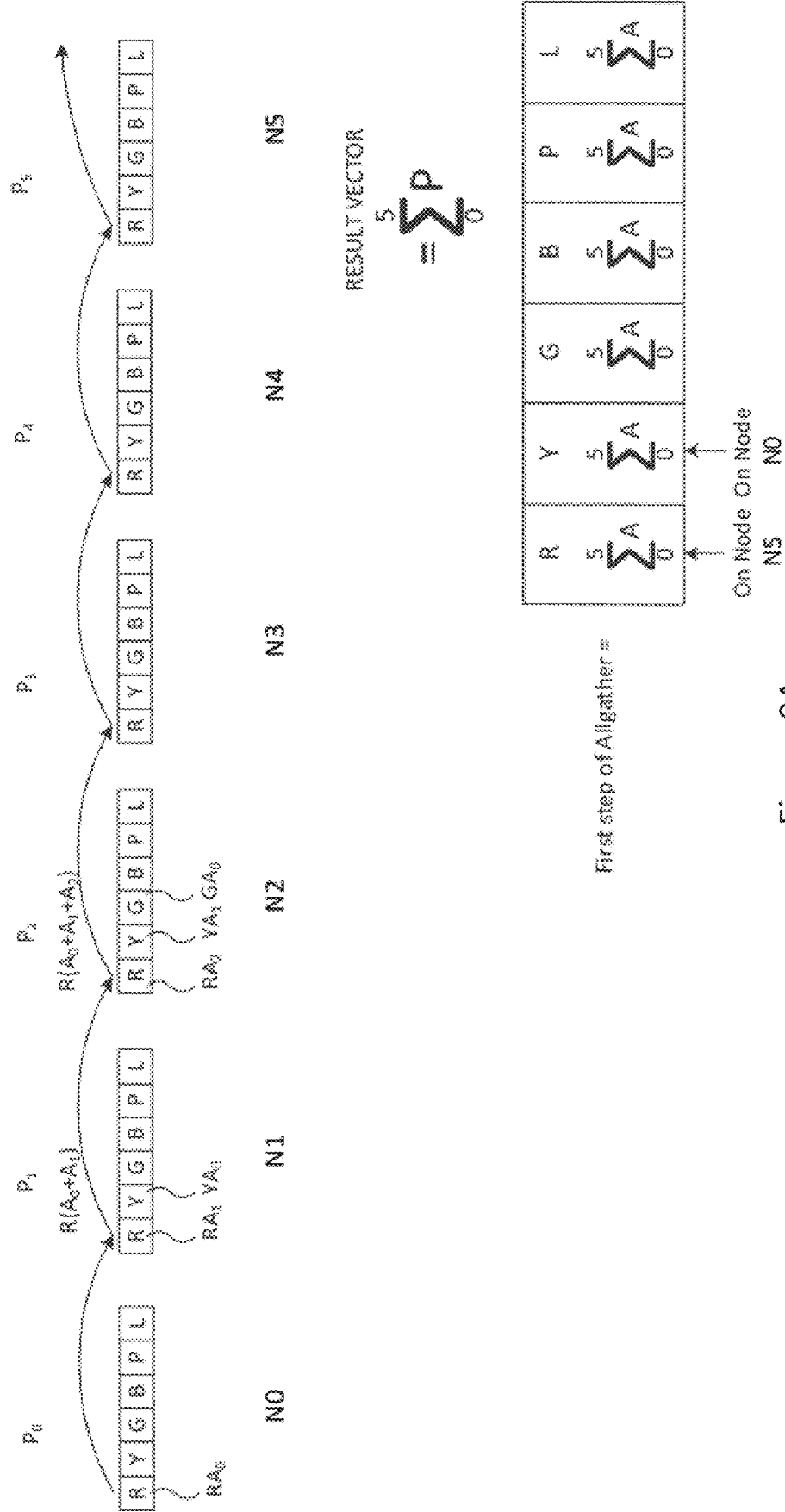
FIGS. 9A and 9B illustrate a bucket based Allreduce algorithm.
Figure 9B:
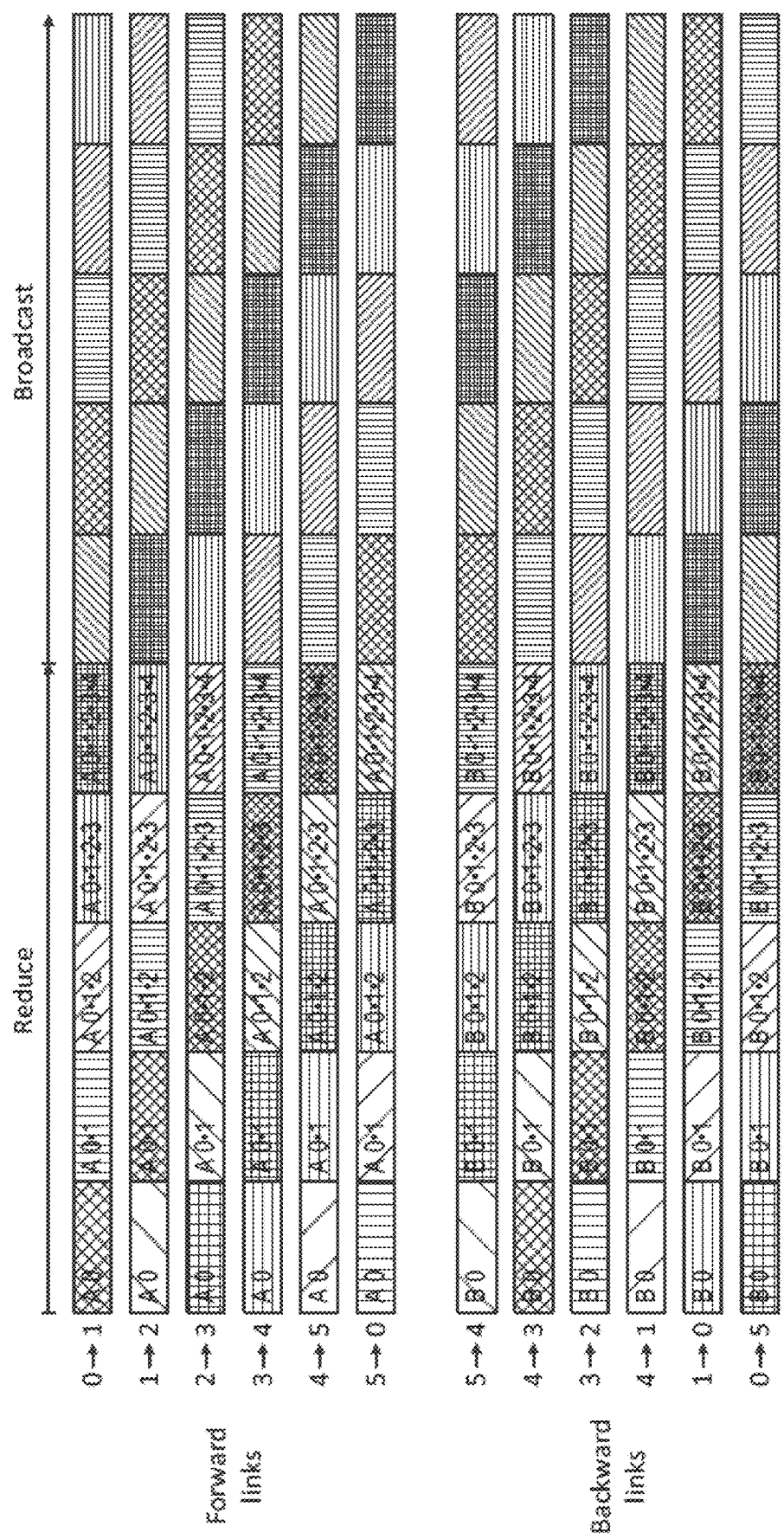

FIGS. 9A and 9B illustrate a bucket based algorithm for reduce-scatter/Allgather that assumes six "virtual rings. These are also termed "logical" rings herein. FIG. 9A is a schematic diagram illustrating the reduction of partials in multiple virtual rings. Each partial is split into six fragments. In FIG. 9A, the capital letters R, Y, G, B, P, L each denote a different fragment of a partial stored at each node, indicated by hatching diamond grid, upward diagonal stripe, square grid, horizontal stripe, downward diagonal stripe, vertical stripe. The letters denote corresponding fragments which are to be reduced with each other, and define the "virtual" or "logical" ring for those fragments. Looking at FIG. 9A, the "R" fragments in each of the partials P0, P1, P2, P3 and P4 are reduced into a single fragment in the result vector ($R\Sigma_{A0}^5$). Similarly for the Y, G, B, P and L fragments.

FIG. 9B shows a timing diagram with time on the horizontal axis indicating the data exchanges and computations in each step of the Allreduce process. In FIGS. 9A and B, the Allreduce process is accomplished by a reduce-scatter phase followed by an Allgather phase. In FIG. 9B each of the fragments are denoted by different hatching as follows: R—diamond grid, Y—upward diagonal stripe, G—square grid, B—horizontal stripe, P—downward diagonal stripe, L—vertical stripe.

The notation in FIGS. 9A and 9B is as follows. The partials are each denoted P0, P1, P2, P3, P4, P5. At the start of the process, each partial is stored on a respective node N0, N1, N2, N3, N4, $N_5$. Each fragment is labelled according to its fragment ordinant and its position in the virtual ring in which it is deemed to be reduced. For example, RA0 denotes the R fragment in partial P0, because this is the first fragment in a virtual ring formed by nodes N0-N1-N2-N3-N4-N0. RA1 denotes the R fragment at node N1, which is in the second position in its virtual ring. YA0 denotes the Y fragment at node N1. The "0" suffix indicates it is the first fragment in its virtual ring, the Y-ring being N1-N2-N3-N4-N0-N1. Note in particular that the suffixes on A reflect the virtual rings, and do not correspond to the physical nodes (or the partials). Note that FIG. 9A shows only the virtual rings on the forward links. FIG. 9B shows that an equivalent process is occurring on the backward links, with the fragments denoted as B.

In step one, the first fragment (the A0) in each virtual ring is transferred from its node to the next adjacent node where it is reduced with the corresponding fragment at that node. That is, RA0 moves from N0 to N1 where it is reduced into R(A0+A1). Once again, the "+" sign is used here as a shorthand for any combinatorial function. Note that in the same step the A0 fragments of each virtual ring will simultaneously be being transmitted. That is, the link between N1 and N2 is used to transmit YA0, the link between N2 and N3 is used to transmit GA0 et cetera. In the next step, the corresponding reduced fragments are transmitted over the forward links to their next adjacent node. For example, R(A0+A1) is transmitted from N1 to N2, and Y(A0+A1) is transmitted from N2 to N3. Note that for reasons of clarity not all fragments are numbered, nor are all transmissions numbered in FIG. 9A. The full set of fragments and numbers are shown in FIG. 9B. This process carries on for five steps. After five steps, there is a reduction of all fragments on each node. At the end of the fifth step, this reduction is on the last node of each corresponding ring for that fragment. For example, the R reduction is on node N5.

The beginning of the Allgather phase starts by a transmission from the last to the first node in each virtual ring. Thus, the final reduction for the R fragments ends on node N5 ready for the first step of the Allgather phase. The final reduction of the Y fragments correspondingly ends up on the node N0. In the next step of the Allgather phase, the reduced fragments are transmitted again to their next adjacent node. Thus the fully reduced R fragment is now also at N2, the fully reduced Y fragment is now also at N3 and so on. In this way, each node ends up at the end of the Allgather phase with all fully reduced fragments R, Y, G, B, P, L of the partial vector.

Implementation of the algorithm is optimal if the computation required for the reduction can be concealed behind the pipeline latency. Note that in forming suitable rings in a computer for implementation of Allreduce, a tour of the ring must visit each node in the ring only once. Therefore the natural ring formed by a line with bi-directional links (FIG. 1A) is not the most efficient ring.

There will now be described an improved topology for an interconnected network of processing nodes which permits an efficient exchange of partials and results between processing nodes to implement an Allreduce collective.

Figure 10A:
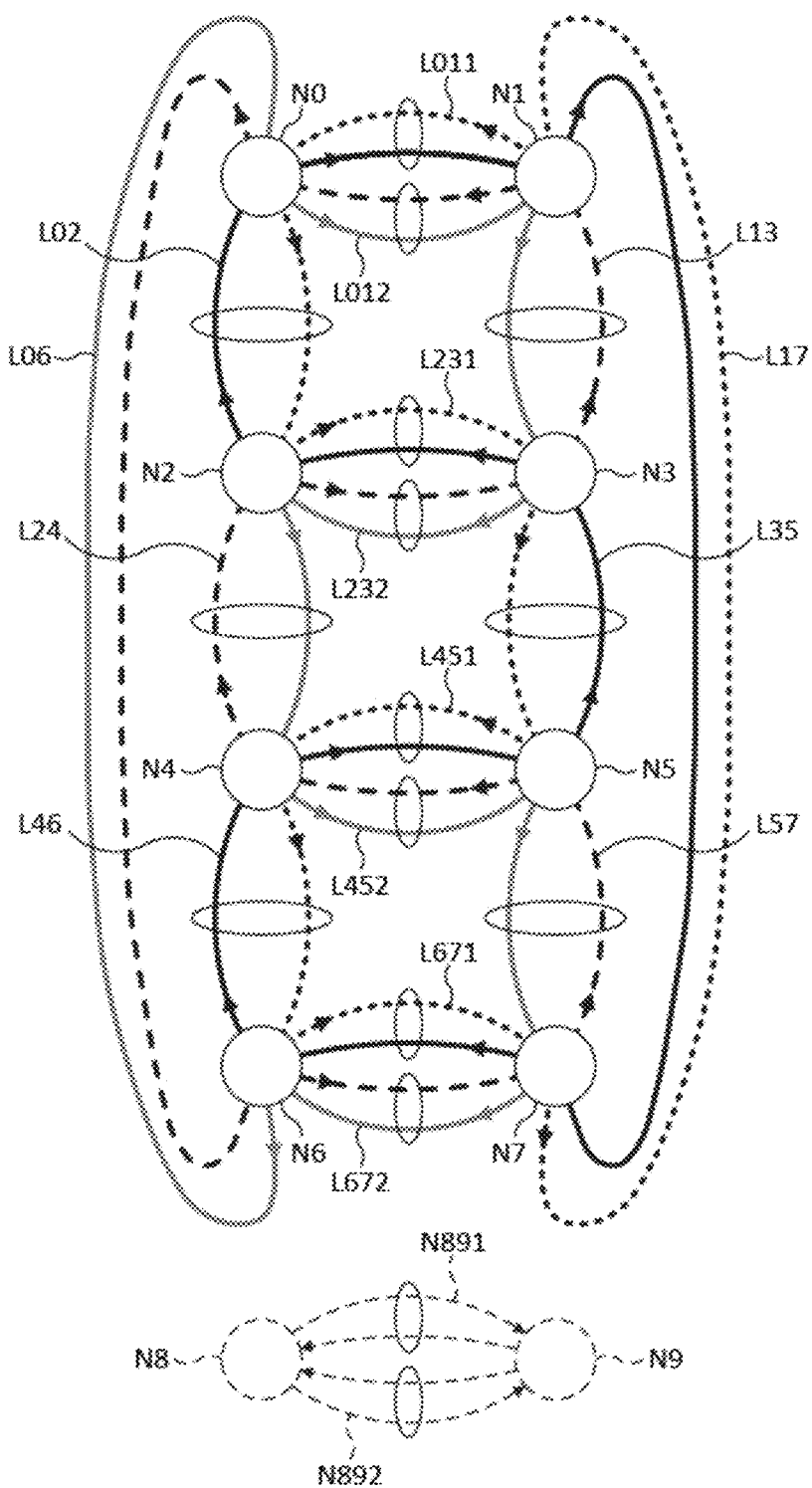
FIGS. 10A and 10B are schematic diagrams of a configuration of processing nodes in which two rings are embedded.

FIG. 10A is a schematic diagram showing a connected topology of multiple processing nodes. The configuration of FIG. 10A can be formed by configuring a cluster of eight IPUs on four cards, using a barley twist exchange network configuration, described earlier with reference to FIG. 4.

In FIG. 10A, there are eight processing nodes in a ladder formation, but it will be appreciated that the principles could be extended to any number of pairs of processing nodes arranged in a ladder. Each processing node is shown as a circle and labelled with a number for ease of reference. In the following description, the prefix N will be inserted when referring to a node. For example, N0 denotes the circle representing node N0 in FIG. 10A. The processing nodes are connected by links in a manner to be described. Each link may be bi-directional, that is, it may transport data in both directions over the links. Note that there is a physical interconnectivity, and a logical connectivity. The logical connectivity is used to form two embedded, continuous rings, each having two directions. Firstly, the physical connectivity will be described. Processing nodes in the Y direction are each connected to their neighbouring node by a single bidirectional link. Facing processing nodes are connected by two bi-directional links. For example, (looking at the left hand vertical in FIG. 10A), N0 is connected to N2 by a single bi-directional link (shown as two oppositely facing arrows in FIG. 10A). Similarly, N2 is connected to N4, N4 is connected to N6 and N6 is connected back to N0. In the horizontal direction, node N0 is connected to N1 by two bi-directional links (one of which is shown by opposing arrows in black and small dash, and the other of which is shown by opposing arrows in grey and large dash). Similarly N2 is connected to N3, N4 is connected to N5 and N6 is connected to N7. This physical connectivity allows two logical embedded rings (each bi-directional) to be embedded in the structure. The first ring (shown in grey and large dash) extends from N0 to N1, N1 to N3, N3 to N2, N2 to N4, N4 to N5, N5 to N7, N7 to N6 and back to N0. The second logical ring (shown in black and small dash) extends from N0 to N2, N2 to N3, N3 to N5, N5 to N4, N4 to N6, N6 to N7, N7 to N1 and from N1 back to N0. Each ring comprises all eight processing nodes. Note also that the two rings can be used simultaneously because there is no conflict on any single path.

Note that each logical ring in one direction corresponds to a single lane within the trunks and between exchange components of the different IPUs in the given configuration, around which data is transmitted according to the barley twist configuration constraints described above with reference to FIG. 4. Referring to FIGS. 5A-5B, the packet routing described between ph_id_4 and ph_id_5 corresponds to one direction of link L231 in the ladder configuration of FIG. 10A. Similarly, the routing shown between ph_id_4 and ph_id_6 in FIGS. 5A-5B corresponds to the solid line of link L02 of FIG. 10A, and the routing between ph_id_4 and ph_id_2 in FIGS. 5A-5B corresponds to the solid grey line of link L24 in FIG. 10A.

Figure 10B:
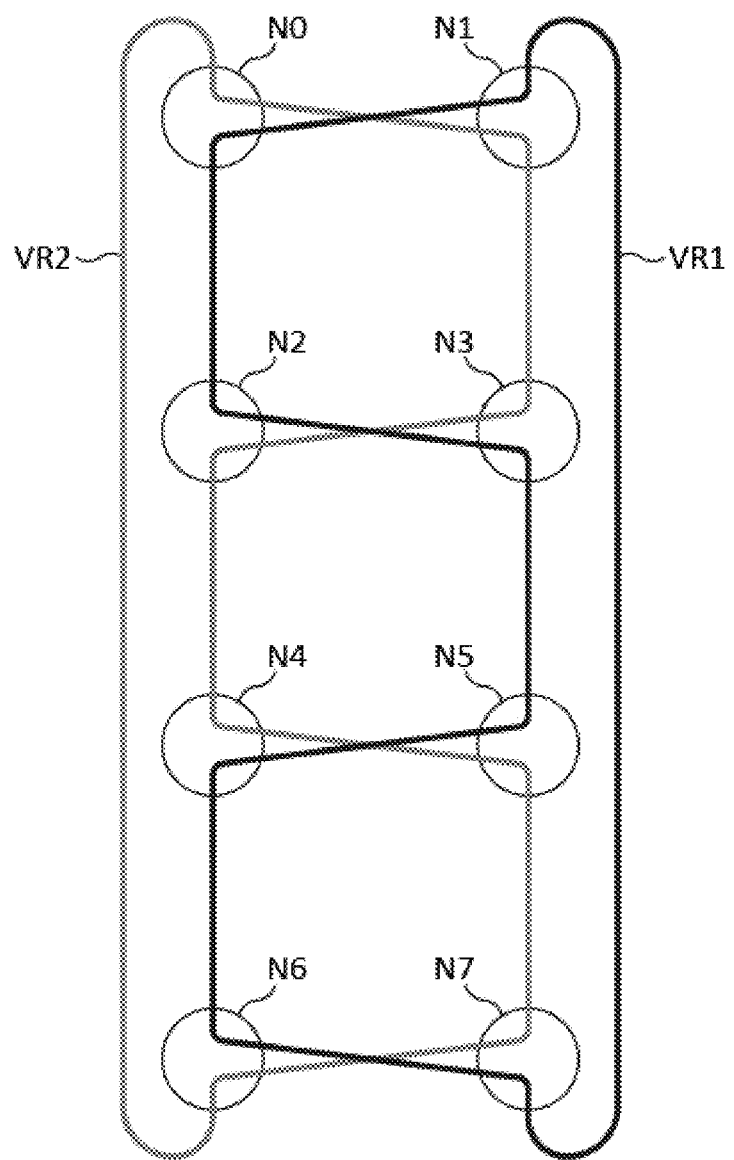

Consider node N0 in FIG. 10A and FIG. 10B. This node N0 has two links which connect it to a node N1 which is referred to as its facing pair node. These links are labelled L011 and L012. The designation of L01 is to indicate that the link connects nodes 0 and 1. The designation 1 indicates that it is the first link between nodes 0 and 1, and the designation 2 denotes that it is the second link between nodes N0 and N1. Note that in this embodiment each of the links are bidirectional. The node N0 also has a third bidirectional link which is labelled L02. This link L02 is connected to a corresponding node N2 in the next adjacent pair in the ladder configuration. The link L02 is referred to as a ladder connecting link for this reason. The node N0 has a fourth link labelled L06. This link connects corresponding nodes N0 and N6 in end pairs of the ladder configuration. In FIGS. 10A and 10B, the first end pair is the facing pair of nodes N0 and N1, and the second end pair are the facing nodes N6 and N7. Note that the processing nodes in the facing pair N6, N7 are similarly connected by two bidirectional links L671. L672.

The link L06 which extends between corresponding nodes of the end pairs (N0 and N6), and correspondingly link L17 which extends between nodes N1 and N7 are referred to ladder return links. The links enable each embedded ring in the ladder configuration to be a full one-dimensional ring.

The ladder configuration in the embodiment of FIG. 10A comprises two intermediate facing pairs, N2/N3 and N4/N5. The facing nodes in each pair are connected by corresponding links L231, L232; L451, L452.

Corresponding nodes in the facing pairs are connected through ladder connecting links. For example, the node N1 in the first end pair is connected to the node N3 and its adjacent intermediate pair by link L13. In FIGS. 10A and 10B, each link is shown by two bidirectional arrows. These may, however, be accommodated in a single physical link structure, and denote the bidirectional communication paths over that physical link structure. In alternative embodiments, each direction of a link structure may be a separate physical manifestation.

In the embodiment of FIGS. 10A and 10B, four facing pairs of eight nodes in total form a ladder configuration. It will readily be appreciated that the ladder configuration may be simply extended to include further facing pairs. This may be done by changing the connectivity of the links on the nodes in the end pair. For example, to add another facing pair to the ladder configuration, the link L06 is disconnected from node N0 and connected to a further node N8 (shown in dotted). This node N8 has its own physical link which is then connected as the ladder return link to node N0. Similarly, the link L17 extending from node N7 to node N1 is disconnected from node N1 and connected to a new node N9 (shown in dotted). A physical link from N9 is then connected as the ladder return link node N1. The nodes N8 and N9 are connected together by physical links N891 and N892.

Further pairs of nodes may be added to the ladder configuration as needed to expand the processing capability of the computer. Note that when the new nodes are added, there is no need to interrupt the existing connectivity for the other pairs of nodes in the ladder configuration, apart from the end pair. This greatly simplifies extension of the ladder configuration to include additional processing nodes as desired.

The embedded rings in the ladder configuration may be considered "barley twist" rings due to their appearance as shown in FIG. 10B, labelled VR1,VR2. It is emphasised that the ring shown in FIG. 10B are the virtual data transmission rings which are embedded in the ladder configuration. These rings can operate simultaneously, as no link is used twice in different conflicting rings.

In order to use this structure, the partial (or fragment) to be transmitted is split into two parts at each node, and each part is all reduced around one of the rings using the one-dimensional ring algorithm which has been described above the reference to FIGS. 9A and 9B.

Each node outputs $$\frac{n-1}{n}(v)$$

size of fragment, where N is the number of nodes, and V is the size of the data structure that is being reduce-scattered or All gathered in a particular phase. At the beginning, V is the size of the partial vector. The number of fragments equals the number of nodes in the ring before each step around the ring. Note that in comparison with the structure described in the Jain paper, the rings pass through all nodes, and all links are used all of the time. It is assumed herein that each processing node can output its data on two links simultaneously, and can receive and process data simultaneously. Each ring is one-dimensional—it is a non-branched chain of processing nodes.

Figure 11A:
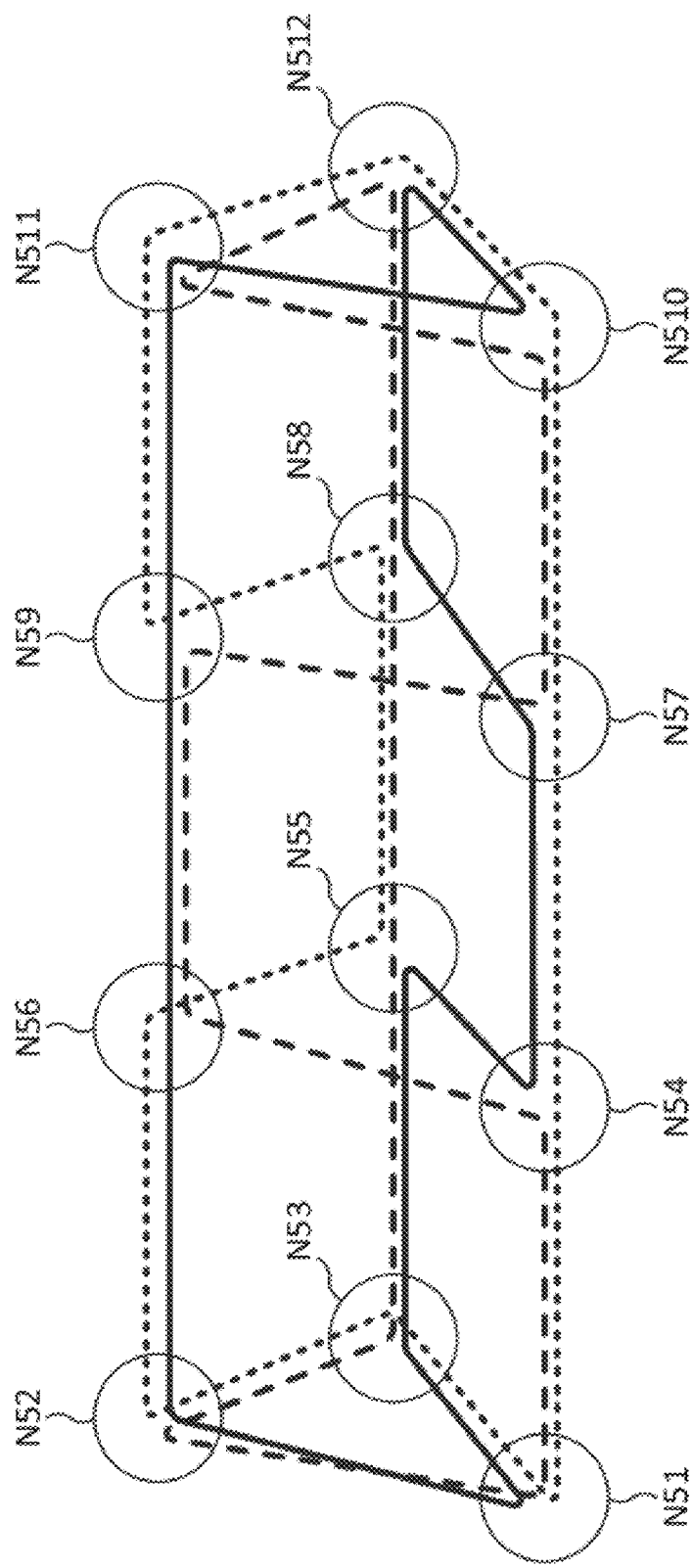
FIGS. 11A and 11B is a schematic diagram of an alternate ("triangular") configuration of processing nodes in which three rings are embedded.
Figure 11B:
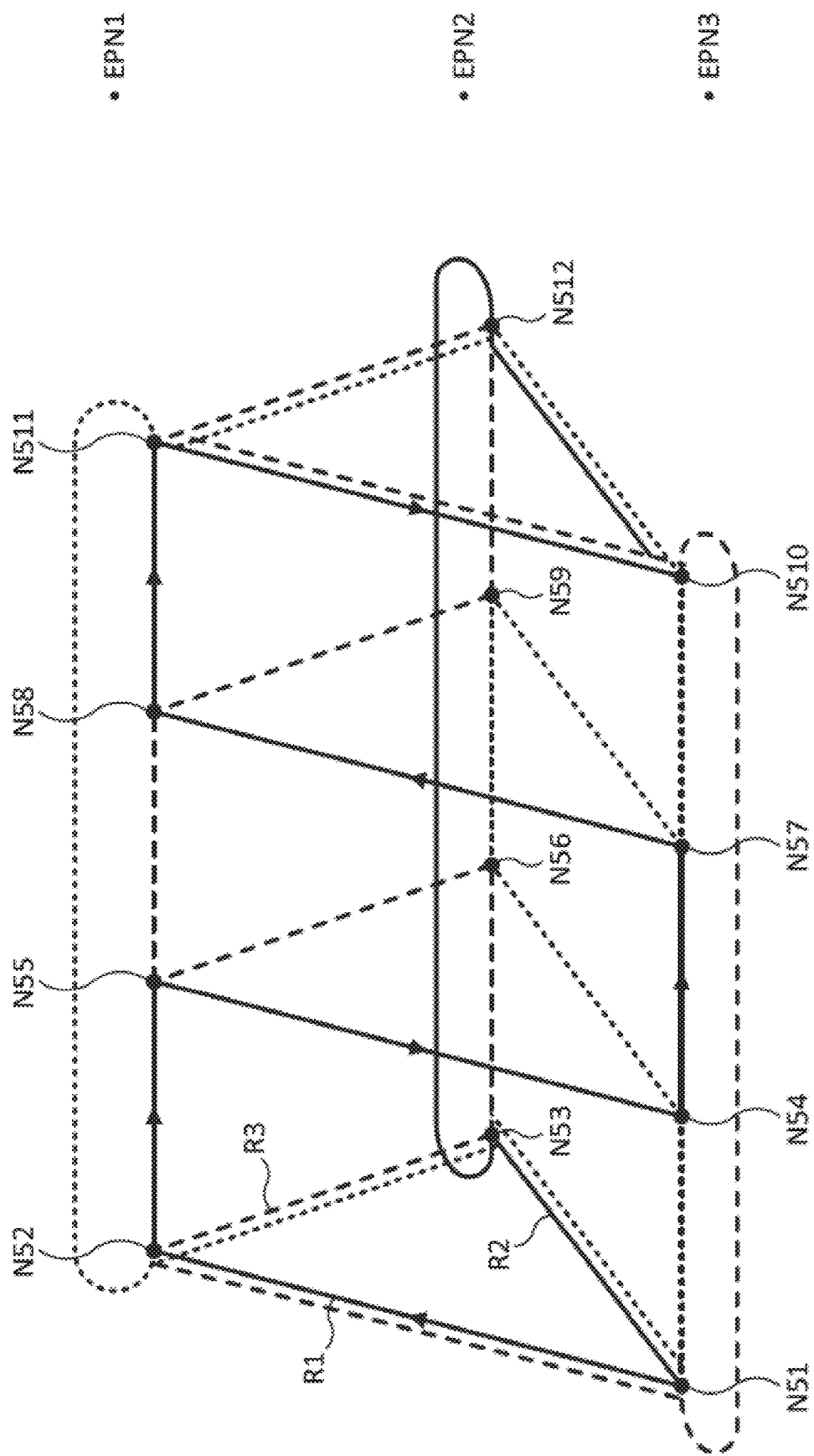

According to another configuration of embedded one-dimensional rings, a configuration is provided with multiple stacked layers. A configuration is shown in FIGS. 11A and 11B, which is a three-dimensional view and FIG. 12, which is an expanded view showing the connectivity. There is a physical connectivity and a logical connectivity which will both be described. According to the physical connectivity (FIG. 12), the configuration comprises multiple stacked layers—the stack shown from left to right in the Figures, rather than in the vertical direction. The orientation of the stacking is not relevant, although it is noted that in practical configurations where processing units may be arranged in server racks, stacking in a vertical configuration corresponding to the server racks can be useful.

Figure 12:
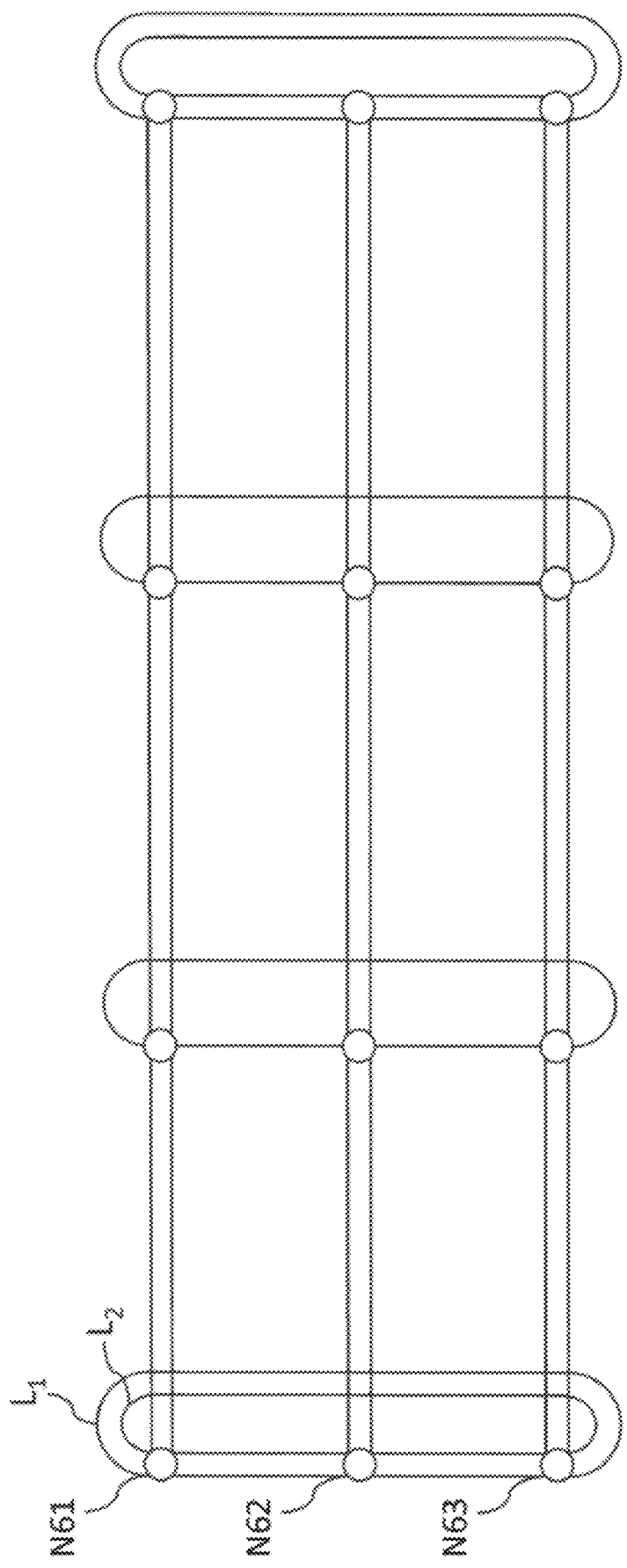
FIG. 12 is a schematic diagram illustrating the rings embedded in the structure of FIG. 11.

Each layer comprises three processing nodes which are shown in the left hand most layer in FIG. 12 as N61, N62 and N63. These processing nodes are connected in a ring wherein each processing node is connected to its adjacent processing node by two links L1, L2. These links may each be bi-directional. The right hand end most layer of the stack is also connected together by two links between nodes. The central layers of the stack are however connected only with single links. Connectivity by a link here means that the links are active and able to transmit data. There may be other inactive connections between the processing nodes, which do not form part of the operation of the configuration.

The configuration is operated to provide three embedded one-dimensional rings which can or operate at the same time. FIG. 11B shows this schematically, with the rings labelled R1, R2 and R3. R1 is shown in a full dark line, R2 is shown as a dotted line and R3 is shown as a dashed line. Considering the configuration as a cylinder of triangular cross-section, each flat face of the cylinder incorporates a one-dimensional embedded ring. For example, the ring R1 is formed by nodes N51, N52 (in the endmost layer), a link between N52 and N55 (between the layers) a link between N55 and N54 (within the next layer), a link between N54 and N57 (between layers), a link between N57 and N58 (within the next layer), a link between N58 and N511 between the layers, a link between N511 and N510 (in the right hand endmost layer), a link between N510 and N512 and a return link between N52 and N53, and back to N51.

Corresponding embedded rings can be found in each of the other two phases. Thus, each ring is formed of a link within each layer connected to a link between layers, and so on until the ring is complete. The rings (or paths) are described in more detail below), with reference to FIG. 11A.

In the first embedded path, node N51 is connected to node N53 along one side of the first endmost layer by the link between nodes N51 and N53. This is an intralayer link along one side of the first endmost layer. The path continues along a next side of the first endmost layer to node N52. The path then proceeds from node N52 to node N56 via an interlayer link. The path then proceeds from node N56 to N55 via another intralayer link on the same face of the configuration as nodes N52 and N56. The path extends down this face from node N55 to node N58 and then across the face along the intralayer link to node N57. The path proceeds from node N59 to node N511 along an interlayer link and then along an intralayer link from node N61 to node N512 from where it proceeds along an intralayer link from N512 to node N510 of the second end most layer. The intralayer links between nodes N511, N512 and N510 are sides of the second endmost layer. The path then proceeds along a return portion from node N510 to node N51 of the first end most layer. This path is shown by a small dashed line in FIG. 11A.

A second embedded path can also be shown commencing from node N51 shown in a solid black line. This path has a first portion along the "bottom" face of the configuration shown in FIG. 11A extending from node N51 to node N53, from node N53 to node N55, from node N55 to node N57, from node N54 to N57, from node N57 to N58, from node N58 to N512 and from node N512 up to node N511. A return second portion of the path is provided by the interconnecting link between node N511 of the second endmost layer and N52 of the first endmost layer.

A third embedded path can be shown starting at node N53 and extending along intralayer link to node N52: the third embedded path is shown in large dash. The path then proceeds along the rear face of the configuration shown in FIG. 11A from node N52 to N51, N51 to N54, N54 to N56, node N56 to N59, from node N59 to N57, from node N57 to N510, from node N510 to node N511 and from node N511 to N512. The path has a return portion from node N512 to N53.

Note that each path has a first portion which uses each of the nodes in one face of the configuration only once, and two "legs" of each of the endmost layers. Each path then has a return portion which passes directly between endmost layers, along an opposing edge of the configuration, using all processing nodes in the return portion.

The three embedded rings may operate simultaneously. If all of the links are capable of simultaneous bi-directional operation, six embedded rings may operate simultaneously.

The capacity of the computer may be extended by adding new layers of processing nodes. In order to do this, the interconnectivity of the processing nodes is altered. For example, consider the addition of an extra layer added on to the second endmost layer (the right-hand layer in FIG. 11A). One of the links from node N511 is disconnected and is connected to a corresponding processing node in an additional layer, the processing node shown labelled EPN1 (extra processing node 1). Similarly, one of the links from each of node N512 and node N511 is disconnected from their currently connected node and are connected to corresponding extra processing nodes labelled EPN2 and EPN3 respectively. Nodes EPN1, EPN2 and EPN3 are then themselves connected in a ring with respective link structures as in the other layers of the configuration. Note that the connectivity of the remaining part of the configuration remains the same. Layers may be added in this way to either end of the configuration stack.

Note that the paths taken around each layer (set of three nodes) of the triangular cylinder configuration is such that an extended triangular prism of layers of three processing nodes could be partitioned into different lengths, such that each partition could operate in a self-contained manner. This could be done by deactivating links between the layers of separate partitions. This is discussed in more detail later. Note that although in FIG. 11B the return portions are shown looping back, this is diagrammatic only. In one implementation each existing link between the individual processing nodes along an edge is utilised as part of the return portion, with the data values being passed through each processing node without further processing until it reaches the end most processing node.

In some embodiments, the reference to operating as a ring refers to the implementation of a one-dimensional algorithm as described above to implement the Allreduce collective. In the structure of FIGS. 11A, 11B and 12, all three rings can operate simultaneously, enabling the division of a partial vector at each node into three parts for simultaneous processing over three rings in the structure.

Figure 14A:
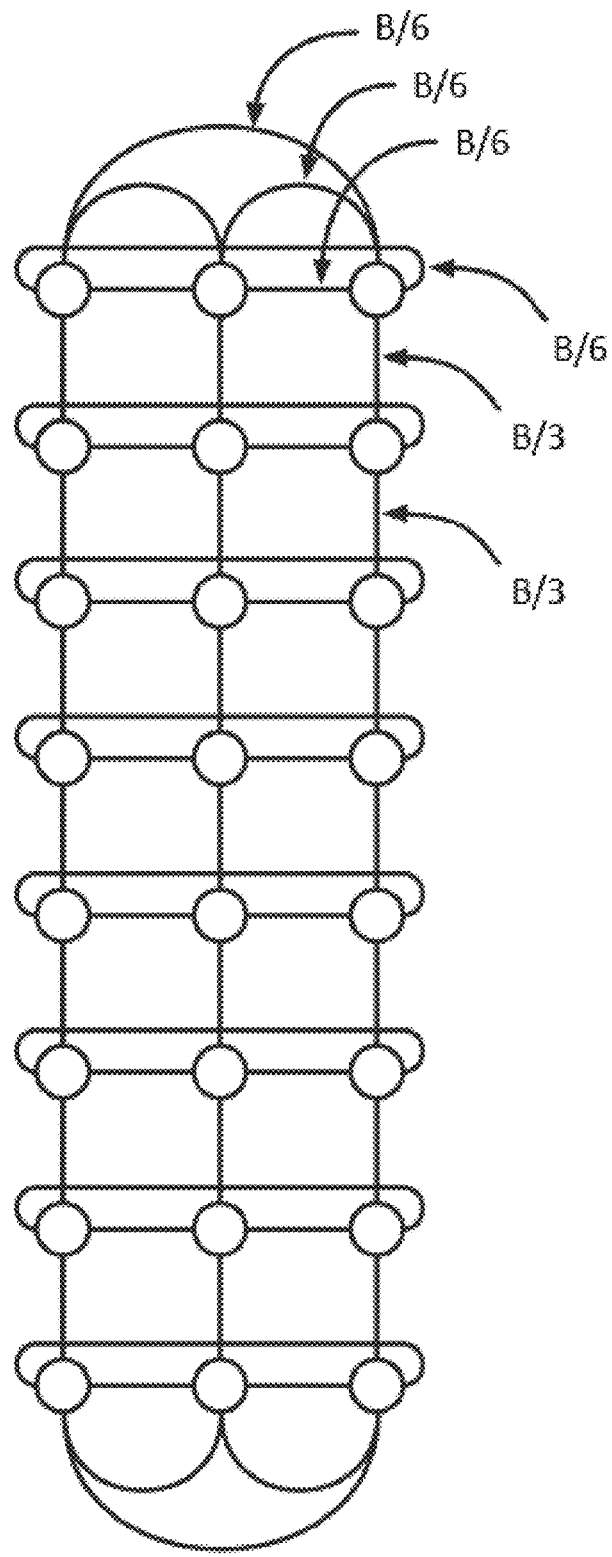
FIG. 14A illustrates a 3×8 triangular prism, with 1:2 bandwidth asymmetry.

FIG. 14A illustrates an embodiment with 24 processing nodes arranged in a 3×8 triangular prism with 1:2 bandwidth symmetry. The bandwidth utilisation is noted on the links. FIG. 14A shows the connectivity of the graph showing allocation of total node bandwidth B to each link. Note that the intralayer links have a bandwidth of B/6, and the interlayer links have a bandwidth of B/3

Figure 14B:
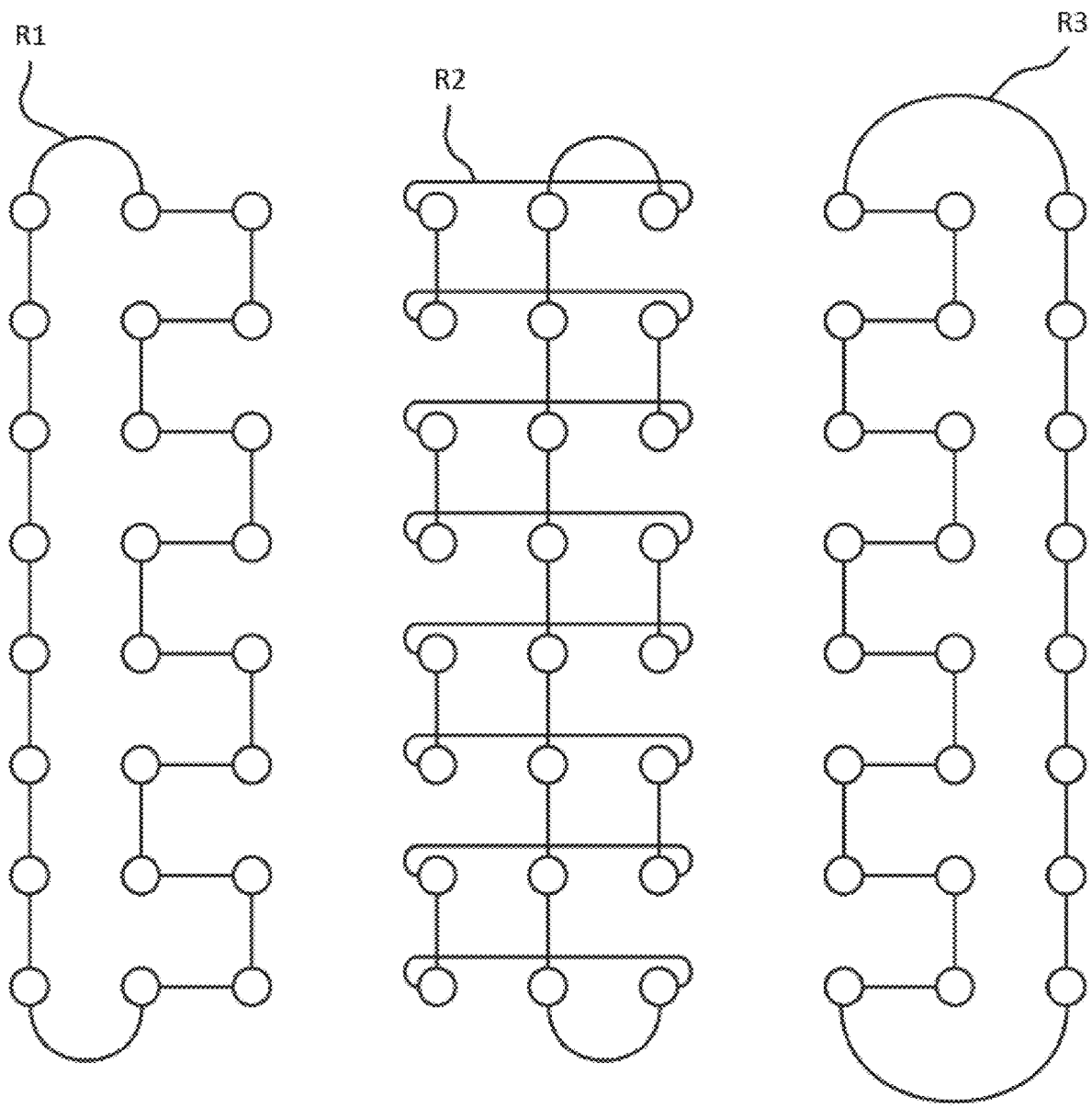
FIG. 14B shows three isomorphic embedded rings which can circulate concurrently on the graph, each using B/6 per link.

FIG. 14B illustrates three isomorphic embedded rings which can circulate concurrently on the structure. Each ring has a bandwidth utilisation of B/6 per link.

Figure 14C:
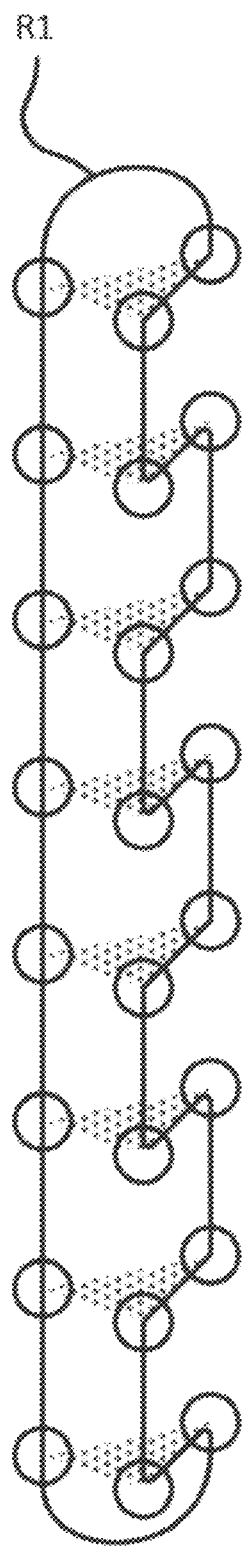
FIG. 14C is a 3D view, showing one of three embedded rings.

FIG. 14C is a three-dimensional view showing one of the 3 embedded rings. The ring R1 is shown in FIG. 14C. Note that the other two rings R2, R3 are the same rotated 120 degrees about the long axis.

Figure 13:
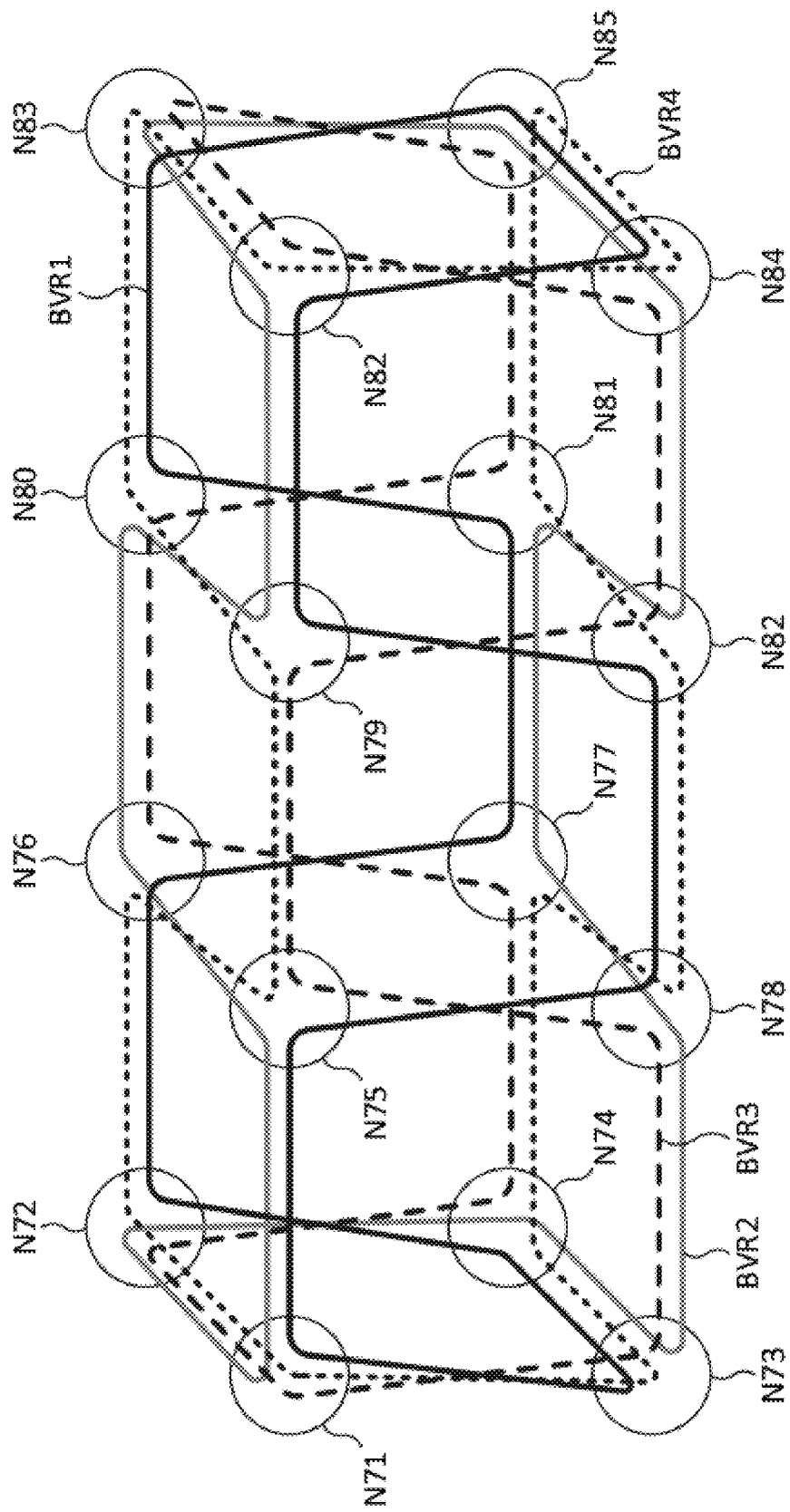
FIG. 13 is a schematic diagram of a further alternate ("box tube") configuration in which four rings are embedded.

According to another configuration, a "box tube" structure may be provided as illustrated in FIG. 13. Reverting to the "ladder" configurations of FIGS. 10A and 10B, a return portion of each path was provided in the direction perpendicular to the pairs (or runs) of the ladder. In the box-tube configuration shown in FIG. 13, the return portion of each path may be implemented by a ladder configuration on a rear face of a rectangular prism. That is, in the box-tube configuration, a front face may operate as the ladder of FIGS. 10A and 10B, and a rear face may operate as the ladder of FIGS. 10A and 10B, thus enabling four rings to be embedded as shown by respective colours in FIG. 13. Note that the paths taken around each layer (set of four nodes) of the box structure is such that an extended "tube" of layers of 2×2 processing nodes could be partitioned into different lengths, such that each partition could operate in a self-contained manner. This could be done by deactivating links between the layers of separate partitions.

Four virtual rings can be seen embedded in the "box tube" configuration shown in FIG. 13. These are labelled BVR1, BVR2, BVR3, BVR4 (representing box tube virtual ring). Note that this terminology is to distinguish the rings from virtual rings in the ladder configuration (VR) and virtual rings in the triangular configuration (R). However, the function and operation of the embedded rings is the same in all three structures.

A first embedded ring BVR1 operating starting at, for example, node N71 at the top left hand corner of the structure shown in FIG. 13. It passes from node N71 in a first endmost layer of four nodes (at the left hand end of the box structure shown in FIG. 13). The virtual ring BVR1 extends around three nodes of that layer, N73, N74 and N72. It then extends to a node in the next layer of four nodes, at node N76. It passes down one side of this layer to node N77 and then extends to an adjacent node in the next layer on that face, N81. The ring then continues up one side of that layer to node N80 and from there to the next (and in this case last) layer in the structure at node N83. The ring BVR1 then passes round three sides of that endmost layer through nodes N85, N84 and N82 before returning in a return portion along the other face of the box tube structure via nodes N79, N82, N78, N75 before returning to N71. Note that the ring has been described as starting from node N71 and described in a particular direction. In fact, the ring may operate in both directions at once using bi-directional links that can operate in both directions at once. Moreover, the "starting node" of the ring can be any of the nodes on the ring, in particular for different fragments of data as already described. Note that in general terms the ring passes through three sides of each end face of the box-tube structure and travels along each side face of the box-tube structure in an alternating fashion, visiting all nodes in the face only. Note that the configuration of the virtual ring on each side face of the box structure is similar to that of the ladder structure. As has already been mentioned, the box tube structure could be considered as a type of ladder structure but with a return path which is extended by passing through an end face of the box structure and an opposed side face of the box structure in each case.

Three other virtual rings are formed in the box-tube structure. A second ring BVR2 passes from node N71 to N72 to N74 to N73 (three sides of the end face). From there it goes along the "bottom" face of the box-tube structure in an alternating fashion via nodes N78, N77, N81, N82 and N84. It travels round three sides of the end face via nodes N85, N83 and N82 before returning along the top face of the box structure in an alternating fashion via N79, N80, N76, N75 back to N71.

A third ring is more readily explained by starting at node N73 because it uses three sides of the end face through node N71, N72 and N74 before passing in an alternating style via node N77, N76, N80, N81, N85 and N83. From there it goes via N82 and N84 to the return face of the box-tube structure which it passes in an alternating fashion via node N82. N79, N75, N78 and back to N73.

A fourth virtual ring BVR4 may be considered to start at node N74 to travel round three sides of the end face via nodes N73, N71 and N72. It then traverses the top face of the box tube structure in an alternating fashion via N76, N74, N79, N80, N83 and N82. It then traverses the end face via N84 and N85 before returning along the bottom face of the box tube structure via nodes N81, N82, N78, N77 and N74.

Each node is capable of implementing a processing or compute function. Each node could be implemented as a single processor. It is more likely, however, that each node will be implemented as a single chip or package of chips, wherein each chip comprises multiple processors. There are many possible different manifestations of each individual node. In one example, a node may be constituted by an intelligence processing unit of the type described in US Patent Application Publication Nos. US2019121668A1; US2019121387A1; US2019121777A1; the contents of which are herein incorporated by reference. However, the techniques described herein may be used on any type of processor constituting the nodes. What is outlined herein is a method of exchanging data in an efficient manner to implement a particular exchange pattern which is useful in machine learning models. Furthermore, the links could be manifest in any suitable way. It is advantageous that they are bi-directional and preferable that they can operate in both directions at once, although this is not an essential requirement. One particular category of communication link is a SERDES link which has a power requirement which is independent of the amount of data that is carried over the link, or the time spent carrying that data. SERDES is an acronym for Serializer/DeSerializer and such links are known. In order to transmit a signal on a wire of such links, power is required to be applied to the wire to change the voltage in order to generate the signal. A SERDES link has the characteristic that power is continually applied to the wire to maintain it at a certain voltage level, such that signals may be conveyed by a variation in that voltage level (rather than by a variation between 0 and an applied voltage level). Thus, there is a fixed power for a bandwidth capacity on a SERDES link whether it is used or not. A SERDES link is implemented at each end by circuitry which connects a link layer device to a physical link such as copper wires. This circuitry is sometimes referred to as PHY (physical layer). PCIe (Peripheral Component Interconnect Express) is an interface standard for connecting high speed computers.

It is possible that the links could be dynamically deactivated to consume effectively no power while not in use. However, the activation time and non-deterministic nature of machine learning applications generally render dynamic activation during program execution as problematic. As a consequence, the present inventor has determined that it may be better to make use of the fact that the chip to chip link power consumption is essentially constant for any particular configuration, and that therefore the best optimisation is to maximise the use of the physical links by maintaining chip to chip traffic concurrent with IPU activity as far as is possible.

SERDES PHYs are full duplex (that is a 16 Gbit per second PHY supports 16 Gbits per second in each direction simultaneously), so full link bandwidth utilisation implies balanced bi-directional traffic. Moreover, note that there is significant advantage in using direct chip to chip communication as compared with indirect communication such as via switches. Direct chip to chip communication is much more power efficient than switched communication.

Another factor to be taken into consideration is the bandwidth requirement between nodes. An aim is to have sufficient bandwidth to conceal inter node communication behind the computations carried out at each node for distributed machine learning.

When optimising a machine architecture for machine learning, the Allreduce collective may be used as a yardstick for the required bandwidth. An example of the Allreduce collective has been given above in the handling of parameter updating for model averaging. Other examples include gradient averaging and computing norms.

As one example, the Allreduce requirements of a residual learning network may be considered. A residual learning network is a class of deep convolutional neural network. In a deep convolutional neural network, multiple layers are utilised to learn respective features within each layer. In residual learning, residuals may be learnt instead of features. A particular residual learning network known as ResNet implements direct connections between different layers of the network. It has been demonstrated that training such residual networks may be easier in some contexts than conventional deep convolutional neural networks.

ResNet 50 is a 50 layer residual network. ResNet 50 has 25 M weights so Allreduce of all weight gradients in single position floating point format F16 involves partials of 50 megabytes. It is assumed for the sake of exemplifying the bandwidth requirement that one full Allreduce is required per full batch. This is likely to be (but does not need to be) an Allreduce of gradients. To achieve this, each node must output 100 megabits per all reduce. ResNet 50 requires 250 gigaflops per image for training. If the sub-batch size per processing node is 16 images, each processor executes 400 gigaflops for each Allreduce collective. If a processor achieves 100 teraflops per second, it requires around 25 gigabits per second between all links to sustain concurrency of compute with Allreduce communication. With a sub-batch per processor of 8 images, the required bandwidth nominally doubles, mitigated in part by lower achievable teraflops per second to process the smaller batch.

Implementation of an Allreduce collective between p processors, each starting with a partial of size m megabytes (equal to the reduction size) requires that at least $2 \cdot m \cdot (p-1)$ megabytes are sent over links. So the asymptotic minimum reduction time is $2 \cdot m \cdot (p-1) \cdot (p-1)$ over $(p \cdot l)$ if each processor has l links it can send over simultaneously.

The above described concepts and techniques can be utilised in several different exemplifications.

In one exemplification a fixed configuration is provided for use as a computer. In this exemplification, processing nodes are interconnected as described and illustrated in the various embodiments discussed above. In such arrangements, only essential intralayer and interlayer links are put in place between the processing nodes. In the embodiments with end faces (for example the box tube prism and triangular prism) there may be more interlayer links between adjacent processing nodes in the end most layers constituting the end faces than in the intermediate layers. Note that the term "faces" is used to define not only the elongate faces, but may also refer to the end face of the prisms. However, the end face of the prism in each case constitutes a ring of processing nodes in the respective end most layers as described above.

A fixed configuration may be constructed from a precise number of processing nodes for that configuration. Alternatively, it may be provided by partitioning it from a larger structure. That is, there may be provided a set of processing nodes which constitute a multiface prism with a set of stacked layers. The processing nodes in each stacked layer may have an interlayer link to a corresponding processing node in an adjacent stacked layer and an intralayer link between neighbouring processing nodes in the layer. To that extent, this multiface prism resembles the configurations described and illustrated in the figures of the multiface structures.

A fixed configuration of a desired number of stacked layers may be provided by disconnecting each interlayer link in a designated stacked layer of the origin set of stacked layers and connecting it to a neighbouring processing node in the designated stacked layer to provide an intralayer link. In this way, a designated stacked layer of the origin set of stacked layers may be caused to form one of the first and second endmost layers of a structure. Note that an origin set of layers may in this way be partitioned into more than one fixed configuration structure.

The interlayer and intralayer links are physical links provided by suitable buses or wires as mentioned above. In one manifestation, each processing node has a set of wires extending out of it for connecting it to another processing node. This may be done for example by one or more interface of each processing node having one or more port to which one or more physical wire is connected.

In another manifestation, the links may be constituted by on-board wires. For example, a single board may support a group of chips, for example four chips. Each chip has an interface with ports connectable to the other chips. Connections may be formed between the chips by soldering wires onto the board according to a predetermined method. Note that the concepts and techniques described herein are particularly useful in that context, because they make maximise use of links which have been pre soldered between chips on a printed circuit board.

The concepts and techniques described herein are particularly useful because they enable optimum use to be made of non-switchable links. A configuration may be built by connecting up the processing nodes as described herein using the fixed non switchable links between the nodes. In some manifestations, there is no need to provide additional links between the processing nodes if such links will not be utilised. For example, in intermediate layers in the configuration there are less links between processing nodes than in the endmost layers. Alternatively, links may be provided between processing nodes, but may be permanently deactivated in certain configurations.

In order to use the configuration, a set of parallel programs are generated. The set of parallel programs contain node level programs, that is programs designated to work on particular processing nodes in a configuration. The set of parallel programs to operate on a particular configuration may be generated by a compiler. It is the responsibility of the compiler to generate node level programs which correctly define the links to be used for each data transmission step for certain data. These programs include one or more instruction for effecting data transmission in a data transmission stage which uses a link identifier to identify the link to be used for that transmission stage. For example, a processing node may have two or three active links at any one time (double that if the links are simultaneously bidirectional). The link identifier causes the correct link to be selected for the data items for that transmission stage. Note that each processing node may be agnostic of the actions of its neighbouring nodes—the exchange activity is pre compiled for each exchange stage.

Note also that links do not have to be switched—there is no need for active routing of the data items at the time at which they are transmitted, or to change the connectivity of the links.

As mentioned above, the configurations of computer networks described herein are to enhance parallelism in computing. In this context, parallelism is achieved by loading node level programs into the processing nodes of the configuration which are intended to be executed in parallel, for example to train an artificial intelligence model in a distributed manner as discussed earlier. It will be readily be appreciated however that this is only one application of the parallelism enabled by the configurations described herein. One scheme for achieving parallelism is known as "bulk synchronous parallel" (BSP) computing. According to a BSP protocol, each processing node performs a compute phase and an exchange phase which follows the compute phase. During the compute phase, each processing nodes performs its computation tasks locally but does not exchange the results of its computations with the other processing nodes. In the exchange phase, each processing node is permitted to exchange the results of its computations from the preceding compute phase with the other processing nodes in the configuration. A new compute phase is not commenced until the exchange phase has been completed on the configuration. In this form of BSP protocol, a barrier synchronisation is placed at the juncture transitioning from the compute phase into the exchange phase, or transitioning from the exchange phase into the compute phase or both.

In the present embodiments, when the exchange phase is initiated, each processing node executes an instruction to exchange data with its adjacent nodes, using the link identifier established by the compiler for that exchange phase. The nature of the exchange phase can be established by using the MPI message passing standard discussed earlier. For example, a collective may be recalled from a library, such as the all reduced collective. In this way, the compiler has precompiled node level programs which control the links over which the partial vectors are transmitted (or respective fragments of the partial vectors are transmitted).

It will readily be apparent that other synchronisation protocols may be utilised.

In embodiments the disclosed mechanism may be used to implement a BSP scheme. As illustrated in FIG. 15, in a BSP scheme, the system operates in an alternating cycle of exchange phase 50 and a compute phase 52. In each cycle, the exchange phase 50 comprises a respective exchange phase on each tile 4, and the compute phase 52 comprises a respective compute phase on each tile 4. In the present case a barrier synchronization 30 is placed between the compute phase 52 and next exchange phase 50 each cycle. I.e. all the tiles 4 are required to complete their respective compute phase 52 before any is allowed to proceed to the next exchange phase 50. In embodiments this may be implemented by a synchronization mechanism, for example as described in US Publication No. US2019155768A1.

When a given tile 4 has completed its current respective exchange phase 50, it can proceed directly to its next compute phase 52—it does not need to wait for all the other tiles 4 to complete their exchange phases. Nonetheless, the compute phase 52 on the given tile 4 may still be dependent on receiving data from one or some other tiles 4 and/or other external sources. For data from tiles 4 on the same chip, the program can time any dependent computations relative to the known exchange timing of the time-deterministic interconnect (discussed in more detail herein with respect to FIG. 16).

Note: for the sake of illustration, the above discussion has assumed that every exchange involves an external exchange between at least some tiles 4 on different chips 2. In the fact the BSP behaviour may be split into internal and external domains.

In embodiments, exchange of data via the internal (on-chip) interconnect 34 can be made time deterministic, as will be discussed in more detail shortly with reference to FIG. 16; whereas exchange of data via an external interconnect may be non-time-deterministic, e.g. due to a lossy physical channel which will require retransmission of messages. In general an external interconnect could be made time-deterministic, but it may be difficult to do so or might confer too little advantage over a non-deterministic interconnect, and so may not be implemented in practice.

It may be desirable to keep the internal communications time deterministic so that they can be conducted without the need for queues in the internal interconnect 34, since queues would incur an undesirable silicon footprint in the interconnect 34. However, in embodiments external communications may not be time deterministic.

In embodiments the exchange mechanism does not distinguish between transmission from external tiles 4 and external sources other than tiles 4, or at least does not exclude transmissions from other such sources. For example, such other external sources could comprise the host 93 (shown in FIG. 1), and/or one or more other external sources such as an external storage drive, network card, etc. In such cases the exchange request (XREQ) from one of the tiles 4 (e.g. as determined by the compiler) may also specify one or more of the other external sources, e.g. host 93.

Thus, each tile 4 is advantageously provided with a mechanism to exchange data between domains that are non-time-deterministic or asynchronous with respect to one another.

The access of tiles of the IPU by exchange blocks which enables exchange of packets according to the above configuration is briefly described above with reference to FIGS. 6A-6B. A fuller description of the operation of the exchange block and time deterministic interconnect 34 will now be provided with reference to FIG. 16. Further details are given in US Publication No. US2019155768A1 the contents of which are herein incorporated by reference.

When there is an external exchange to perform between tiles 4 on different chips 2, software (program code portions) running on at least one of the tiles 4 sends an XREQ to one of the exchange blocks 104 to which it is connected via the interconnect. The exchange request may be sent as a control packet over the same data path 218, 140x,140,301 as used to exchange data (i.e. data content). However, it is not excluded that it could be signalled over a separate control path built into the external interconnect. In embodiments a single one of the tiles 4 sends the exchange request on behalf of all the tiles 4 with data to send externally (off-chip) in a current exchange phase (e.g. an exchange phase of a BSP superstep), or at least all of those within a certain group (which in embodiments may be a synchronisation group). The compiler determines which tile 4 is to send the exchange request on behalf of which others and complies the software on the responsible tile 4 with a suitable instruction or instructions to send the exchange request. This may be possible for example because the system is running a pre-compiled static graph.

The exchange request message(s) tells the appropriate exchange block 104 servicing that tile which tiles 4 have data content to exchange externally in the current exchange phase. XREQ serves as an initiation of external exchange from tiles. The exchange block 104 starts with one of these indicated tiles 4 by sending an "exchange-on" message (XON) to that tile 4. In response, the tile 4 in question begins transmitting data packets over the external interconnect via the trunk router and relevant link interface each indicating a destination tile 4 in a header of the packet. Each exchange block 104 comprises a queue (FIFO buffer) arranged to receive and buffer the packets sent over the external interconnect. At the other end of the queue each exchange block 104 routes the packets to their destination based on their headers.

Each exchange block 104 has the following interfaces:
xen and xes, two ELink interfaces for traffic leaving the exchange block 104 for the trunk northwards and southwards respectively
xin and xis, two ELink interfaces for traffic entering the exchange block from the trunk for south-going and north-going traffic respectively. Note that since south going traffic in the trunk router passes the north interface, xin first, it enters here, and not via xis. Vice versa for north-going traffic.
tlinkrx interfaces, and tlinktx interfaces for communicating with the time deterministic interconnect.

The operative state of each exchange block context is managed by an Exchange Sequencer unit (XSEQ). In the DISABLED state, the context does not initiate TLink or ELink packets. Any TLink packets received are dropped silently and ELink packets are dropped with an error. A write to the 'EN' field of the control and status register causes the exchange block context to transition to the COMMIT state. In the COMMIT state, the context may receive ELink ETWR packets to be converted to TLink XTWR packets and distribute to the correct tiles. As mentioned above, the exchange block 104 communicates directly with the tiles via 4 external spine buses (driven by the exchange block 104) and tile spine buses each driven by one tile processor. The context must also prepare to receive an exchange request (XREQ) packet from a single tile processor nominated in an exchange block control register by switching the TLink multiplexor (MUX) to point at the nominated tile.

TLink packets are used for exchange between tiles 4 and exchange blocks 104, and will now be described in more detail. TLink packets may have thirty-two bit data width, in keeping with that of the interconnect 34. TLink packets consist of a header and a payload, as distinct from the internal exchange protocol that runs between tiles and does not include a header. TLink packets are issued when the tile processor is in TLINK_EXCHANGE_MODE and internal exchange packets are used in HEADERLESS_EXCHANGE_MODE. The interconnect 34 contains bits which are set to 1b for TLink exchange.

TLink packet types include exchange request (XREQ), tile write (XTWR), PCI read/write (XPWR, XPRD) and flow control (XFC) packets. XTWR, XPWR and XPRD map to the respective ELink packets ETWR, EPWR and EPRD. XREQ does not have an ELink mapping as they are local between exchange blocks and tiles on the same IPU only.

Tile processor behaviour for operation with the exchange blocks will now be described. The tile processor sets $INCOMING_MUX to listen to its parent exchange block prior to issuing any sync request that may result in it receiving data externally and/or that will leave the control program in a state where it has external data to send. When $INCOMING_MUX is set to listen to any external interconnect (as opposed to another tile processor), then the tile processor shall enter TLINK_EXCHANGE_MODE in which all received data at the output of its incoming mux is treated as TLink packets. When $INCOMING_MUX is set to listen to another tile processor then the tile processor enters HEADERLESS_EXCHANGE_MODE in which all received data at the output of its incoming mux is treated as header-less internal exchange data.

XFC packets are sent by exchange blocks and affect a flow control state (SFC_STATE) bit of a tile via a tile ID in their headers by setting the $FC_STATE to 1b for the tile processor with matching tile ID and every other tile processor's $FC_STATE is set to 0b. This allows flow control of tile packets. In TLINK_EXCHANGE_MODE the tile processor recognises packets arriving on its incoming mux and is able to decode the XFC packet to determine whether it has been selected or deselected by the XFC packet. Either way it maintains a single bit of architectural state, that reflects the XFC selection state (0b for deselected/XOFF, 1b for selected/XON).

If a tile in TLink exchange mode expects to receive data following a sync request it must set its $INCOMING_COUNT register to the number of words it expects to receive from external sources. The only kind of data packet a tile processor can receive in TLink exchange mode is an XTWR, of payload length between 4 and 256 bytes. If a tile processor in this mode receives a packet when its $INCOMING_COUNT is 0 or where $INCOMING_COUNT is not equal to or greater than the packet payload length, then this packet is discarded, and an appropriate exception raised by the tile processor. The tile processor must be capable of recognising incoming XTWR packets which have a tile ID that matches the tile processor's tile ID at its incoming mux and ensure that these are written to its own memory at the location specified in the address field of the XTWR packet header. The tile processor must arrange its code, transmission data and buffers for received data such that incoming XTWR packets do not create bank conflicts with instruction fetch or TLink packet transmission.

Following setup for TLINK_EXCHANGE_MODE as per above, the tile is free to issue SENDs that dispatch TLink XTWR, XPWR and XPRD packets to its exchange block. In the event that the tile has not been selected by an XFC packet from the exchange block, or if it has been deselected by an XFC packet where it was previously selected, that SEND pauses. The tile processor is not required to transmit the entire packet contiguously and there may be gaps between one header word and another, between header and payload words, and between payload words. A SEND that has already begun when a tile becomes deselected by an XFC packet is not paused but any subsequent SEND is.

TLink packet headers may include the following fields. The FMT field defines the packet type, described above. The LAST field is set to 1b by a tile processor which is sending its last packet for exchange defined by the XREQ packet that was sent at the beginning of the exchange. All other packets have LAST set to 0b. The PEN field is set to 1b by a tile processor sending its penultimate packet for the exchange defined by the XREQ packet that was sent at the beginning of the exchange. All other packets have PEN set to 0b.

The tile processor must mark its last transmitted packet by setting the LAST bit of the TLink packet header. The tile processor must mark one transmitted packet by setting the PEN bit of the TLink packet header. The PEN packet indicates to the exchange block that it may XON the next tile in the exchange sequence and XOFF the current tile so the compiler must ensure that the LAST packet it issues will leave the tile before the XOFF packet arrives. The compiler must also ensure that packets transmitted by the next tile in the exchange sequence will not arrive at the exchange block before the LAST packet from the current tile has completed. If the tile only sends one packet it shall set both the PEN and LAST bits of the TLink header. The tile processor should not attempt to send more than one TLink packet with one send instruction.

Once the currently transmitting tile 4 has sent its last packet (LAST=1b), the exchange block 104 sends an exchange-off (XOFF) message to that tile 4. The exchange block 104 then sends an exchange-on message to the next tile 4 indicated in the exchange request(s) as having data to send, and so forth until all the indicated tiles 4 have sent all the packets they had to send in the current exchange phase. The exchange-on and exchange-off messages may be sent as control packets over the same data path 218, 140 as used to exchange data (i.e. data content).

Alternatively, it is not excluded that they could be signalled over a separate control path built into the external interconnect.

In embodiments, exchange of data on-chip (internal exchange) may be performed in a time-deterministic manner without the need for queues. Reference is made to FIG. 16. The communication without queues can be achieved by the compiler knowing the time at which each tile 4 transmits its data, and also knowing the on-chip inter-tile delay between the transmitting and receiving tile. Given this predetermined knowledge, the compiler can then program the receiving tile to "listen" to the transmitting tile at a specific, known time after the transmission of the relevant data by the transmitting tile, i.e. the transmit time plus the inter-tile delay. The timing of the transmission is known by the compiler because the compiler itself selects at which point in each thread to include the send instruction(s). Further, the inter-tile delay, for on-chip communications, is a fixed knowable value for a given pair of transmitting and receiving tiles 4. The compiler may know this from a look-up table of inter-tile delays for different possible combinations of sending and receiving tiles. The compiler can then include the corresponding receive instruction, to listen to the sender's address, at the corresponding number of cycles after the transmit instruction.

Each tile 4 comprises a respective processing unit 10 comprising an execution unit 13, e.g. pipeline. Each tile 4 also comprises a respective memory 11 comprising a respective instruction memory 12 for storing code to be executed by the respective execution unit 10, and a respective data memory storing data operated on by the respective executed code (data to be operated on by the code, and/or data resulting from the operations). The execution unit 13 comprises a fetch stage 14, decode stage 16 and execution stage 18, preferably arranged in a pipelined manner. The fetch stage 14 controls the issue of machine code instructions from the instruction memory 12 into the rest of the pipeline or execution unit 13, to be decoded and executed by the decode and execution stages 16, 18 respectively. Context register files 26 comprises a respective set of registers for representing the program state of a respective thread.

Each IPU 2 comprises a respective clock which controls the timing of chip activity. The clock is connected to all of the chip's circuits and components. The IPU 2 also comprises the internal, time-deterministic interconnect 34 to which all tiles and links are connected by sets of connection wires. In embodiments the interconnect 34 may be stateless, in that it has no state readable by software. Each set of connection wires is fixed end to end. The wires are pipelined. Each set can carry a packet consisting of one or more datums, with one datum being transferred per clock cycle. But note herein that the word "packet" denotes a set of bits representing a datum (sometimes referred to herein as a data item), perhaps with one or more valid bit. The "packets" for on chip tile-to-tile communication do not have headers or any form of destination identifier (which permits an intended recipient to be uniquely identified), nor do they have end-of-packet information. Instead, they each represent a numerical value input to or output from a tile. Each tile has its own local memory (described later). The IPU 2 has no shared memory. The interconnect 34 constitutes a cross set of connection wires only and also does not hold any state. Data exchange between tiles on the same chip is conducted on a time deterministic basis as described herein. Each exchange path is a pipelined connection wire comprising a series of temporary stores, e.g. latches or flip flops which hold datum for a clock cycle before releasing it to the next store. Time of travel along the wire is determined by these temporary stores, each one using up a clock cycle of time in a path between any two points. The clock is not shown in FIG. 16.

At the end of a compute phase, once it has been established that each tile 4 is ready to send data, the system enters the exchange phase 50. In this exchange phase, data values move between tiles (in fact between the memories of tiles in a memory-to-memory data movement). In the exchange phase, there are no computations and therefore no concurrency hazards (or at least there are no computations that rely on data yet to be received from another tile 4). In the exchange phase, each datum moves along the connection wires on which it exits a tile from a transmitting tile to its recipient tile. At each clock cycle, each datum moves a certain distance along its path (store to store), in a pipelined fashion. When a datum is issued from a tile, it is not issued with a header identifying a recipient tile. Instead, the recipient tile knows that it will be expecting a datum from a certain transmitting tile at a certain time. Thus, the computer described herein is time deterministic.

Each tile 4 runs a portion of the program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer.

Each tile 4 is associated with its own multiplexer 210. Each multiplexer has at least as many inputs as there are tiles 4 on the chip, each input being connected to the switching fabric 34. The cross wires of the switching fabric are connected to a data-out set of connection wires 218 from each tile (a broadcast exchange bus). For ease of illustration, not all crosswires are shown in FIG. 16. One set of crosswires is labelled 140x to indicate that it is one of a number of sets of crosswires.

When the multiplexer 210 is switched to the input labelled 220x then that will connect to the crosswires 140x and thus to the data bus 218T of the transmitting (sending) tile 4T. If the multiplexer is controlled to switch to that input at a certain time, then the datum received on the data bus 230 which is connected to the crosswire 140x will appear at the output of the multiplexer 210 at a certain time. It will arrive at the receiving tile 4R a certain delay after that, the delay depending on the distance of the multiplexer 210 from the receiving tile 4R. As the multiplexers tend to be arranged close to the switching fabric, the delay from the tile to the multiplexer can vary depending on the location of the receiving tile 4R.

To implement the switching, the local programs executed on the tiles 4 include switch control instructions (PUTi) which cause a multiplexer control signal 214 to be issued to control the multiplexer 210 associated with that tile to switch its input at a certain time ahead of the time at which a particular datum is expected to be received at the tile. In the exchange phase, multiplexers are switched and packets (data) are exchanged between tiles using the switching fabric. It can be seen from this explanation that the internal interconnect 34 has no state and requires no queues—the movement of each datum is predetermined by the particular crosswire to which the input of each multiplexer is connected.

In the exchange phase, all tiles 4 are permitted to communicate with all other tiles within its synchronisation group. Synchronisation groups may be formed of tiles on the same chip or on different chips. Each tile 4 has control of its own unique input multiplexer 210. Incoming traffic can thus be selected from any other tile in the IPU 2 (or from one of the external connection links in an external exchange). It is also possible for a multiplexer 210 to be set to receive a null input, i.e. no input, in any given exchange phase.

Each tile 4 has three interfaces: an "exin" interface 224 which passes data from the switching fabric 34 to the tile 4; an "exout" interface 226 which passes data from the tile to the switching fabric over the broadcast exchange bus 218;

and an "exmux" interface 228 which passes the control mux signal 214 (mux-select) from the tile 4 to its multiplexer 210.

In order to ensure each individual tile executes SEND instructions and switch control instructions at appropriate times to transmit and receive the correct data, exchange scheduling requirements need to be met by the programmer or compiler that allocates individual programs to the individual tiles in the computer. This function is carried out by an exchange scheduler, preferably at compile time, which needs to be aware of the inter-tile delay parameters.

Unlike the packets sent over the internal interconnect 34, packets intended to be transmitted off chip have headers: as the order of transmission can change, they require the destination address to be present in the packet header.

At the physical layer the interconnect mechanism is lossy, but at the transaction layer the mechanism is not lossy due to the architecture of the link layer: if a packet is not acknowledged it will be resent automatically by the hardware in the interconnect. The possibility for loss and resending at the data link layer however means that the delivery of data packets over the external interconnect is not time-deterministic. Further, all the packets of a given exchange may arrive together or separated apart in time, and in any order, so the external interconnect requires flow control and queuing.

In embodiments each exchange block 104 may comprise a plurality of exchange block contexts as shown in FIGS. 6A-6B. Each exchange block context is a piece of hardware logic for implementing a respective instance of the exchange mechanism described above. An exchange block context independently issues exchange-on and off to a subset of tiles configured to listen to that context. In this case an exchange block is a convenient grouping of contexts for physical layout, and for providing a bandwidth in terms of physical bus width to match that offered by the on-chip system-on-chip (SOC) interconnect 34 (the non-deterministic interconnect). By providing multiple contexts per exchange block, and multiple blocks, the external interconnect can process more exchanges in parallel.

In the previously described embodiments, exchanges of data are performed via transfer proxies (i.e. the exchange blocks or contexts). A tile instance 4 communicates only with these transfer/proxies and never directly with the target of the transfer.

FIG. 17 shows the example exchange timings in more depth. On the left-hand side are shown the chip clock cycles running from 0-30. If the processor of the receiving tile 4R wants to act on a datum which was the output of a process on the transmitting tile 4T, then the transmitting tile 4T has to execute a SEND instruction send at a certain time (e.g. clock cycle 0 in FIG. 17), and the receiving tile 4R has to execute a switch control instruction PUTi EXCH MXptr (as in clock cycle 11) by a certain time relative to the execution of the SEND instruction on the transmitting tile. This will ensure that the data arrives at the recipient tile in time to be loaded for use in a code-let being executed at the recipient tile 4R.

External exchange transmission involves the formation and transmission of transaction packets which are used to communicate with the on-chip transfer proxies. Such packets are formed in tile memory 22 by the tile 4, as per any other data structure and transmitted to a transfer proxy using send and/or send-off instructions (SEND, SENDOFF).

There is no restriction on the number of send instructions used to transmit a single transaction packet. A single send instruction cannot be used to transmit multiple packets. In one implementation the sendoff instruction has an enforced upper-limit for the data size of 64 words (256 bytes). An exception event will be raised when attempting to execute a sendoff instruction with a larger payload. Send instructions are subject to flow control and will stall at issue when flow-control is off.

One advantage of the disclosed mechanism is that no DMA engine is necessarily required for the tiles. Instead a (preferably small) subset of the tiles are nominated by the compiler as I/O tiles for sending and/or receiving data off-chip. Because the IPU 2 comprises a high density of small tiles, some number can be allocated to I/O without compromising the performance of the rest of the tiles, thus obviating the argument for a DMA engine. Also the exchange mechanism is configured to service each of the multiple I/O tiles in turn to ensure that between the tiles the bandwidth of the external link (e.g. PCI or Ethernet) is made good use of, preferably saturated.

While particular embodiments have been described, other applications and variants of the disclosed techniques may become apparent to a person skilled in the art once given the disclosure herein. The scope of the present disclosure is not limited by the described embodiments but only by the accompanying claims.

The invention claimed is:

1. A network comprising a first processor interconnected with a second processor, each processor comprising one or more of:
   a plurality of processing units arranged on a chip, each processing unit being configured to execute program code;
   an on-chip interconnect arranged to enable the program code to run on the processing units to exchange data between the processing units, wherein the on-chip interconnect comprises multiple groups of exchange paths, each group connected to receive data from a corresponding group of the processing units;
   a plurality of external interfaces configured to communicate data off chip as packets, each packet having a destination address identifying a destination of the packet, a first external interface of the first processor being connected by an external link to a corresponding first external interface of the second processor;
   a plurality of exchange blocks connected to the groups of exchange paths; and
   a routing bus configured to route packets between the exchange blocks and the external interfaces;
   wherein processing units of the first processor are configured to generate off chip packets addressed to processing units of the second processor such that a group of processing units serviced by a first exchange block on the first processor are configured to address off chip packets to a group of processing units on the second processor serviced by a corresponding first exchange block of the second processor, and
   further wherein each processor comprises a first group of the exchange blocks in a first portion of the chip and a second group of the exchange blocks in a second portion of the chip, wherein the on-chip interconnect extends between the exchange blocks of the first group in the first portion of the chip and the exchange blocks of the second group in the second portion of the chip.

2. The network of claim 1, wherein each processor comprises eight exchange blocks in the first portion of the chip and eight exchange blocks in the second portion of the chip.

3. The network of claim 1, wherein the processing units of the first processor are configured to generate packets addressed to processing units of the second processor such that processing units serviced by each exchange block of the first processor transmit off-chip packets addressed only to processing units serviced by corresponding exchange blocks of the second processor.

4. The network of claim 1, wherein the routing bus has ingress and egress ports at at least one exchange block for incoming and outgoing packets.

5. The network of claim 1, wherein the routing bus has ingress and egress ports at at least one external interface.

6. The network of claim 1, wherein the first processor has additional external interfaces connected to corresponding additional processors.

7. The network of claim 1, wherein the first processor has a second interface for connecting to a third processor, and wherein the first and second interfaces lie in the second portion of the chip.

8. The network of claim 7, wherein the chip lies in an orientation relative to other chips such that the second interface is connected to a third processor in a southern orientation relative to the first processor.

9. The network of claim 7, wherein the first processor has a third external interface which is connected to a fourth processor in a southern orientation with respect to the first processor.

10. A network comprising a first processor interconnected with a second processor, each processor comprising one or more of:
a plurality of processing units arranged on a chip, each processing unit being configured to execute program code;
an on-chip interconnect arranged to enable the program code to run on the processing units to exchange data between the processing units, wherein the on-chip interconnect comprises multiple groups of exchange paths, each group connected to receive data from a corresponding group of the processing units;
a plurality of external interfaces configured to communicate data off chip as packets, each packet having a destination address identifying a destination of the packet, a first external interface of the first processor being connected by an external link to a corresponding first external interface of the second processor;
a plurality of exchange blocks connected to the groups of exchange paths; and
a routing bus configured to route packets between the exchange blocks and the external interfaces;
wherein processing units of the first processor are configured to generate off chip packets addressed to processing units of the second processor such that a group of processing units serviced by a first exchange block on the first processor are configured to address off chip packets to a group of processing units on the second processor serviced by a corresponding first exchange block of the second processor, and
further wherein the routing bus is configured to route packets from certain exchange blocks only to certain external interfaces and wherein the routing bus is configured to trap as an error packets which are incorrectly addressed by comparing an address of a packet with routing requirements in a routing register.

11. A network comprising a first processor interconnected with a second processor, each processor comprising one or more of:
a plurality of processing units arranged on a chip, each processing unit being configured to execute program code;
an on-chip interconnect arranged to enable the program code to run on the processing units to exchange data between the processing units, wherein the on-chip interconnect comprises multiple groups of exchange paths, each group connected to receive data from a corresponding group of the processing units;
a plurality of external interfaces configured to communicate data off chip as packets, each packet having a destination address identifying a destination of the packet, a first external interface of the first processor being connected by an external link to a corresponding first external interface of the second processor;
a plurality of exchange blocks connected to the groups of exchange paths; and
a routing bus configured to route packets between the exchange blocks and the external interfaces;
wherein processing units of the first processor are configured to generate off chip packets addressed to processing units of the second processor such that a group of processing units serviced by a first exchange block on the first processor are configured to address off chip packets to a group of processing units on the second processor serviced by a corresponding first exchange block of the second processor, and
further wherein the routing bus has multiple lanes, each lane being unidirectional.

12. A network comprising a first processor interconnected with a second processor, each processor comprising one or more of:
a plurality of processing units arranged on a chip, each processing unit being configured to execute program code;
an on-chip interconnect arranged to enable the program code to run on the processing units to exchange data between the processing units, wherein the on-chip interconnect comprises multiple groups of exchange paths, each group connected to receive data from a corresponding group of the processing units;
a plurality of external interfaces configured to communicate data off chip as packets, each packet having a destination address identifying a destination of the packet, a first external interface of the first processor being connected by an external link to a corresponding first external interface of the second processor;
a plurality of exchange blocks connected to the groups of exchange paths; and
a routing bus configured to route packets between the exchange blocks and the external interfaces;
wherein processing units of the first processor are configured to generate off chip packets addressed to processing units of the second processor such that a group of processing units serviced by a first exchange block on the first processor are configured to address off chip packets to a group of processing units on the second processor serviced by a corresponding first exchange block of the second processor,
wherein the first processor has a second interface for connecting to a third processor, and wherein the first and second interfaces lie in the second portion of the chip, and
wherein the first processor has a third external interface which is connected to a fourth processor in a southern orientation with respect to the first processor, and
further wherein logical identifiers are allocated to each of the second, third and fourth processors which are connected to the first processor, and wherein the first processor is configured to only address packets to these logical identifiers.

13. A network comprising a first processor interconnected with a second processor, each processor comprising one or more of:
a plurality of processing units arranged on a chip, each processing unit being configured to execute program code;
an on-chip interconnect arranged to enable the program code to run on the processing units to exchange data between the processing units, wherein the on-chip interconnect comprises multiple groups of exchange paths, each group connected to receive data from a corresponding group of the processing units;
a plurality of external interfaces configured to communicate data off chip as packets, each packet having a destination address identifying a destination of the packet, a first external interface of the first processor being connected by an external link to a corresponding first external interface of the second processor;
a plurality of exchange blocks connected to the groups of exchange paths; and
a routing bus configured to route packets between the exchange blocks and the external interfaces;
wherein processing units of the first processor are configured to generate off chip packets addressed to processing units of the second processor such that a group of processing units serviced by a first exchange block on the first processor are configured to address off chip packets to a group of processing units on the second processor serviced by a corresponding first exchange block of the second processor, and
further wherein the first processor has additional external interfaces connected to corresponding additional processors, and wherein each processor has three processors connected directly to it and is configured to operate a routing domain having respective first to fourth logical identifiers to identify itself and each of those three connected processors.

14. The network of claim 13, wherein each logical identifier is mapped to a physical identifier of a corresponding one of the processors.

15. A network comprising a first processor interconnected with a second processor, each processor comprising one or more of:
a plurality of processing units arranged on a chip, each processing unit being configured to execute program code;
an on-chip interconnect arranged to enable the program code to run on the processing units to exchange data between the processing units, wherein the on-chip interconnect comprises multiple groups of exchange paths, each group connected to receive data from a corresponding group of the processing units;
a plurality of external interfaces configured to communicate data off chip as packets, each packet having a destination address identifying a destination of the packet, a first external interface of the first processor being connected by an external link to a corresponding first external interface of the second processor;
a plurality of exchange blocks connected to the groups of exchange paths; and
a routing bus configured to route packets between the exchange blocks and the external interfaces;
wherein processing units of the first processor are configured to generate off chip packets addressed to processing units of the second processor such that a group of processing units serviced by a first exchange block on the first processor are configured to address off chip packets to a group of processing units on the second processor serviced by a corresponding first exchange block of the second processor, and
further wherein the routing bus has multiple lanes, each lane being unidirectional, and wherein each chip has four portions corresponding to respective edges of the chip, and wherein a first set of the lanes are southgoing between a top edge and a bottom edge, and a second set of the lanes are northgoing between the bottom edge and the top edge.

16. The network of claim 15, wherein the packets sourced by exchange blocks in a top portion of a chip are only addressed to processors connected to the right or bottom of that chip and packets sourced by exchange blocks on a bottom portion of the chip are only addressed to processors connected to the right or top of that chip.

17. The network of claim 15, wherein the first and second processors are carried on a card, and wherein:
the first chip is oriented in a first orientation in which top and bottom portions of the chip have respective interfaces on a left portion for connection externally of the card and respective interfaces on a right portion for connections internally of the card; and
the second chip is oriented in a reverse orientation such that its top portion aligns with the bottom portion of the first processor and its bottom portion aligns with the top portion of the first processor.

18. The network of claim 17, wherein the interfaces on the left portion of each of the first and second processors are reserved for connections externally of the card.

19. The network of claim 18, wherein at least one of the interfaces on each left portion is available for connection to a host.

20. The network of claim 17, wherein the chips of the card are configured identically in relation to their internal routing protocols and arrangements of routing bus and exchange blocks.

21. The network of claim 17, wherein processors oriented in the first orientation are assigned even numbers as physical identifiers and processors oriented in the reverse orientation are assigned odd numbers as physical identifiers.

22. The network of claim 17, comprising multiple cards connected using external interfaces of the processors on the respective left edges.

23. A processor comprising:
an on-chip interconnect configured to exchange data among a plurality of processing units, wherein the on-chip interconnect comprises multiple groups of exchange paths, each group of exchange paths connected to receive data from a corresponding group of the processing units;
a plurality of external interfaces configured to communicate data off chip as off chip packets having destination addresses, wherein the processor is interconnected with an additional processor, and wherein a first external interface of the processor is connected by an external link to a corresponding first external interface of the additional processor;
a plurality of exchange blocks connected to the groups of exchange paths; and
a routing bus configured to route packets between the exchange blocks and the external interfaces;
wherein the plurality of processing units of the processor are configured to generate the off chip packets addressed to another plurality of processing units of the additional processor such that a group of processing units serviced by a first exchange block on the processor are configured to address the off chip packets to a group of processing units on the additional processor serviced by a corresponding first exchange block of the additional processor, and wherein the processor comprises a first group of the exchange blocks in a first portion of a chip and a second group of the exchange blocks in a second portion of the chip, wherein the on-chip interconnect extends between the exchange blocks of the first group in the first portion of the chip and the exchange blocks of the second group in the second portion of the chip.

* * * * *